US010585540B2

(12) United States Patent
Teranishi

(10) Patent No.: US 10,585,540 B2
(45) Date of Patent: Mar. 10, 2020

(54) DETECTION DEVICE AND DISPLAY DEVICE

(71) Applicant: Japan Display Inc., Tokyo (JP)

(72) Inventor: Yasuyuki Teranishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/024,981

(22) Filed: Jul. 2, 2018

(65) Prior Publication Data

US 2019/0012013 A1 Jan. 10, 2019

(30) Foreign Application Priority Data

Jul. 4, 2017 (JP) .................. 2017-131477

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 2203/04101* (2013.01); *G06F 2203/04108* (2013.01); *G06F 2203/04112* (2013.01)

(58) Field of Classification Search
CPC ...... G06F 3/044; G06F 3/0412; G06F 3/0416; G06F 2203/04112
See application file for complete search history.

(56) References Cited

U.S. PATENT DOCUMENTS

| 9,024,913 | B1 | 5/2015 | Jung et al. |
| 9,164,641 | B1* | 10/2015 | Rowe ...................... G06F 3/044 |
| 2013/0342498 | A1 | 12/2013 | Kim et al. |
| 2014/0049486 | A1 | 2/2014 | Kim et al. |
| 2014/0049508 | A1 | 2/2014 | Kim et al. |
| 2014/0160061 | A1 | 6/2014 | Kim et al. |
| 2014/0024279 | A1 | 8/2014 | Hwang et al. |
| 2015/0084912 | A1 | 3/2015 | Seo et al. |
| 2016/0062504 | A1 | 3/2016 | Hwang et al. |
| 2016/0098114 | A1* | 4/2016 | Pylvas .................. G06F 3/0412 345/174 |
| 2016/0187690 | A1 | 6/2016 | Nam et al. |
| 2016/0188082 | A1* | 6/2016 | Ham ..................... G06F 3/0416 345/174 |

FOREIGN PATENT DOCUMENTS

| JP | 2014-115647 A | 6/2014 |
| JP | 2014-164752 A | 9/2014 |
| JP | 2015-064854 A | 4/2015 |
| JP | 2015-210811 A | 11/2015 |
| JP | 2016-051480 A | 4/2016 |
| JP | 2016-126336 A | 7/2016 |

* cited by examiner

*Primary Examiner* — Gerald Johnson
(74) *Attorney, Agent, or Firm* — K&L Gaates LLP

(57) ABSTRACT

A detection device includes a plurality of first electrodes and a plurality of second electrodes. The first electrodes are arrayed in a first direction and a second direction intersecting the first direction. The second electrodes are arrayed in the first direction and the second direction. The first electrodes and the second electrodes overlap in planar view. The size of the first electrodes in planar view may be larger than that of the second electrodes, for example.

16 Claims, 42 Drawing Sheets

TOUCH DETECTION ELECTRODE TD

DETECTION DEVICE AND DISPLAY DEVICE

CROSS-REFERENCE TO RELATED APPLICATIONS

This application claims priority from Japanese Application No. 2017-131477, filed on Jul. 4, 2017, the contents of which are incorporated by reference herein in its entirety.

BACKGROUND

1. Technical Field

The present disclosure relates to a detection device and a display device.

2. Description of the Related Art

Touch detection devices capable of detecting an external proximity object, what are called touch panels, have recently been attracting attention. Touch panels are mounted on or integrated with a display device, such as a liquid crystal display device, and used as display devices (refer to U.S. Patent Application Publication No. 2014/0049486, U.S. Patent Application Publication No. 2013/0342498, and U.S. Patent Application Publication No. 2014/0049508, for example). Various functions of such display devices are known, including a touch detection function to detect contact of a finger of an operator with a screen and a hover detection (proximity detection) function to detect a proximity state, a gesture, or the like of the finger not in contact with the screen.

Touch detection and hover detection are significantly different in the distance between detection electrodes and an object to be detected serving as a detection target, such as a finger, and in the resolution required for the detection. If electrodes and a drive configuration for touch detection are used for hover detection without any change, it may possibly be difficult to perform hover detection satisfactorily. Increasing the area of detection electrodes is an effective way to increase the detection sensitivity in hover detection. In this case, however, the detection sensitivity in touch detection may possibly decrease.

SUMMARY

A detection device according to one aspect of the present disclosure includes a plurality of first electrodes arrayed in a first direction and a second direction intersecting the first direction, and a plurality of second electrodes arrayed in the first direction and the second direction. The first electrodes and the second electrodes overlap in planar view.

DETAILED DESCRIPTION

Figure 1:
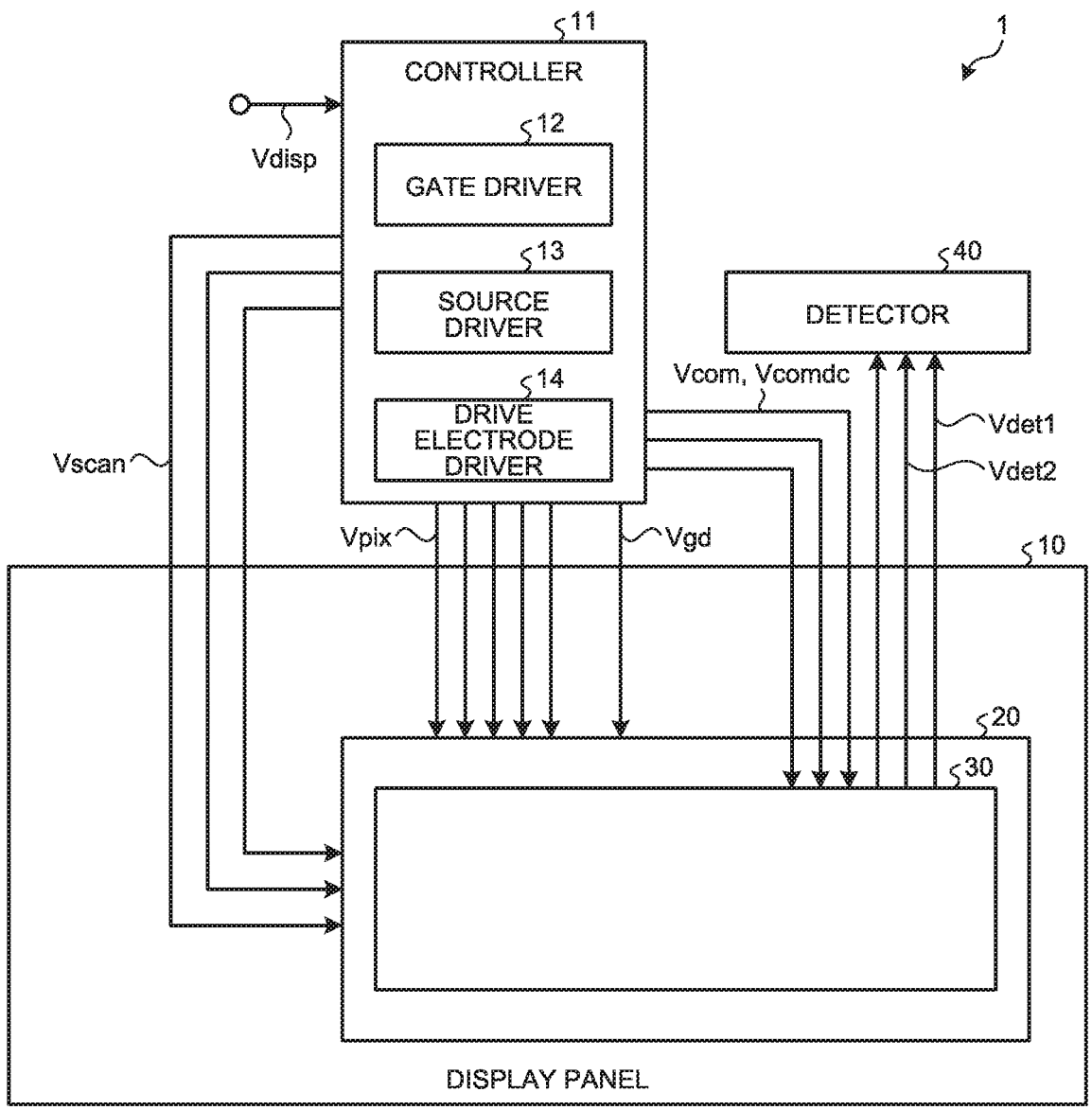
FIG. 1 is a block diagram of an exemplary configuration of a display device according to a first embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

First Embodiment

Figure 2:
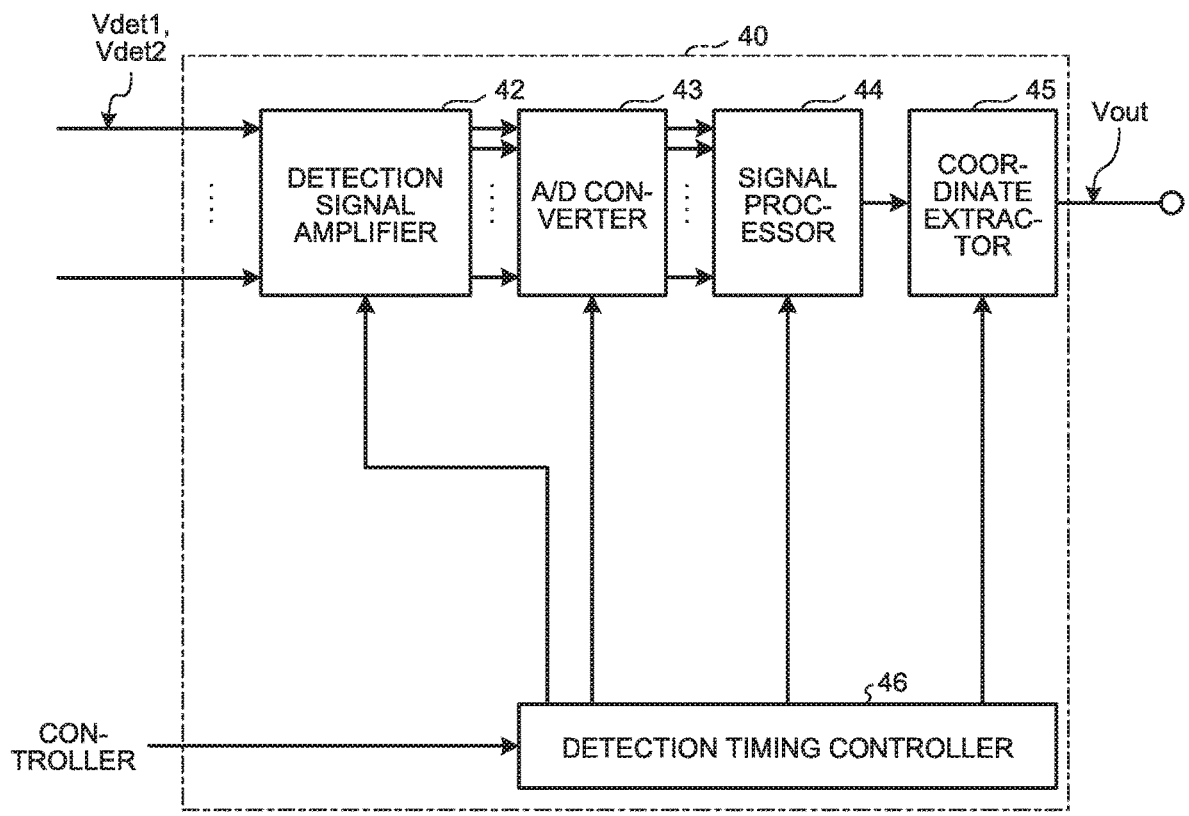
FIG. 2 is a block diagram of an exemplary configuration of a detector.

FIG. 1 is a block diagram of an exemplary configuration of a display device according to a first embodiment of the present disclosure. FIG. 2 is a block diagram of an exemplary configuration of a detector. As illustrated in FIG. 1, a display device 1 includes a display panel 10, a controller 11, and a detector 40. The display panel 10 includes a display portion 20 and a touch sensor 30. The display portion 20 displays an image. The touch sensor 30 is a detection device that detects touch input.

The display panel 10 is a display device in which the display portion 20 and the touch sensor 30 are integrated. Specifically, the display panel 10 is what is called an in-cell or hybrid device in which the capacitance touch sensor 30 is included in and integrated with the display portion 20. Including and integrating the capacitance touch sensor 30 in and with the display portion 20 includes a case where part of members, such as substrates and electrodes, of the display portion 20 are also used as part of members, such as substrates and electrodes, of the touch sensor 30, for example.

While the display portion 20 in the present exemplary configuration is a liquid crystal display device including liquid crystal display elements, it may include organic electroluminescence (organic EL) elements. In this case, one of anodes and cathodes serving as the organic EL elements may be used as drive electrodes CD, which will be described later.

The display portion 20 includes a plurality of pixels having the display elements and has a display surface facing the pixels. The display portion 20 sequentially scans horizontal lines one by one to perform display based on scanning signals Vscan supplied from a gate driver 12, which will be described later.

The controller 11 includes the gate driver 12, a source driver 13, and a drive electrode driver 14. The controller 11 is a circuit that supplies control signals to the gate driver 12 and the detector 40 based on video signals Vdisp supplied from the outside, thereby controlling a display operation and a detection operation.

The gate driver 12 has a function to sequentially select one horizontal line to be a target of display drive in the display panel 10 based on the control signals supplied from the controller 11.

The source driver 13 is a circuit that supplies pixel signals Vpix to respective sub-pixels SPix of the display portion 20. Part of the functions of the source driver 13 may be provided to the display panel 10. In this case, the controller 11 may generate the pixel signals Vpix and supply them to the source driver 13.

The drive electrode driver 14 supplies display drive signals Vcomdc or detection drive signals Vcom to the drive electrodes CD of the display panel 10. The drive electrode driver 14 supplies guard signals Vgd to touch detection electrodes TD and other components in hover detection.

The controller 11 has two detection modes performed by the touch sensor 30, that is, a touch detection mode and a hover detection mode. In the present specification, touch detection is to detect the position of an object to be detected in a state where the object to be detected is in contact with the display surface or in proximity to the display surface close enough to consider it in contact therewith (hereinafter, referred to as a "contact state"). Hover detection is to detect the position and a movement of an object to be detected in a state where the object to be detected is neither in contact with the display surface nor in proximity to the display surface close enough to consider it in contact therewith (hereinafter, referred to as a "non-contact state"). A state where an object to be detected is not present at a position facing the display surface or a state where an object to be detected is too far away from the display surface to be detected in hover detection is referred to as a "non-present state".

The touch sensor 30 has a function to detect the position of an object to be detected touching the display surface of the display panel 10 based on the basic principle of mutual capacitance touch detection. If the touch sensor 30 detects a touch of an object to be detected in mutual capacitance touch detection, the touch sensor 30 outputs detection signals Vdet1 to the detector 40. The touch sensor 30 also has a function to detect the position of an object to be detected hovering above the display surface of the display panel 10 based on the basic principle of self-capacitance touch detection. If the touch sensor 30 detects hover of an object to be detected in self-capacitance touch detection, the touch sensor 30 outputs detection signals Vdet2 to the detector 40.

The detector 40 is a circuit that determines whether an object to be detected is touching the display surface of the display panel 10 based on the control signals supplied from the controller 11 and on the detection signals Vdet1 output from the display panel 10 in mutual capacitance touch detection. The detector 40 is also a circuit that determines whether an object to be detected is hovering above the display surface of the display panel 10 based on the control signals supplied from the controller 11 and on the detection signals Vdet2 output from the display panel 10 in self-capacitance hover detection. If a touch is detected, the detector 40 calculates the coordinates at which the touch input is performed, for example. If an object to be detected is detected in hover detection, the detector 40 calculates the coordinates at which the hover input is performed, for example.

As illustrated in FIG. 2, the detector 40 includes a detection signal amplifier 42, an analog/digital (A/D) converter 43, a signal processor 44, a coordinate extractor 45, and a detection timing controller 46. The detection timing controller 46 controls the detection signal amplifier 42, the A/D converter 43, the signal processor 44, and the coordinate extractor 45 such that they operate synchronously with one another based on the control signals supplied from the controller 11.

The detection signal amplifier 42 amplifies the detection signals Vdet1 and Vdet2 supplied from the display panel 10. The A/D converter 43 samples analog signals output from the detection signal amplifier 42 at a timing synchronized with the drive signals Vcom, thereby converting the analog signals into digital signals.

The signal processor 44 is a logic circuit that determines whether an object to be detected is touching or hovering above the display panel 10 based on the output signals from the A/D converter 43. The signal processor 44, for example, performs processing of extracting a signal (absolute value |ΔV|) of the difference between the detection signals caused by a finger. In mutual capacitance touch detection, the signal processor 44 compares the absolute value |ΔV| with a first threshold voltage. If the absolute value |ΔV| is lower than the first threshold voltage, the signal processor 44 determines that an object to be detected is in the non-contact state. By contrast, if the absolute value |ΔV| is equal to or higher than the first threshold voltage, the signal processor 44 determines that an object to be detected is in the contact state. The detector 40 thus can perform touch detection. In self-capacitance hover detection, the signal processor 44 compares the absolute value |ΔV| with a second threshold voltage. If the absolute value |ΔV| is lower than the second threshold voltage, the signal processor 44 determines that an object to be detected is in the non-present state. By contrast, if the absolute value |ΔV| is equal to or higher than the second threshold voltage, the signal processor 44 determines that an object to be detected is in the non-contact state. The detector 40 thus can perform hover detection.

The coordinate extractor 45 is a logic circuit that calculates, if the signal processor 44 detects an object to be detected in touch detection or hover detection, the touch panel coordinates of the detection position. The coordinate extractor 45 outputs the calculated panel coordinates as output signals Vout. The coordinate extractor 45 may output the output signals Vout to the controller 11. The controller 11 can perform a predetermined display or detection operation based on the output signals Vout.

The detection signal amplifier 42, the A/D converter 43, the signal processor 44, the coordinate extractor 45, and the detection timing controller 46 of the detector 40 are provided to the display device 1. The configuration is not limited thereto, and all or part of the functions of the detector 40 may be provided to an external processor, for example. The coordinate extractor 45, for example, may be provided to an external processor different from the display device 1. In this case, the detector 40 may output the signals processed by the signal processor 44 as the output signals Vout.

Figure 3:
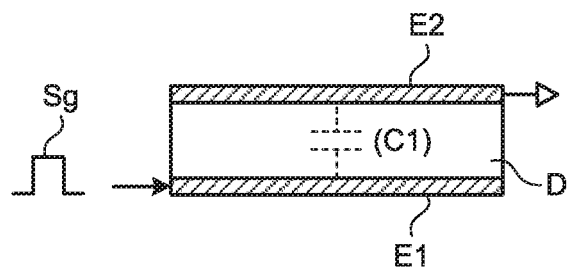
FIG. 3 is a diagram for explaining the basic principle of mutual capacitance touch detection and illustrates a state where a finger is not touching a detection electrode.
Figure 4:
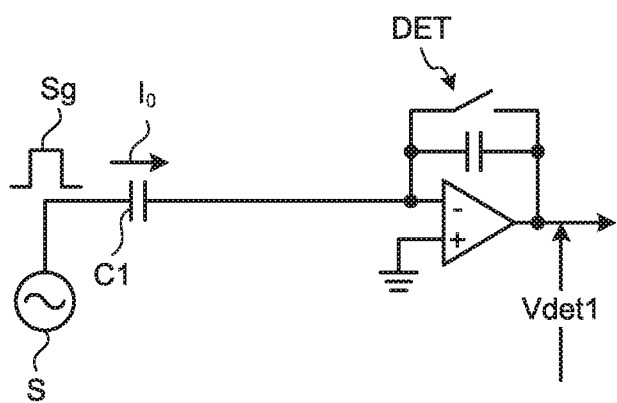
FIG. 4 is a diagram for explaining an example of an equivalent circuit in the state where a finger is not touching the detection electrode illustrated in FIG. 3.
Figure 5:
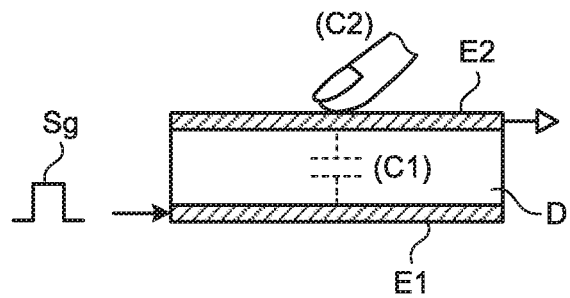
FIG. 5 is a diagram for explaining the basic principle of mutual capacitance touch detection and illustrates a state where a finger is touching the detection electrode.
Figure 6:
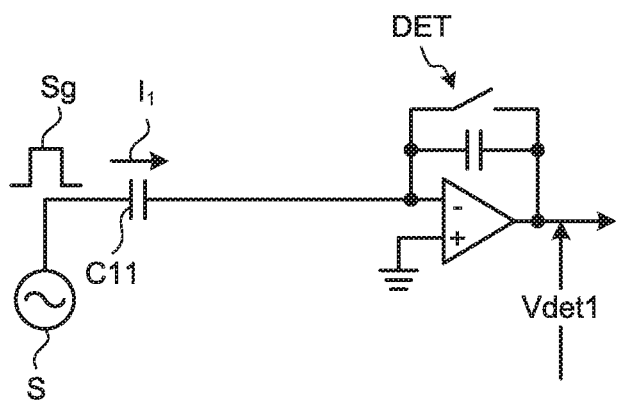
FIG. 6 is a diagram for explaining an example of the equivalent circuit in the state where a finger is touching the detection electrode illustrated in FIG. 5.
Figure 7:
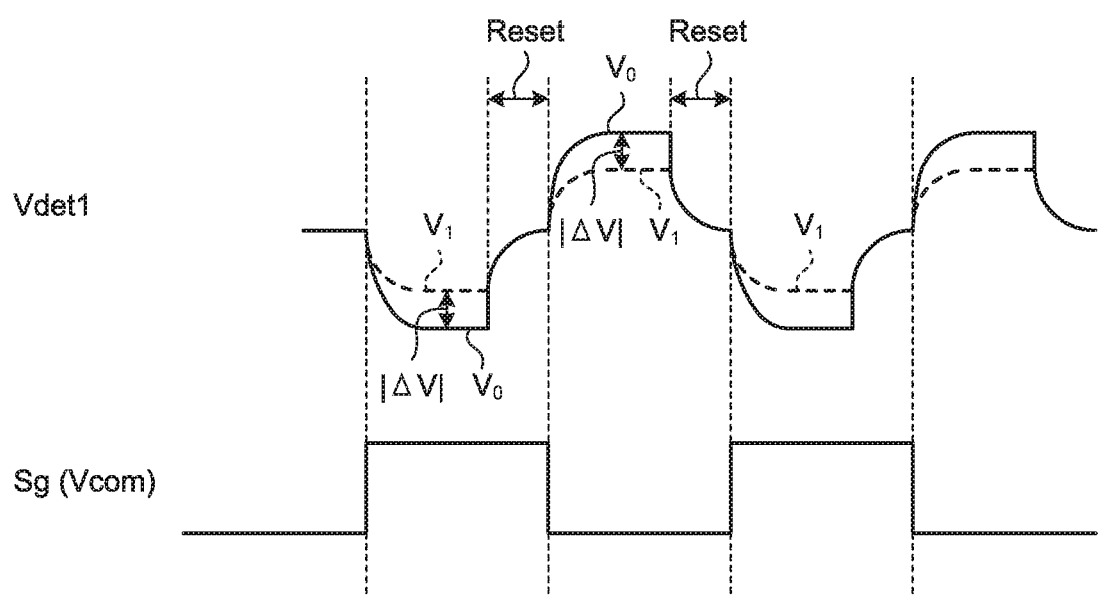
FIG. 7 is a diagram of an example of waveforms of a drive signal and a detection signal in mutual capacitance touch detection.

The display panel 10 performs touch detection based on the basic principle of mutual capacitance touch detection. The display panel 10 also performs hover detection based on the basic principle of self-capacitance touch detection. The following describes the basic principle of mutual capacitance touch detection performed by the display device 1 according to the present embodiment with reference to FIGS. 3 to 7. FIG. 3 is a diagram for explaining the basic principle of mutual capacitance touch detection and illustrates a state where a finger is not touching a detection electrode. FIG. 4 is a diagram for explaining an example of an equivalent circuit in the state where a finger is not touching the detection electrode illustrated in FIG. 3. FIG. 5 is a diagram for explaining the basic principle of mutual capacitance touch detection and illustrates a state where a finger is touching the detection electrode. FIG. 6 is a diagram for explaining an example of the equivalent circuit in the state where a finger is touching the detection electrode illustrated in FIG. 5. FIG. 7 is a diagram of an example of waveforms of a drive signal and a detection signal in mutual capacitance touch detection. FIG. 6 also illustrates a detection circuit. While the following describes a case where a finger serving as an object to be detected touches the detection electrode, the object to be detected is not limited to a finger and may be an object including a conductor, such as a stylus.

As illustrated in FIG. 3, a capacitance element C1 includes a pair of electrodes, that is, a drive electrode E1 and a detection electrode E2 facing each other with a dielectric D interposed therebetween. As illustrated in FIG. 4, a first end of the capacitance element C1 is coupled to an alternating-current (AC) signal source (drive signal source) S, and a second end thereof is coupled to a voltage detector DET. The voltage detector DET is an integration circuit included in the detection signal amplifier 42 illustrated in FIG. 2, for example.

When the AC signal source S applies an AC rectangular wave Sg at a predetermined frequency (e.g., a frequency of the order of several kilohertz to several hundred kilohertz) to the drive electrode E1 (first end of the capacitance element C1), an output waveform (detection signal Vdet1) illustrated in FIG. 7 appears via the voltage detector DET coupled to the detection electrode E2 (second end of the capacitance element C1). The AC rectangular wave Sg corresponds to the drive signal Vcom received from the drive electrode driver 14.

In a state where a finger is neither in contact with the display surface nor in proximity to the display surface close enough to consider it in contact therewith (non-contact state), an electric current $I_0$ corresponding to the capacitance value of the capacitance element C1 flows in association with charge and discharge of the capacitance element C1 as illustrated in FIGS. 3 and 4. The voltage detector DET illustrated in FIG. 4 converts fluctuations in the electric current $I_0$ depending on the AC rectangular wave Sg into fluctuations in the voltage (waveform $V_0$ indicated by the solid line (refer to FIG. 7)).

By contrast, in a state where a finger is in contact with or in proximity to the display surface (contact state), capacitance C2 formed by the finger is in contact with or in proximity to the detection electrode E2 as illustrated in FIG. 5. Fringe capacitance formed between the drive electrode E1 and the detection electrode E2 is blocked by the finger. As a result, the capacitance element C1 acts as a capacitance element C11 having a capacitance value smaller than that in the non-contact state as illustrated in FIG. 6. As indicated by the equivalent circuit in FIG. 6, an electric current $I_1$ flows through the capacitance element C11.

As illustrated in FIG. 7, the voltage detector DET converts fluctuations in the electric current $I_1$ depending on the AC rectangular wave Sg into fluctuations in the voltage (waveform $V_1$ indicated by the dotted line). In this case, the waveform $V_1$ has amplitude smaller than that of the waveform $V_0$. The absolute value $|\Delta V|$ of the voltage difference between the waveform $V_0$ and the waveform $V_1$ varies depending on an effect of a conductor, such as a finger, in contact with or in proximity to the detection electrode from the outside. To accurately detect the absolute value $|\Delta V|$ of the voltage difference between the waveform $V_0$ and the waveform $V_1$, the voltage detector DET preferably performs operations having a period Reset for resetting charge and discharge of a capacitor based on the frequency of the AC rectangular wave Sg by switching in the circuit.

The touch sensor 30 illustrated in FIG. 1 sequentially scans detection blocks one by one based on the drive signals Vcom supplied from the drive electrode driver 14, thereby performing mutual capacitance touch detection. The touch sensor 30 outputs the detection signals Vdet1 of the respective detection blocks from the touch detection electrodes TD, which will be described later, via the voltage detector DET illustrated in FIG. 4 or 6. The detection signals Vdet1 are supplied to the detection signal amplifier 42 of the detector 40.

Figure 8:
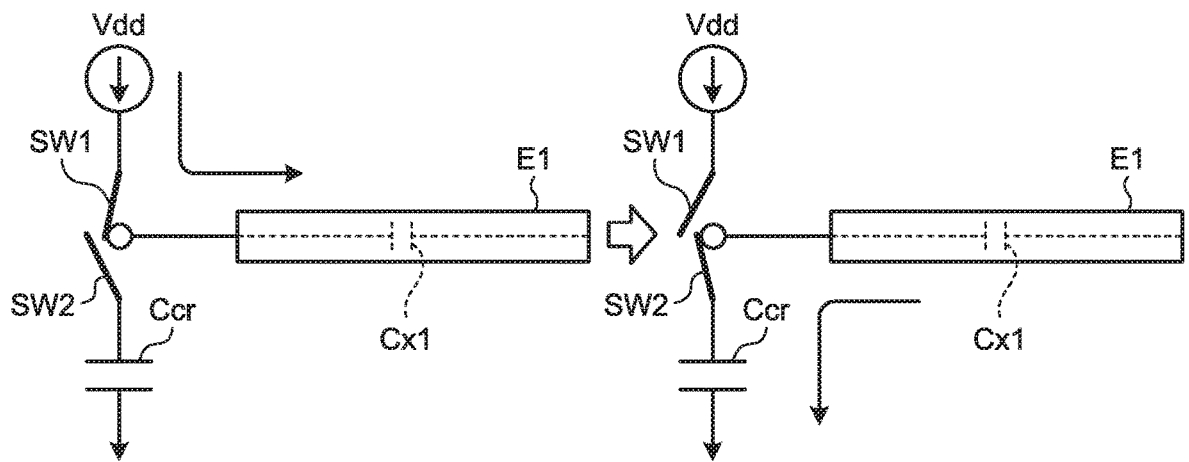
FIG. 8 is a diagram for explaining the basic principle of self-capacitance touch detection and illustrates a state where a finger is not touching the detection electrode.
Figure 9:
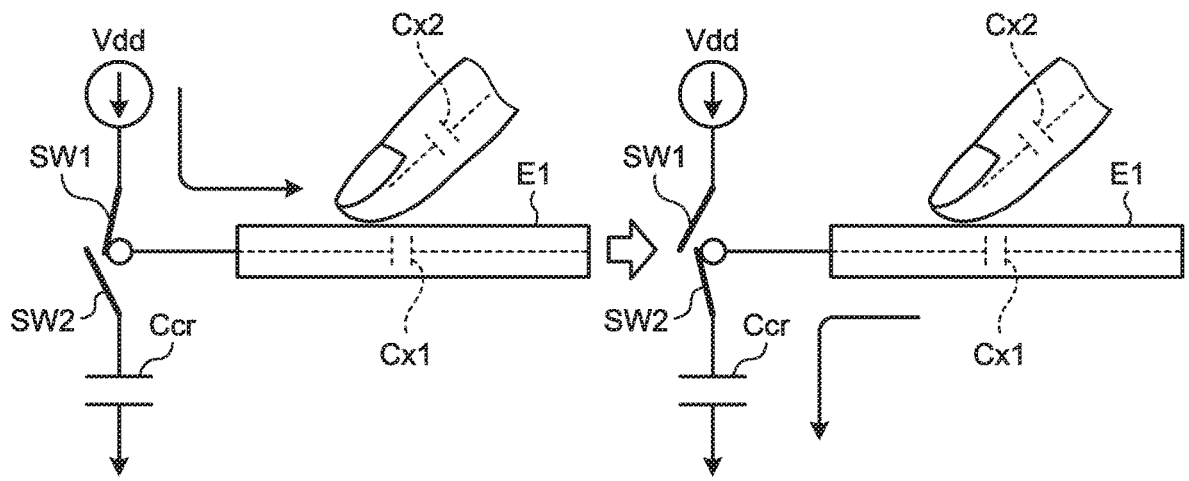
FIG. 9 is a diagram for explaining the basic principle of self-capacitance touch detection and illustrates a state where a finger is touching the detection electrode.
Figure 10:
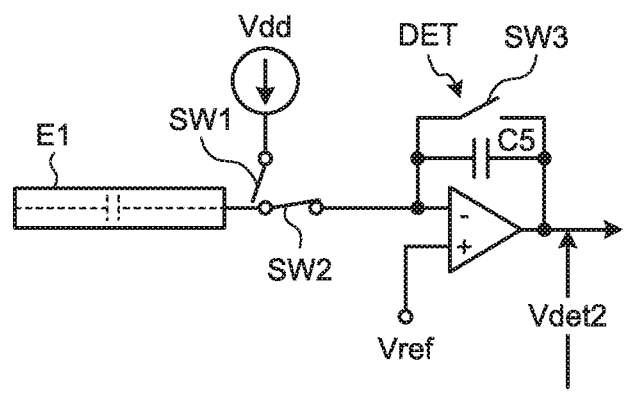
FIG. 10 is a diagram for explaining an example of an equivalent circuit in self-capacitance touch detection.
Figure 11:
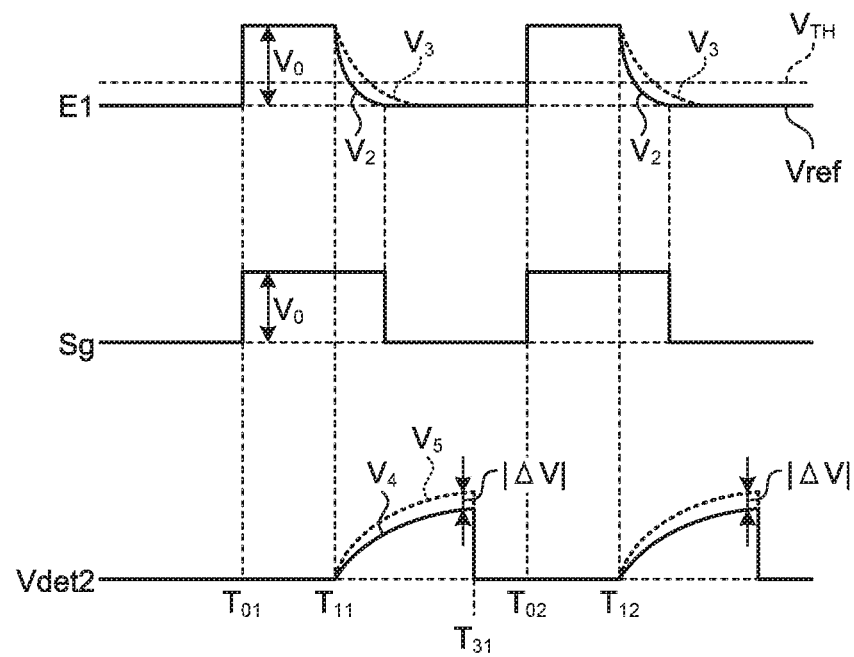
FIG. 11 is a diagram of an example of waveforms of a drive signal and a detection signal in self-capacitance touch detection.

The following describes the basic principle of self-capacitance touch detection with reference to FIGS. 8 to 11. FIG. 8 is a diagram for explaining the basic principle of self-capacitance touch detection and illustrates a state where a finger is not touching the detection electrode. FIG. 9 is a diagram for explaining the basic principle of self-capacitance touch detection and illustrates a state where a finger is touching the detection electrode. FIG. 10 is a diagram for explaining an example of an equivalent circuit in self-capacitance touch detection. FIG. 11 is a diagram of an example of waveforms of a drive signal and a detection signal in self-capacitance touch detection.

In the self-capacitance method, the drive electrode E1 serves as a detection electrode. In the left figure in FIG. 8, the detection electrode E1 is coupled to a power source Vdd by a switching element SW1 but is not coupled to a capacitor Ccr by a switching element SW2 in a state where a finger is not touching the detection electrode. In this state, capacitance Cx1 of the detection electrode E1 is charged. In the right figure in FIG. 8, coupling between the power source Vdd and the detection electrode E1 is cut off by the switching element SW1, and the detection electrode E1 is coupled to the capacitor Ccr by the switching element SW2. In this state, an electric charge in the capacitance Cx1 is discharged via the capacitor Ccr.

In the left figure in FIG. 9, the detection electrode E1 is coupled to the power source Vdd by the switching element SW1 but is not coupled to the capacitor Ccr by the switching element SW2 in a state where a finger is touching the detection electrode. In this state, capacitance Cx2 generated by the finger in proximity to the detection electrode E1 is also charged besides the capacitance Cx1 of the detection electrode E1. In the right figure in FIG. 9, coupling between the power source Vdd and the detection electrode E1 is cut off by the switching element SW1, and the detection electrode E1 is coupled to the capacitor Ccr by the switching element SW2. In this state, electric charges in the capacitance Cx1 and the capacitance Cx2 are discharged via the capacitor Ccr.

Because of the capacitance Cx2, the voltage change characteristics of the capacitor Ccr in discharging (the state where a finger is touching the detection electrode) illustrated in the right figure in FIG. 9 are clearly different from those of the capacitor Ccr in discharging (the state where a finger is not touching the detection electrode) illustrated in the right figure in FIG. 8. In the self-capacitance method, it is determined whether an input operation is performed by a finger or the like using the fact that the voltage change characteristics of the capacitor Ccr vary depending on the presence of the capacitance Cx2.

Specifically, an AC rectangular wave Sg (refer to FIG. 11) at a predetermined frequency (e.g., a frequency of the order of several kilohertz to several hundred kilohertz) is applied to the detection electrode E1. The voltage detector DET illustrated in FIG. 10 converts fluctuations in the electric current depending on the AC rectangular wave Sg into fluctuations in the voltage (waveforms $V_4$ and $V_5$).

As described above, the detection electrode E1 can be cut off from the power source Vdd and the capacitor Ccr by the switching elements SW1 and SW2. As illustrated in FIG. 11, the voltage level of the AC rectangular wave Sg rises by an amount corresponding to a voltage $V_0$ at time $T_{01}$. At this time, the switching element SW1 is turned on, and the switching element SW2 is turned off. As a result, the voltage level of the detection electrode E1 also rises by the voltage $V_0$. Subsequently, the switching element SW1 is turned off before time $T_{11}$. While the detection electrode E1 is not electrically coupled to any component, that is, in a floating state at this time, the electric potential of the detection electrode E1 is maintained at $V_0$ by the capacitance Cx1 (refer to FIG. 8) of the detection electrode E1 or capacitance (Cx1+Cx2, refer to FIG. 9) obtained by adding the capacitance Cx2 generated by a touch of a finger or the like to the capacitance Cx1 of the detection electrode E1. Subsequently, a switching element SW3 is turned on before time $T_{11}$ and is turned off after a predetermined time has elapsed, thereby resetting the voltage detector DET. With this reset operation, the output voltage is made substantially equal to a reference voltage Vref.

Subsequently, when the switching element SW2 is turned on at time $T_{11}$, the voltage in an inversion input unit of the voltage detector DET rises to the voltage $V_0$ equal to that of the detection electrode E1. Subsequently, the voltage in the inversion input unit of the voltage detector DET falls to the reference voltage Vref based on a time constant of the capacitance Cx1 (or Cx1+Cx2) of the detection electrode E1 and capacitance C5 in the voltage detector DET. Because the electric charge accumulated in the capacitance Cx1 (or Cx1+Cx2) of the detection electrode E1 moves to the capacitance C5 in the voltage detector DET, output from the voltage detector DET rises (Vdet2). When a finger or the like is not touching the detection electrode E1, the output (Vdet2) from the voltage detector DET is represented by the waveform $V_4$ indicated by the solid line, and Vdet2=Cx1× $V_0$/C5 is satisfied. When capacitance generated by an effect of a finger or the like is added, the output is represented by the waveform $V_5$ indicated by the dotted line, and Vdet2= (Cx1+Cx2)×$V_0$/C5 is satisfied.

Subsequently, at time $T_{31}$ after the electric charge in the capacitance Cx1 (or Cx1+Cx2) of the detection electrode E1 sufficiently moves to the capacitance C5, the switching element SW2 is turned off, and the switching elements SW1 and SW3 are turned on. This operation causes the electric potential of the detection electrode E1 to fall to a low level equal to that of the AC rectangular wave Sg and resets the voltage detector DET. The timing to turn on the switching element SW1 may be any timing as long as it is after the turning off of the switching element SW2 and before time $T_{02}$. The timing to reset the voltage detector DET may be any timing as long as it is after the turning off of the switching element SW2 and before time $T_{12}$.

The operation described above is repeatedly performed at a predetermined frequency (e.g., a frequency of the order of several kilohertz to several hundred kilohertz). As a result, it can be determined whether an external proximity object is present (whether a touch is made) based on the absolute value |ΔV| of the difference between the waveform $V_4$ and the waveform $V_5$. As illustrated in FIG. 11, when a finger or the like is not touching the detection electrode, the electric potential of the detection electrode E1 is represented by a waveform $V_2$. By contrast, when the capacitance Cx2 generated by an effect of a finger or the like is added, the electric potential is represented by a waveform $V_3$. It may be determined whether an external proximity object is present (whether a touch is made) by measuring a time until when the waveforms $V_2$ and $V_3$ fall to a predetermined threshold voltage $V_{TH}$.

The touch sensor 30 illustrated in FIG. 1 performs self-capacitance hover detection based on the drive signals Vcom supplied from the drive electrode driver 14. The touch sensor 30 outputs the detection signals Vdet2 from the drive electrodes CD, which will be described later, via the voltage detector DET illustrated in FIG. 10 and supplies them to the detection signal amplifier 42 of the detector 40.

Figure 12:
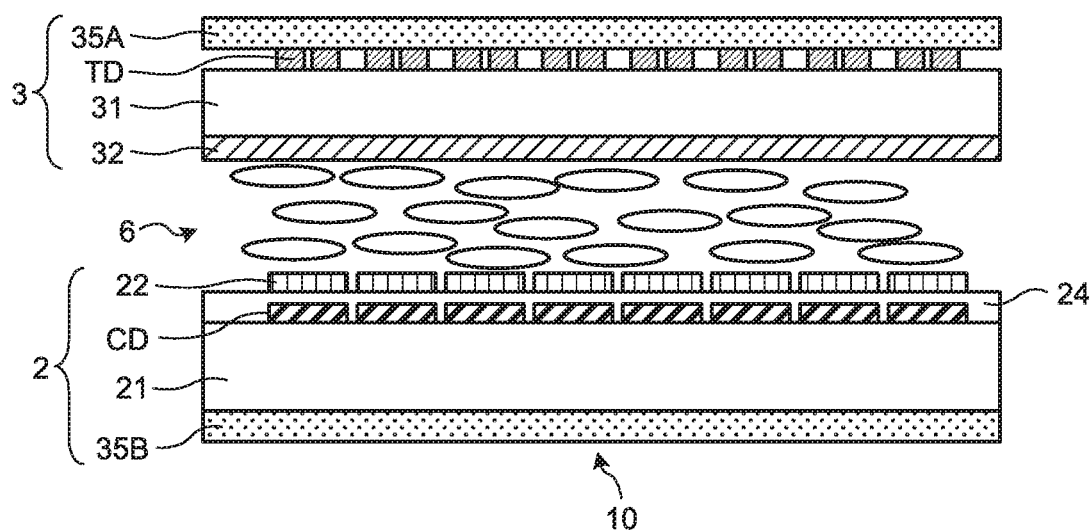
FIG. 12 is a sectional view of an exemplary configuration of a display panel.
Figure 13:
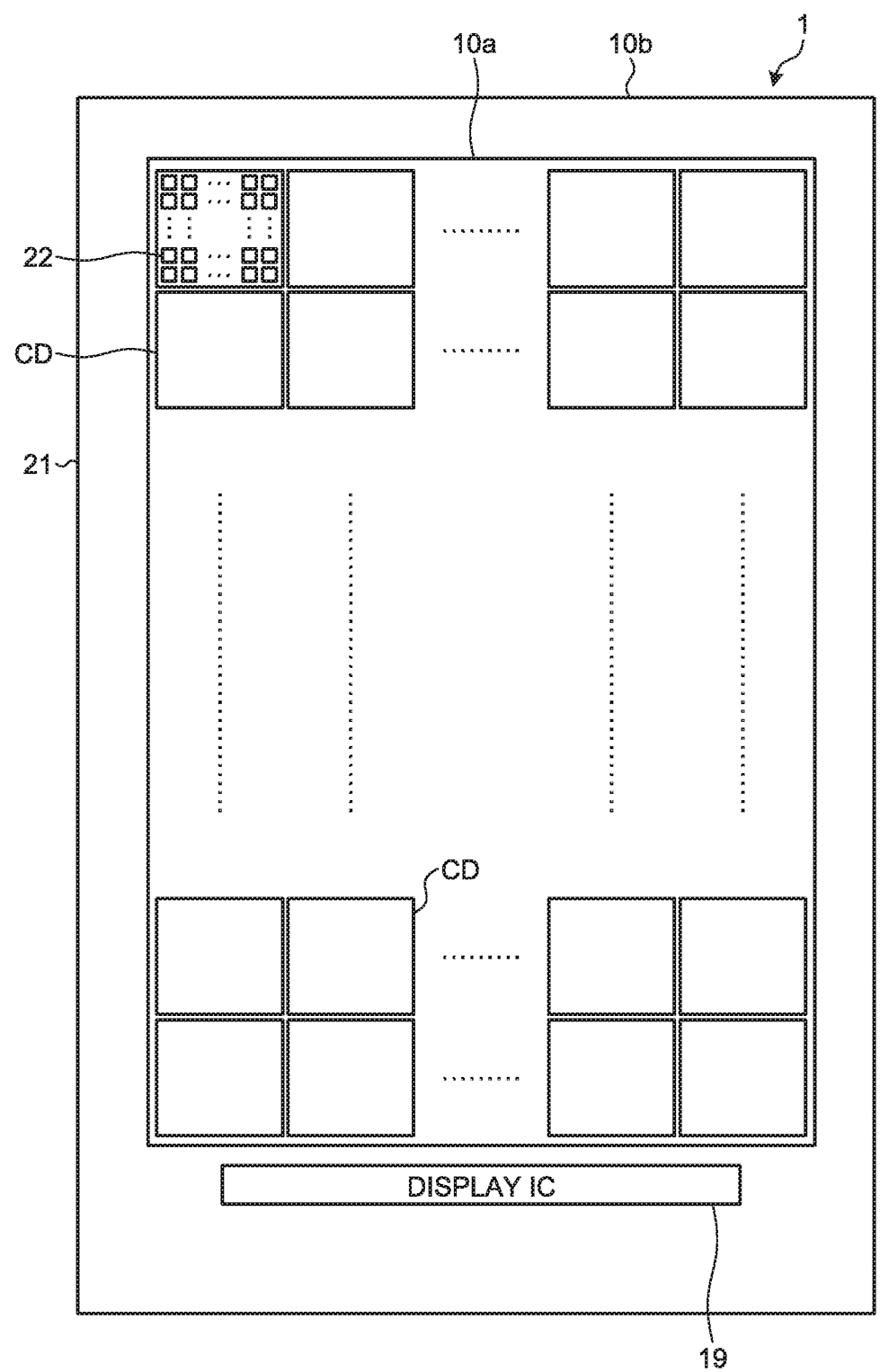
FIG. 13 is a plan view schematically illustrating a TFT substrate included in the display device.

The following describes an exemplary configuration of the display device 1 in greater detail. FIG. 12 is a sectional view of an exemplary configuration of the display panel. FIG. 13 is a plan view schematically illustrating a TFT substrate included in the display device. As illustrated in FIG. 12, the display panel 10 includes a first substrate 2, a second substrate 3, and a liquid crystal layer 6. The second substrate 3 is disposed facing the first substrate 2 in a direction perpendicular to the surface of the first substrate 2. The liquid crystal layer 6 is disposed between the first substrate 2 and the second substrate 3.

As illustrated in FIG. 12, the first substrate 2 includes a thin-film transistor (TFT) substrate 21, a plurality of pixel electrodes 22, a plurality of drive electrodes CD, and an insulating layer 24. The TFT substrate 21 serves as a circuit board. The pixel electrodes 22 are provided in a matrix (row-column configuration) on the TFT substrate 21. The drive electrodes CD are provided between the TFT substrate 21 and the pixel electrodes 22. The insulating layer 24 insulates the pixel electrodes 22 from the drive electrodes CD. A polarizing plate 35B is provided under the TFT substrate 21 with an adhesive layer (not illustrated) interposed therebetween. In the present specification, an "upper side" indicates a side in a direction from the TFT substrate 21 toward a counter substrate 31 in the direction perpendicular to the TFT substrate 21, and a "lower side" indicates a side in a direction from the counter substrate 31 toward the TFT substrate 21.

As illustrated in FIG. 13, the TFT substrate 21 has a display region 10a and a frame region 10b. The display region 10a is a region on which an image is displayed. The frame region 10b is provided around the display region 10a. The display region 10a has a rectangular shape having a pair of long sides and a pair of short sides. The frame region 10b has a frame shape surrounding the four sides of the display region 10a.

The drive electrodes CD are provided in the display region 10a of the TFT substrate 21 and arrayed in a matrix (row-column configuration) in directions along the long side and the short side of the display region 10a. The drive electrodes CD are made of a translucent conductive material, such as indium tin oxide (ITO). A plurality of pixel electrodes 22 are disposed in a matrix (row-column configuration) at positions corresponding to one drive electrode CD. The pixel electrode 22 has an area smaller than that of the drive electrode CD. While part of the drive electrodes CD and the pixel electrodes 22 are illustrated in FIG. 13, the drive electrodes CD and the pixel electrodes 22 are disposed across the whole area of the display region 10a. In the present specification, the row direction is also referred to as an X-direction, and the column direction is also referred to as a Y-direction. The X-direction is a first direction, and the Y-direction is a second direction.

The frame region 10b of the TFT substrate 21 is provided with a display integrated circuit (IC) 19. The display IC 19 is a chip mounted on the TFT substrate 21 by the chip-on-glass (COG) technology. The controller 11 illustrated in FIG. 1 is included in the display IC 19, for example. The display IC 19 is coupled to data lines SGL (refer to FIG. 14) and gate lines GCL (refer to FIG. 14). The display IC 19 is also coupled to the drive electrodes CD via a coupling switching circuit 17 (refer to FIG. 21), which will be described later, for example. The display IC 19 outputs control signals to the gate lines GCL, the data lines SGL, and the like, which will be described later, based on the video signals Vdisp (refer to FIG. 1) supplied from an external host IC (not illustrated). In the configuration according to the present embodiment, at least part of the controller 11 may be included in a second IC other than the display IC 19. The second IC may be a chip mounted on the TFT substrate 21 by the COG technology or a chip mounted on a flexible substrate coupled to the TFT substrate 21.

As illustrated in FIG. 13, the display IC 19 may be disposed on the short side of the frame region 10b, for example. With this configuration, the display IC 19 need not be provided on the long side of the frame region 10b, thereby reducing the width of the long side of the frame region 10b.

As illustrated in FIG. 12, the second substrate 3 includes the counter substrate 31 and a color filter 32. The color filter 32 is provided on one surface of the counter substrate 31. The touch detection electrodes TD of the touch sensor 30 (refer to FIG. 1) are provided on the other surface of the counter substrate 31. A polarizing plate 35A is provided on the touch detection electrodes TD with an adhesive layer (not illustrated) interposed therebetween. A flexible substrate 71 (refer to FIG. 18) is coupled to the counter substrate 31. The flexible substrate 71 is coupled to the touch detection electrodes TD via wiring.

As illustrated in FIG. 12, the TFT substrate 21 and the counter substrate 31 are disposed facing each other with a predetermined gap interposed therebetween. The liquid crystal layer 6 serving as a display functional layer is provided to the space between the TFT substrate 21 and the counter substrate 31. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. Orientation films are provided between the liquid crystal layer 6 and the first substrate 2 and between the liquid crystal layer 6 and the second substrate 3 illustrated in FIG. 12.

Figure 14:
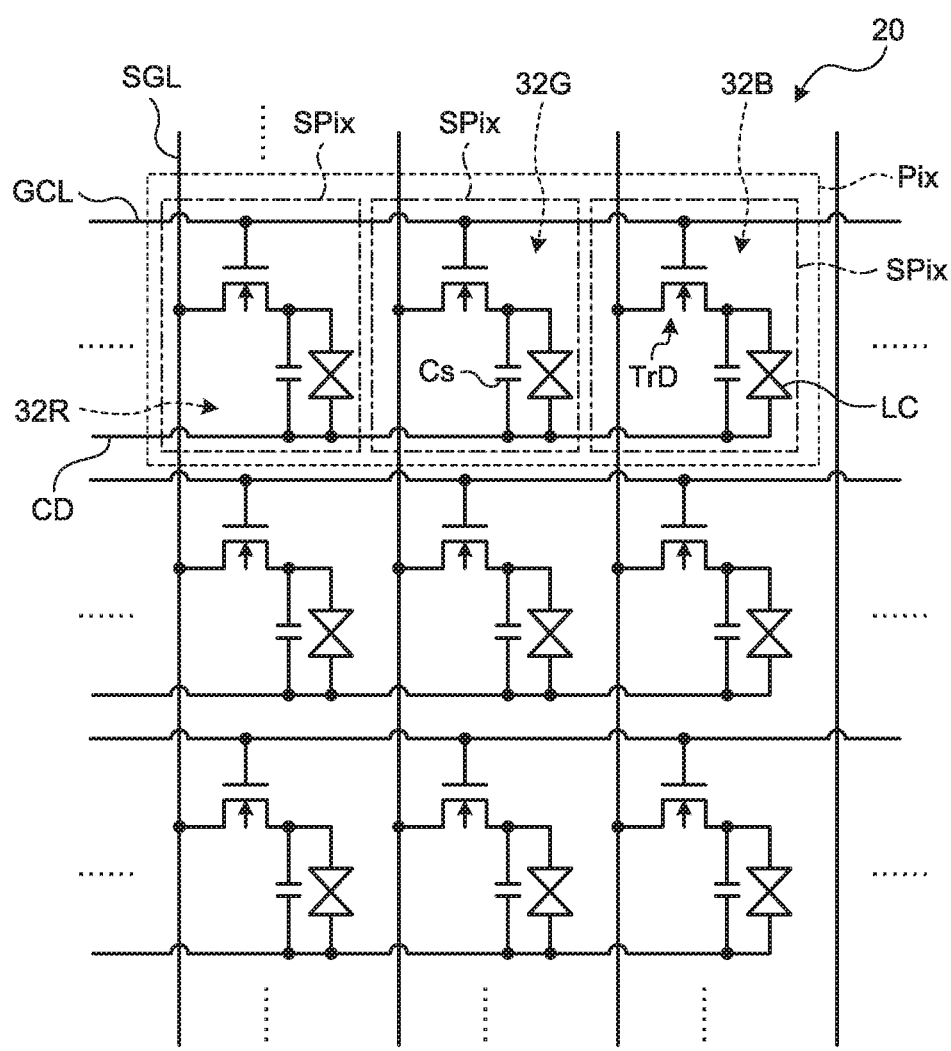
FIG. 14 is a circuit diagram of a pixel array in a display portion according to the first embodiment.
Figure 15:
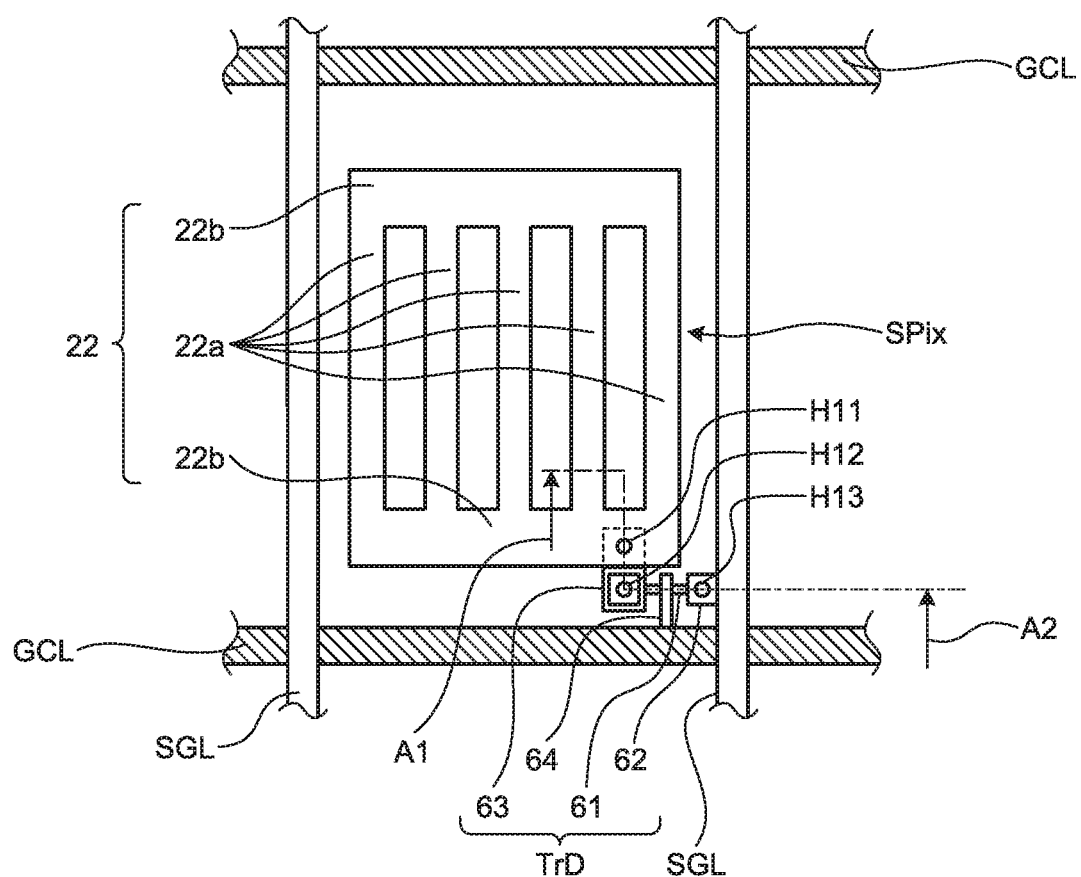
FIG. 15 is a plan view of an exemplary configuration of a sub-pixel.
Figure 16:
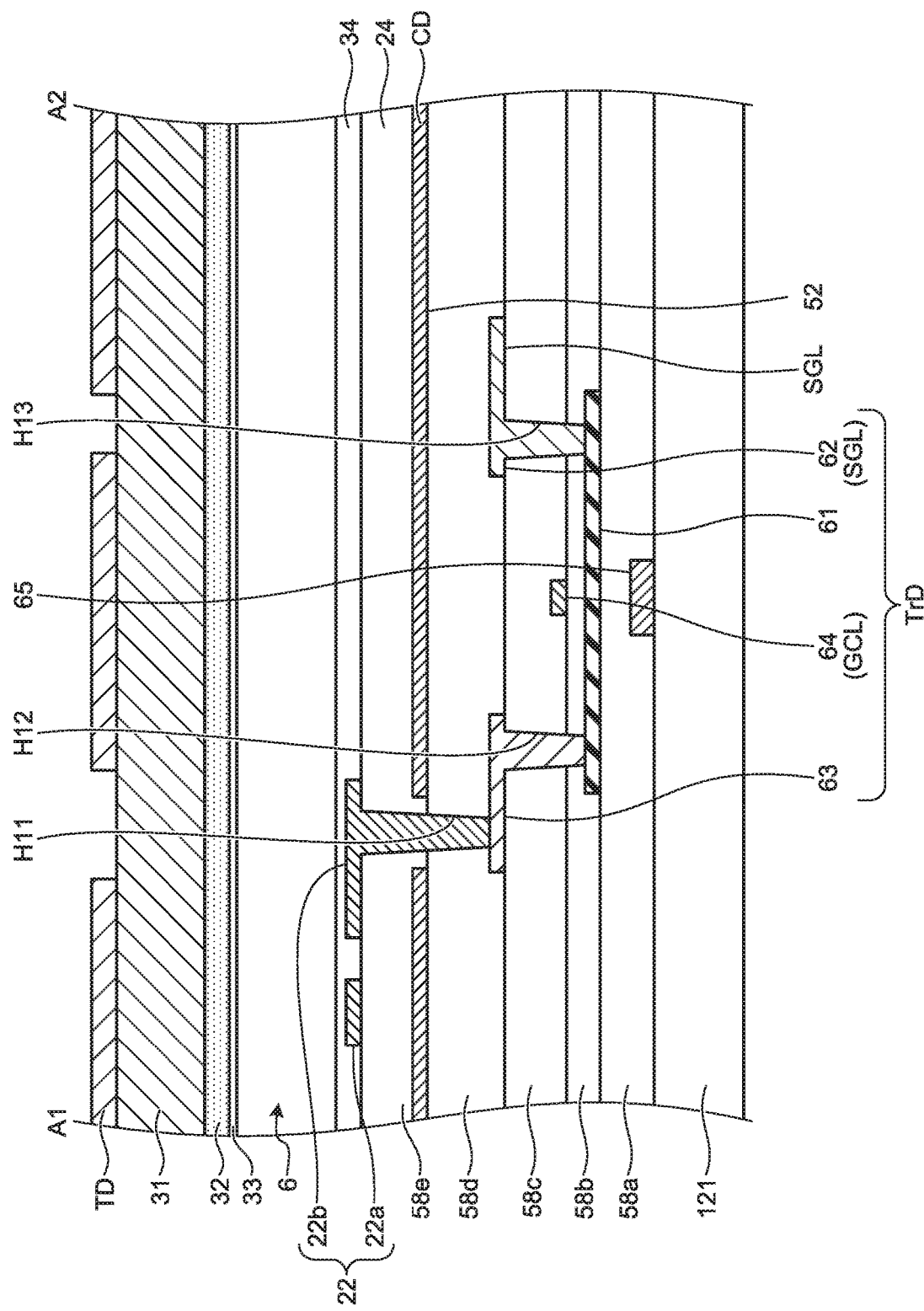
FIG. 16 is a sectional view along line A1-A2 in FIG. 15.

FIG. 14 is a circuit diagram of a pixel array in the display portion according to the first embodiment. FIG. 15 is a plan view of an exemplary configuration of a sub-pixel. FIG. 16 is a sectional view along line A1-A2 in FIG. 15. The TFT substrate 21 illustrated in FIG. 12 is provided with switching elements TrD of respective sub-pixels SPix and wiring, such as the data lines SGL and the gate lines GCL, as illustrated in FIG. 14. The data lines SGL supply the pixel signals Vpix to the pixel electrodes 22, and the gate lines GCL supply drive signals for driving the switching elements TrD. The data lines SGL and the gate lines GCL extend on a plane parallel to the surface of the TFT substrate 21.

The display portion 20 illustrated in FIG. 14 includes a plurality of sub-pixels SPix arrayed in a matrix (row-column configuration). The sub-pixels SPix each include the switching element TrD and a liquid crystal element LC. The switching element TrD is a thin-film transistor and is an n-channel metal oxide semiconductor (MOS) TFT in this example. The source of the switching element TrD is coupled to the data line SGL, the gate thereof is coupled to the gate line GCL, and the drain thereof is coupled to one end of the liquid crystal element LC. The other end of the liquid crystal element LC is coupled to the drive electrode CD. The insulating layer 24 (refer to FIG. 11) is provided between the pixel electrodes 22 and the drive electrodes CD to form holding capacitance Cs illustrated in FIG. 14.

The sub-pixel SPix is coupled to the other sub-pixels SPix belonging to the same row in the display portion 20 by the gate line GCL. The gate lines GCL are coupled to the gate driver 12 (refer to FIG. 1) and supplied with the scanning signals Vscan from the gate driver 12. The sub-pixel SPix is coupled to the other sub-pixels SPix belonging to the same column in the display portion 20 by the data line SGL. The data lines SGL are coupled to the source driver 13 (refer to FIG. 1) and supplied with the pixel signals Vpix from the source driver 13. The drive electrodes CD are coupled to the drive electrode driver 14 (refer to FIG. 1) and supplied with the display drive signals Vcomdc or the detection drive signals Vcom from the drive electrode driver 14.

As illustrated in FIG. 15, the area surrounded by the gate lines GCL and the data lines SGL corresponds to one sub-pixel SPix. The sub-pixel SPix includes an area in which the pixel electrode 22 overlaps the drive electrode CD. A plurality of pixel electrodes 22 are coupled to the data line SGL via the respective switching elements TrD.

As illustrated in FIG. 15, the pixel electrode 22 includes a plurality of strip electrodes 22a and connections 22b. The strip electrodes 22a extend along the data lines SGL and are arrayed in a direction along the gate lines GCL. The connections 22b each connect the ends of the strip electrodes 22a. While the pixel electrode 22 includes five strip electrodes 22a, the structure is not limited thereto. The pixel electrode 22 may include four or less or six or more strip electrodes 22a. The pixel electrode 22 may include two strip electrodes 22a, for example.

As illustrated in FIG. 15, the switching element TrD includes a semiconductor layer 61, a source electrode 62, a drain electrode 63, and a gate electrode 64. A light-shielding layer 65 is provided under the semiconductor layer 61. Light traveling from a backlight to the semiconductor layer 61, for example, is blocked by the light-shielding layer 65.

As illustrated in FIG. 16, the light-shielding layer 65 is provided on a substrate 121. An insulating layer 58a is provided covering the light-shielding layer 65 on the substrate 121. The semiconductor layer 61 is provided on the insulating layer 58a. The gate electrode 64 (gate line GCL) is provided on the semiconductor layer 61 with an insulating layer 58b interposed therebetween. The drain electrode 63 and the source electrode 62 (data line SGL) are provided above the gate electrode 64 (gate line GCL) with an insulating layer 58c interposed therebetween. The drive electrode CD is provided on the drain electrode 63 and the source electrode 62 (data line SGL) with an insulating layer 58d interposed therebetween. As described above, the pixel electrode 22 is provided on the drive electrode CD with the insulating layer 24 interposed therebetween. An orientation film 34 is provided on the pixel electrode 22. An orientation film 33 is provided on the opposite side of the orientation film 34 across the liquid crystal layer 6.

As illustrated in FIGS. 15 and 16, the pixel electrode 22 is coupled to the drain electrode 63 of the switching element TrD through a contact hole H11. The semiconductor layer 61 is coupled to the drain electrode 63 through a contact hole H12. The semiconductor layer 61 intersects the gate electrode 64 in planar view. In the present specification, the planar view indicates a view in the thickness direction (Z-direction) of the display panel 10. The gate electrode 64 is coupled to the gate line GCL and protrudes from one side of the gate line GCL. The semiconductor layer 61 extends to a position where the source electrode 62 and the semiconductor layer 61 overlap and is electrically coupled to the source electrode 62 through a contact hole H13. The source electrode 62 is coupled to the data line SGL and protrudes from one side of the data line SGL.

The gate driver 12 (refer to FIG. 1) drives to sequentially scan the gate line GCL. The gate driver 12 applies the scanning signals Vscan (refer to FIG. 1) to the gates of the TFT elements Tr of the respective sub-pixels SPix via the gate line GCL. The gate driver 12 thus sequentially selects one row (one horizontal line) out of the sub-pixels SPix as a target of display drive. The source driver 13 supplies the pixel signals Vpix to the sub-pixels SPix belonging to one horizontal line selected by the gate driver 12 via the data lines SGL illustrated in FIG. 14. The sub-pixels SPix perform display in units of one horizontal line based on the supplied pixel signals Vpix. To perform the display operation, the drive electrode driver 14 applies the display drive signals Vcomdc to the drive electrodes CD. As a result, the drive electrodes CD serve as common electrodes that supply a common potential (reference potential) to a plurality of pixel electrodes 22 of the display portion 20.

The drive electrodes CD according to the present embodiment also serve as drive electrodes when the touch sensor 30 performs mutual capacitance touch detection. The drive electrodes CD also serve as detection electrodes when the touch sensor 30 performs self-capacitance hover detection.

The color filter 32 includes periodically arrayed color areas in three colors of red (R), green (G), and blue (B), for example. The color areas 32R, 32G, and 32B in the three colors of R, G, and B, respectively, serve as a set and are allocated to the respective sub-pixels SPix. A set of the sub-pixels SPix corresponding to the respective color areas 32R, 32G, and 32B in the three colors serves as one pixel Pix. The color filter 32 faces the liquid crystal layer 6 in the direction perpendicular to the TFT substrate 21. The color filter 32 may have a combination of other colors as long as they are colored in respective different colors. The color filter 32 is not limited to a combination of three colors and may be a combination of four or more colors.

The display device 1, for example, performs a detection operation (detection operation period) and a display operation (display operation period) in a time-division manner. The display device 1 may perform the detection operation and the display operation in any division manner. In the following description, the display device 1 performs the detection operation and the display operation by dividing them into a plurality of sections in one frame period (1F) of the display portion 20, that is, in a time required to display video information of one screen.

Figure 17:
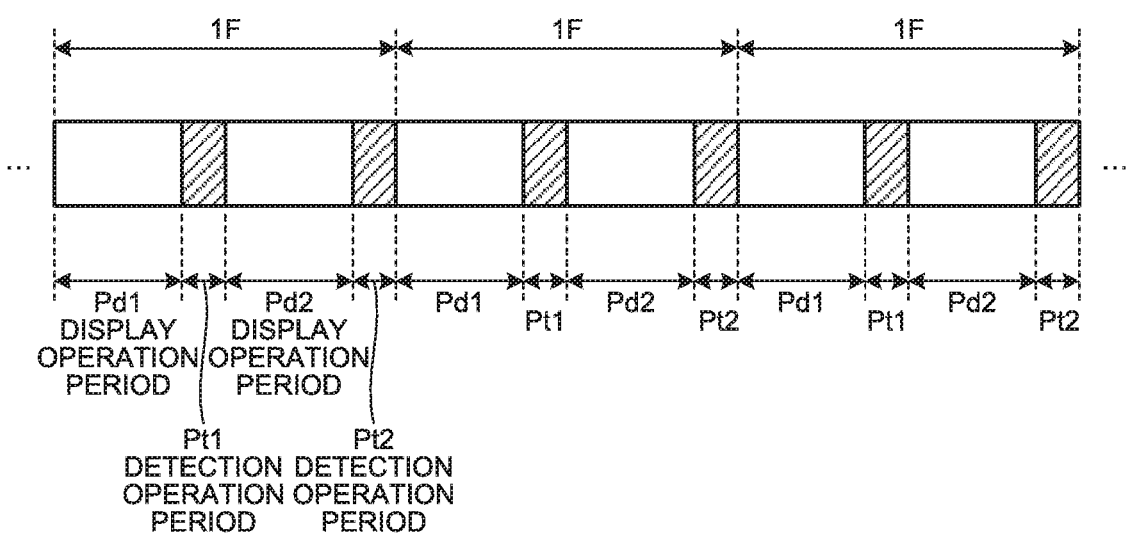
FIG. 17 is a diagram schematically illustrating an example of arrangement of display operation periods and detection operation periods in one frame period.

FIG. 17 is a diagram schematically illustrating an example of arrangement of display operation periods and detection operation periods in one frame period. One frame period (1F) includes two display operation periods Pd1 and Pd2 and two detection operation periods Pt1 and Pt2. These periods are alternately arranged on the time axis in the order of the display operation period Pd1, the detection operation period Pt1, the display operation period Pd2, and the detection operation period Pt2, for example.

The controller 11 (refer to FIG. 1) causes the gate driver 12 and the source driver 13 to supply the pixel signals Vpix to the pixels Pix (refer to FIG. 14) in a plurality of rows selected in the display operation periods Pd1 and Pd2. In the display operation periods Pd1 and Pd2, the controller 11 causes the drive electrode driver 14 to supply the display drive signals Vcomdc serving as a common electrode potential for display to the selected drive electrodes CD.

The detection operation periods Pt1 and Pt2 each have a touch detection period and a hover detection period. The touch detection period is a period for performing touch detection based on changes in mutual capacitance between the touch detection electrodes TD and the drive electrodes CD. The hover detection period is a period for performing hover detection based on changes in self-capacitance in the drive electrodes CD. In the touch detection periods, the controller 11 (refer to FIG. 1) causes the drive electrode driver 14 to supply the detection drive signals Vcom to the drive electrodes CD selected in the touch detection periods. The detector 40 determines whether a touch is made and calculates the coordinates of a touch input position based on the detection signals Vdet1 supplied from the touch detection electrodes TD. In the hover detection period, the controller 11 causes the drive electrode driver 14 to supply the detection drive signals Vcom to the drive electrodes CD. The detector 40 determines whether hover is performed and calculates the coordinates of a hover input position based on the detection signals Vdet2 supplied from the drive electrodes CD.

In the example illustrated in FIG. 17, the display device 1 displays video of one screen by dividing it into two sections in one frame period (1F). The display device 1 may divide the display operation period in one frame period (1F) into a larger number of sections. The display device 1 may divide the detection operation period in one frame period (1F) into a larger number of sections.

The display device 1 may perform detection on half of one screen or one screen in each of the detection operation periods Pt1 and Pt2. Alternatively, the display device 1 may perform thinned-out detection or the like as necessary in the detection operation periods Pt1 and Pt2. Still alternatively, the display device 1 may perform the display operation and the detection operation once without dividing them into a plurality of sections in one frame period (1F).

In the detection operation periods Pt1 and Pt2, the display device 1 may bring the gate lines GCL and the data lines SGL (refer to FIG. 14) into a state of being supplied with no voltage signal and not being electrically coupled to any component (Hi-Z: high impedance). Alternatively, the display device 1 may supply the gate lines GCL and the data lines SGL with the guard signals Vgd having the same waveform as that of the detection drive signals Vcom and synchronized with the drive signals Vcom. This mechanism can prevent generation of capacitance between the drive electrodes CD supplied with the detection drive signals Vcom and the gate lines GCL and the data lines SGL in the detection operation periods Pt1 and Pt2. Consequently, the display device 1 can increase the detection sensitivity.

Figure 18:
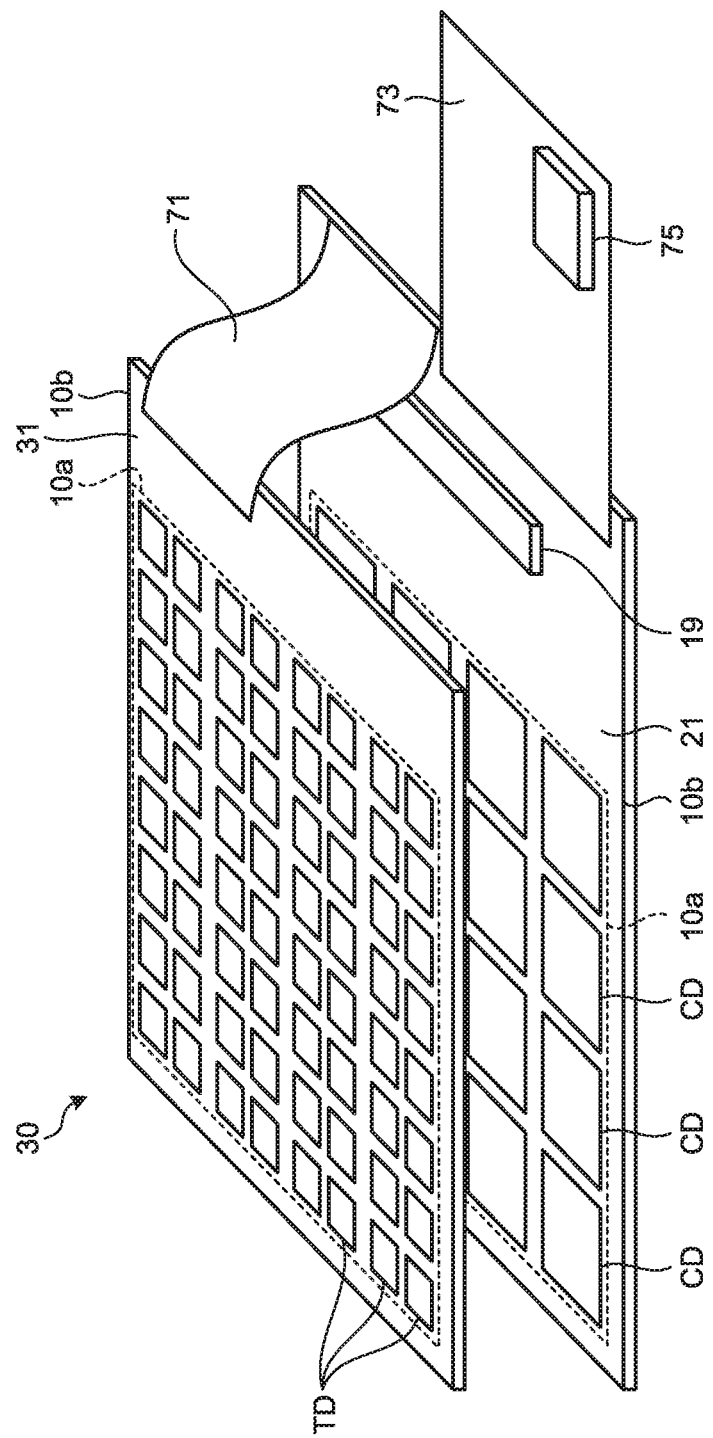
FIG. 18 is a perspective view of an exemplary configuration of drive electrodes and touch detection electrodes in the display panel according to the first embodiment.
Figure 19:
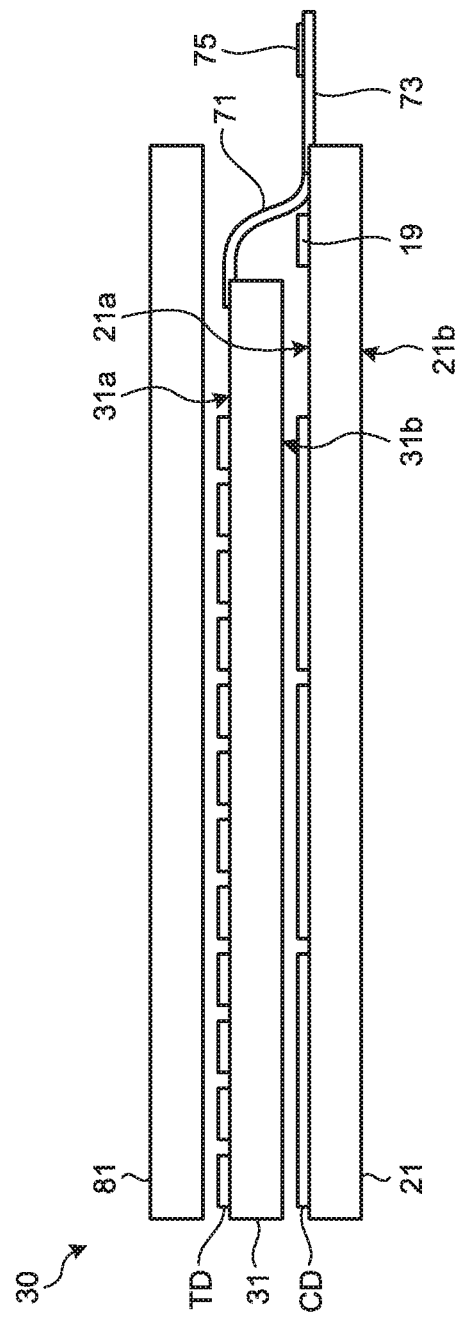
FIG. 19 is a side view of the display panel illustrated in FIG. 18.

FIG. 18 is a perspective view of an exemplary configuration of the drive electrodes and the touch detection electrodes in the display panel according to the first embodiment. FIG. 19 is a side view of the display panel illustrated in FIG. 18. As illustrated in FIGS. 18 and 19, the touch sensor 30 includes a plurality of drive electrodes CD, a plurality of touch detection electrodes TD, and a cover glass 81. The drive electrodes CD are provided to the TFT substrate 21. The touch detection electrodes TD are provided to the counter substrate 31. The TFT substrate 21, for example, has a first surface 21a and a second surface 21b positioned opposite to the first surface 21a. The counter substrate 31 has a first surface 31a and a second surface 31b positioned opposite to the first surface 31a. The first surface 21a of the TFT substrate 21 faces the second surface 31b of the counter substrate 31. The drive electrodes CD are provided on the first surface 21a of the TFT substrate 21, and the touch detection electrodes TD are provided on the first surface 31a of the counter substrate 31. Both of the drive electrodes CD and the touch detection electrodes TD are provided in the display region 10a.

The drive electrode CD has a quadrangular shape in planar view, for example. The touch detection electrode TD has a quadrangular shape in planar view, for example. Examples of the quadrangular shape include, but are not limited to, a square shape, a rectangular shape, etc. The drive electrode CD is larger than the touch detection electrode TD in planar view. The drive electrodes CD and a plurality of touch detection electrodes TD overlap in a planar view. One drive electrode CD, for example, and a plurality of touch detection electrodes TD overlap in a planar view. Capacitance is formed at the portions where the touch detection electrodes TD overlap the drive electrodes CD.

One end of the flexible substrate 71 is coupled to the frame region 10b of the TFT substrate 21, and the other end thereof is coupled to the frame region 10b of the counter substrate 31. One end of a flexible substrate 73 is coupled to the frame region 10b of the TFT substrate 21. As illustrated in FIGS. 18 and 19, the flexible substrate 73 is provided with a detection IC 75 including the detector 40 (refer to FIG. 1), for example. The touch detection electrodes TD are coupled to input terminals of the detection signal amplifier 42 (refer to FIG. 2) of the detector 40 via wiring provided to the flexible substrates 71 and 73. The drive electrodes CD are coupled to input terminals of the detection signal amplifier 42 of the detector 40 via wiring provided to the flexible substrate 73.

Figure 20:
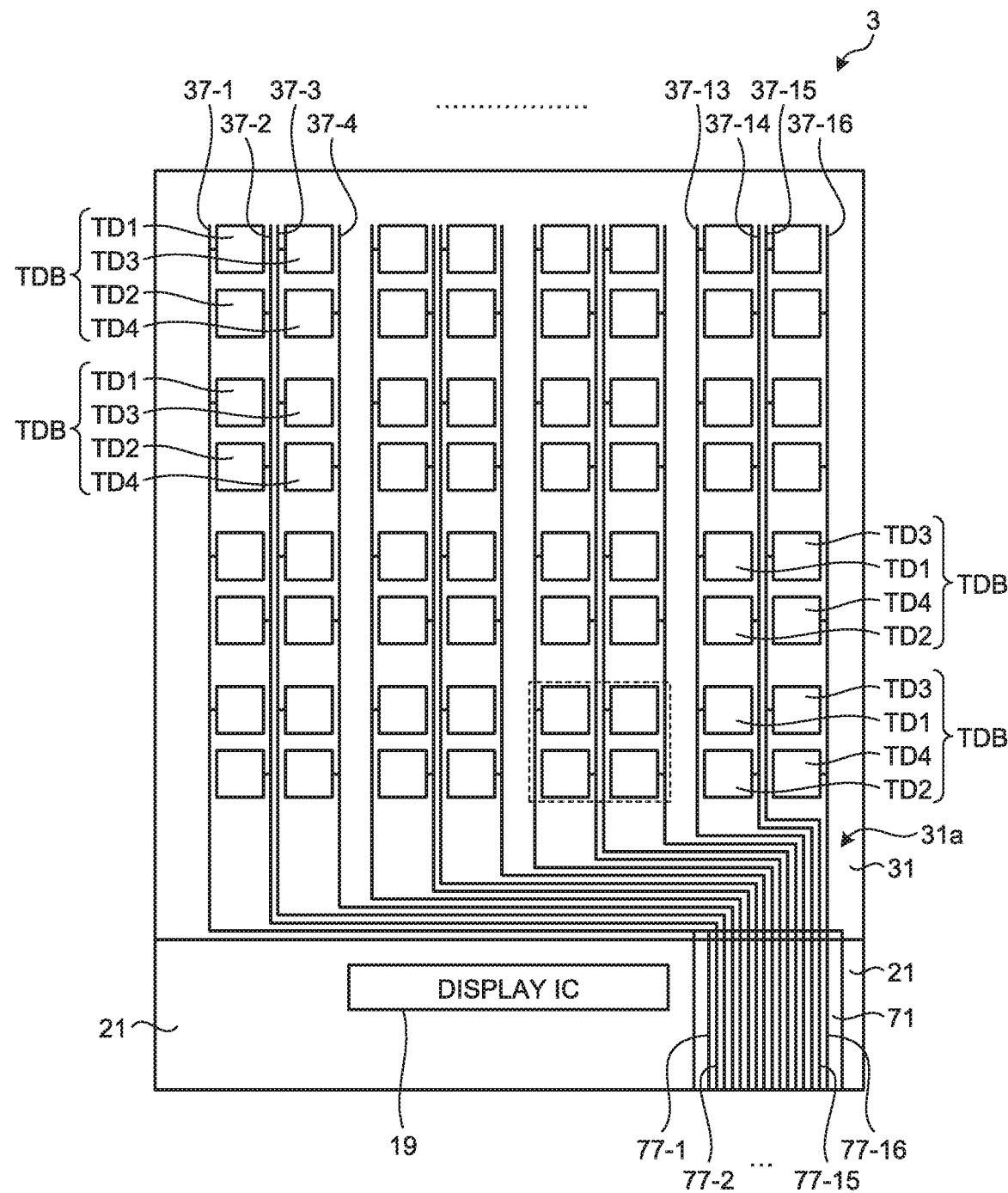
FIG. 20 is a plan view of a first exemplary configuration of a second substrate.

The following describes an exemplary configuration of the first substrate 2 and the second substrate 3 in greater detail. FIG. 20 is a plan view of a first exemplary configuration of the second substrate. As illustrated in FIG. 20, the second substrate 3 includes touch detection electrodes TD1, TD2, TD3, and TD4 as the touch detection electrodes TD. In the example illustrated in FIG. 20, 16 sets of the touch detection electrodes TD1, TD2, TD3, and TD4 are provided. The touch detection electrodes TD1, TD2, TD3, and TD4 have the same shape and the same size. The touch detection electrodes TD1, TD2, TD3, and TD4 are arrayed at regular intervals in the row direction and the column direction. While FIG. 20 illustrates four touch detection electrodes TD1 to TD4 as the touch detection electrodes TD, the number of touch detection electrodes TD is not limited thereto. The touch detection electrodes TD simply need to be a plurality of electrodes. More preferably, the same number of touch detection electrodes TD are arrayed in the row direction and the column direction.

In the row direction of the counter substrate 31, for example, the touch detection electrodes TD1 and TD3 are disposed side by side, and the touch detection electrodes TD2 and TD4 are disposed side by side. In the column direction, the touch detection electrodes TD1 and TD2 are disposed side by side, and the touch detection electrodes TD3 and TD4 are disposed side by side. In the example illustrated in FIG. 20, four touch detection electrodes TD1, TD2, TD3, and TD4 serve as one touch detection electrode block TDB. In the present configuration, 16 touch detection electrode blocks TDB are arrayed at regular intervals in the row direction and the column direction.

The second substrate 3 includes 16 wires 37-1 to 37-16 provided on the first surface 31*a* of the counter substrate 31. The wires 37-1 to 37-16 are each coupled to any one of the touch detection electrodes TD1, TD2, TD3, and TD4 and extend from the display region 10*a* (refer to FIG. 18) to the frame region 10*b* (refer to FIG. 18). The wire 37-1, for example, is coupled to the touch detection electrodes TD1, the wire 37-2 is coupled to the touch detection electrodes TD2, the wire 37-3 is coupled to the touch detection electrodes TD3, and the wire 37-4 is coupled to the touch detection electrodes TD4.

In the following description, the touch detection electrodes TD1, TD2, TD3, and TD4 and touch detection electrodes TD1 to TD16 (refer to FIG. 26), which will be described later, are referred to as the touch detection electrodes TD when they need not be distinguished from one another. The wires 37-1 to 37-16 are referred to as the wires 37 when they need not be distinguished from one another. The touch detection electrodes TD and the wires 37 are made of a translucent conductive material, such as ITO. The touch detection electrodes TD and the wires 37, for example, are a conductive layer produced simultaneously by the same process and are provided in the same layer. The touch detection electrodes TD and the wires 37 are not necessarily made of ITO and may be metal thin wires made of a metal material, for example.

The flexible substrate 71 is provided with 16 wires 77-1 to 77-16. The wires 77-1 to 77-16 are coupled to the wires 37-1 to 37-16, respectively, provided to the counter substrate 31. The wire 37-1, for example, is coupled to the wire 77-1, the wire 37-2 is coupled to the wire 77-2, the wire 37-15 is coupled to the wire 77-15, and the wire 37-16 is coupled to the wire 77-16. In the following description, the wires 77-1 to 77-16 are referred to as the wires 77 when they need not be distinguished from one another. The wires 77 are made of a conductive material, such as copper.

Figure 21:
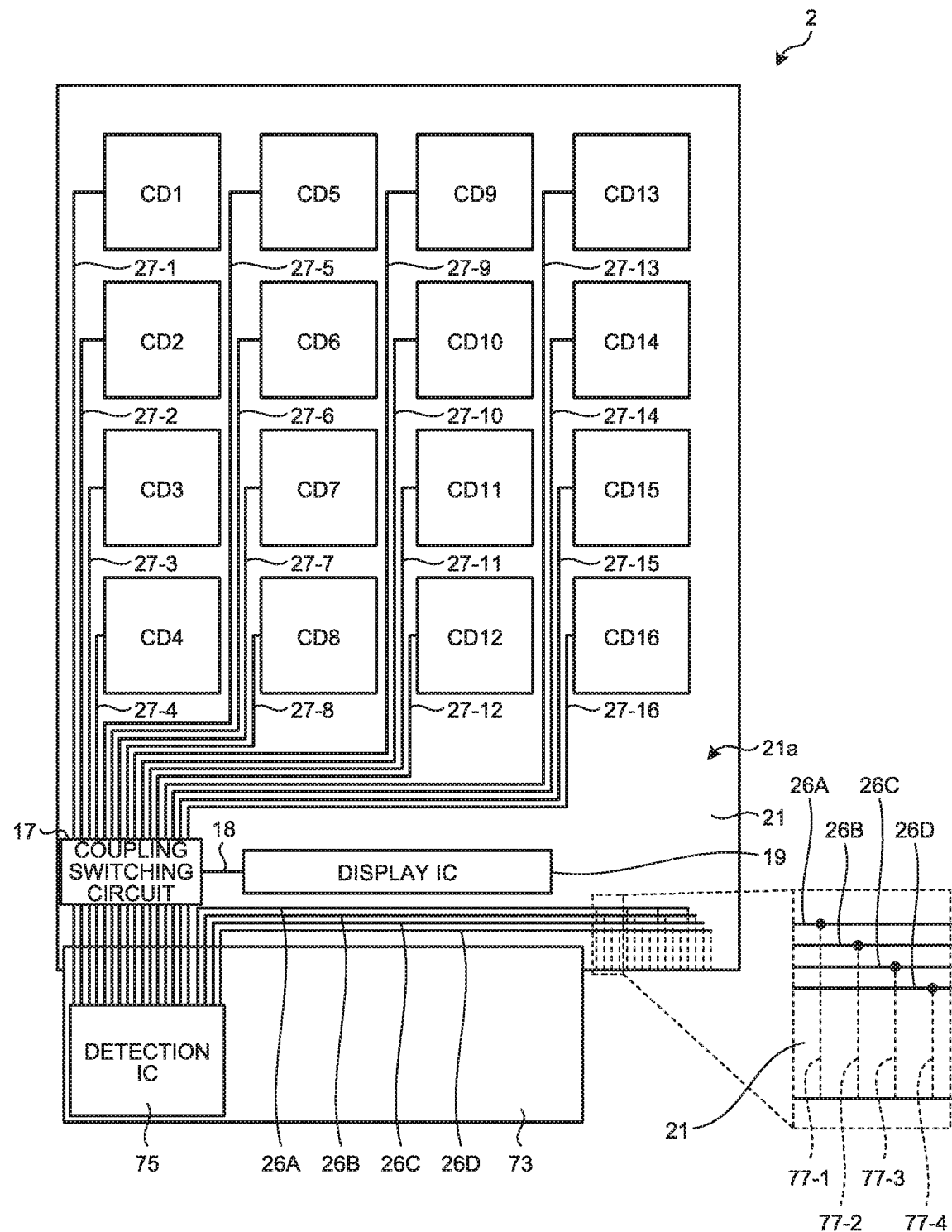
FIG. 21 is a plan view of a first exemplary configuration of a first substrate.

FIG. 21 is a plan view of a first exemplary configuration of the first substrate 2. As illustrated in FIG. 21, the first substrate 2 includes 16 drive electrodes CD1 to CD16 as the drive electrodes CD, for example. The drive electrodes CD1 to CD16 have a square shape or a rectangular shape in planar view, for example. The drive electrodes CD1 to CD16 have the same shape and the same size. The drive electrodes CD1 to CD16 are arrayed at regular intervals in the row direction and the column direction.

The first substrate 2 includes 16 wires 27-1 to 27-16 provided on the first surface 21*a* of the TFT substrate 21. The wires 27-1 to 27-16 are each coupled to any one of the drive electrodes CD1 to CD16 and extend from the display region 10*a* (refer to FIG. 18) to the frame region 10*b* (refer to FIG. 18). The wire 27-1, for example, is coupled to the drive electrode CD1, the wire 27-2 is coupled to the drive electrode CD2, the wire 27-3 is coupled to the drive electrode CD3, and the wire 27-4 is coupled to the drive electrodes CD4.

In the following description, the drive electrodes CD1 to CD16 are referred to as the drive electrodes CD when they need not be distinguished from one another. The wires 27-1 to 27-16 are referred to as the wires 27 when they need not be distinguished from one another. The drive electrodes CD and the wires 27 are made of a translucent conductive material, such as ITO. The drive electrodes CD and the wires 27, for example, are a conductive layer produced simultaneously by the same process and are provided in the same layer.

In the example illustrated in FIG. 21, the first substrate 2 includes four wires 26A, 26B, 26C, and 26D provided on the first surface 21*a* of the TFT substrate 21. As illustrated in FIGS. 20 and 21, in the first surface 21*a* of the TFT substrate 21, the wire 26A is coupled to four wires 37 (e.g., the wire 37-1) via respective four wires 77 (e.g., the wire 77-1) provided to the flexible substrate 71 and is coupled to 16 touch detection electrodes TD1. The wire 26B is coupled to four wires 37 (e.g., the wire 37-2) via respective four wires 77 (e.g., the wire 77-2) provided to the flexible substrate 71 and is coupled to 16 touch detection electrodes TD2. The wire 26C is coupled to four wires 37 (e.g., the wire 37-3) via respective four wires 77 (e.g., the wire 77-3) provided to the flexible substrate 71 and is coupled to 16 touch detection electrodes TD3. The wire 26D is coupled to four wires 37 (e.g., the wire 37-4) via respective four wires 77 (e.g., the wire 77-4) provided to the flexible substrate 71 and is coupled to 16 touch detection electrodes TD4. In the following description, the wires 26A to 26D and wires 26-1 to 26-16 (refer to FIG. 23), which will be described later, are referred to as the wires 26 when they need not be distinguished from one another. The wires 26 are made of a conductive material, such as copper. The wires 26 are provided in the frame region 10*b* (refer to FIG. 18) of the TFT substrate 21, for example.

As illustrated in FIG. 21, the wires 26 are coupled to the detection IC 75 via respective wires provided to the flexible substrate 73. The first substrate 2, for example, includes the coupling switching circuit 17 and a wire 18. The coupling switching circuit 17 is provided to the TFT substrate 21. The wire 18 is provided to the TFT substrate 21 to couple the coupling switching circuit 17 to the display IC 19. The wires 27 are coupled to the display IC 19 or the detection IC 75 by the coupling switching circuit 17. The coupling switching circuit 17 may be included in the display IC 19, the detection IC 75, or an IC (not illustrated) mounted on the TFT substrate 21 or the flexible substrate 73. An exemplary internal configuration of the coupling switching circuit 17 will be described later with reference to FIG. 24.

Figure 22:
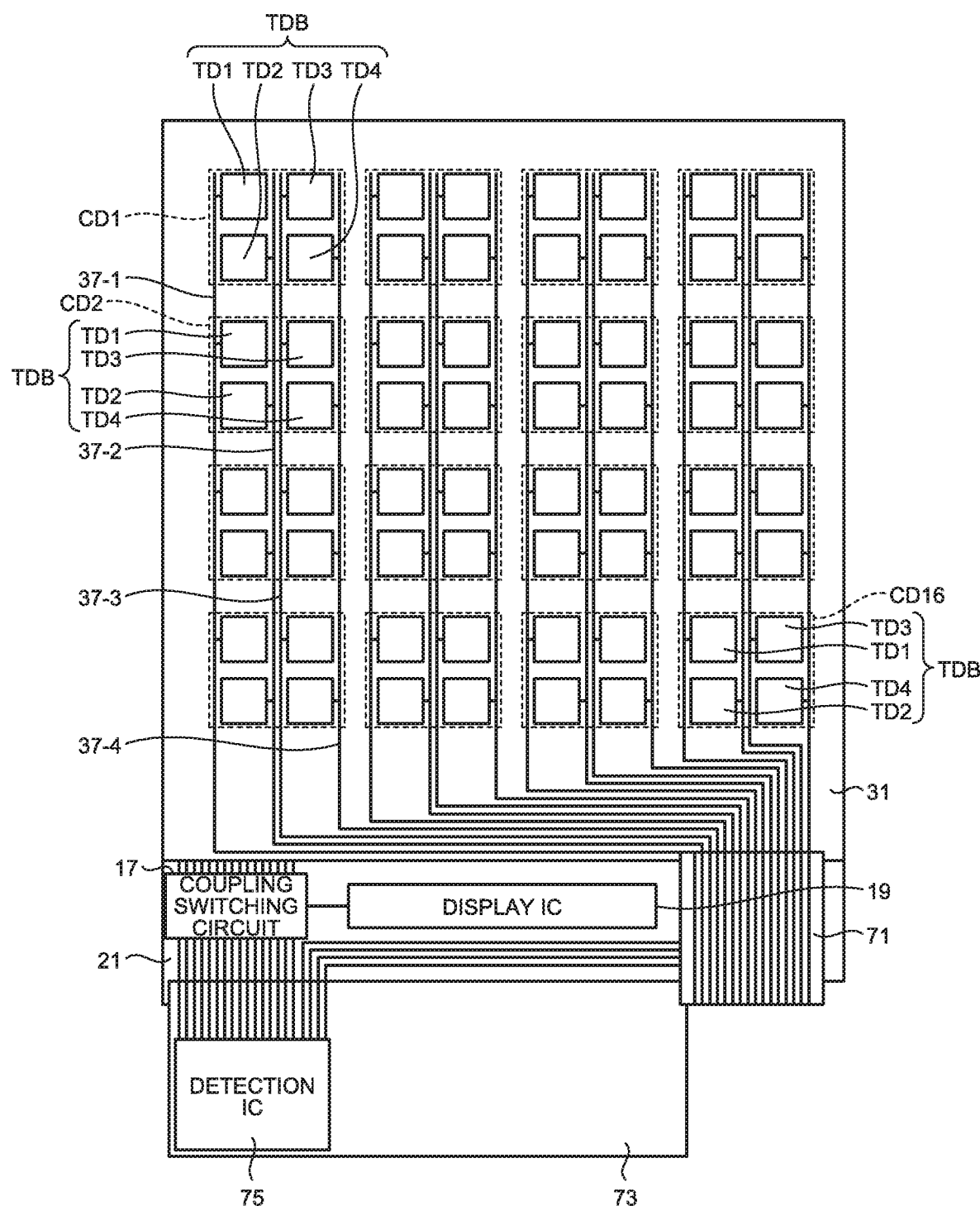
FIG. 22 is a diagram of a configuration obtained by placing the second substrate illustrated in FIG. 20 on top of the first substrate illustrated in FIG. 21.

FIG. 22 is a diagram of a configuration obtained by placing the second substrate illustrated in FIG. 20 on top of the first substrate illustrated in FIG. 21. As illustrated in FIG. 22, the touch detection electrode blocks TDB are disposed overlapping the drive electrodes CD. Four touch detection electrodes TD1 to TD4, for example, are disposed at positions overlapping one drive electrode CD in planar view. The four touch detection electrodes TD1 to TD4 serve as one touch detection electrode block TDB. One wire 37 couples the touch detection electrodes TD between the positions overlapping the respective drive electrodes CD in planar view. The wire 37-1, for example, couples the touch detection electrodes TD1 in the column direction at the positions overlapping the respective drive electrodes CD in planar view. The wire 37-2 couples the touch detection electrodes TD2 in the column direction at the positions overlapping the respective drive electrodes CD in planar view. The wire 37-3 couples the touch detection electrodes TD3 in the column direction at the positions overlapping the respective drive electrodes CD in planar view. The wire 37-4 couples the touch detection electrodes TD4 in the column direction at the positions overlapping the respective drive electrodes CD in planar view.

In other words, the touch detection electrodes TD1 are disposed at the same position with respect to the respective drive electrodes CD between the different drive electrodes CD. The position of the touch detection electrode TD1 overlapping the drive electrode CD1 in planar view with respect to the drive electrode CD1, for example, is the same as the position of the touch detection electrode TD1 overlapping the drive electrode CD2 in planar view with respect to the drive electrode CD2. Similarly, the touch detection electrodes TD2 are disposed at the same position with respect to the respective drive electrodes CD between the different drive electrodes CD. The touch detection electrodes TD3 are disposed at the same position with respect to the respective drive electrodes CD between the different drive electrodes CD. The touch detection electrodes TD4 are disposed at the same position with respect to the respective drive electrodes CD between the different drive electrodes CD. One wire 37 couples the touch detection electrodes TD disposed at the same position with respect to the respective drive electrodes CD between the different drive electrodes CD. The wire 37-1, for example, couples the touch detection electrodes TD1 disposed at the same position with respect to the respective drive electrodes CD between the different drive electrodes CD. The wire 37-2 couples the touch detection electrodes TD2 disposed at the same position with respect to the respective drive electrodes CD between the different drive electrodes CD. The wire 37-3 couples the touch detection electrodes TD3 disposed at the same position with respect to the respective drive electrodes CD between the different drive electrodes CD. The wire 37-4 couples the touch detection electrodes TD4 disposed at the same position with respect to the respective drive electrodes CD between the different drive electrodes CD.

Figure 23:
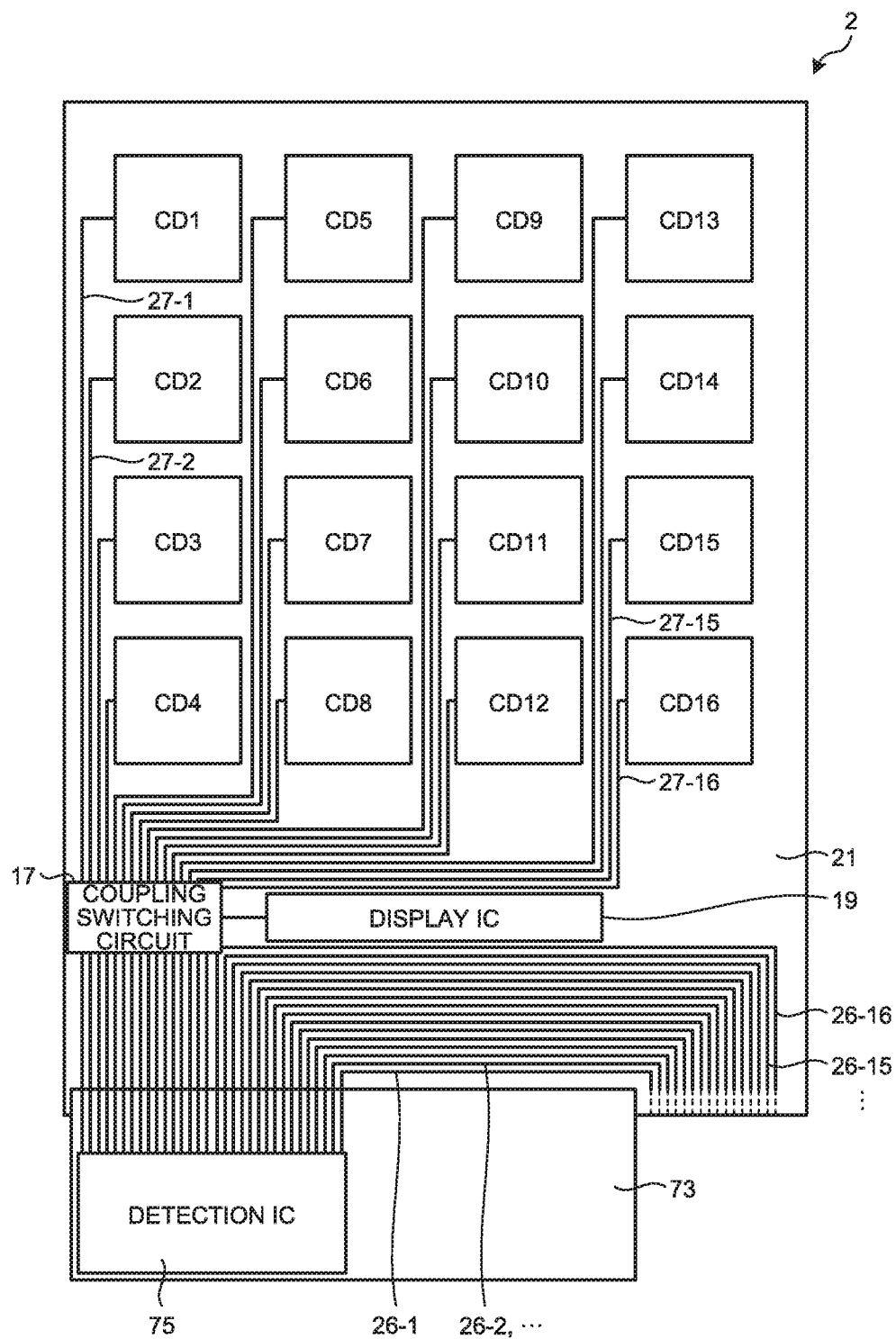
FIG. 23 is a plan view of a second exemplary configuration of the first substrate.

FIG. 23 is a plan view of a second exemplary configuration of the first substrate. As illustrated in FIG. 23, the first substrate 2 may include 16 wires 26-1 to 26-16 as the wires 26 provided to the TFT substrate 21. With this configuration, the 16 wires 26-1 to 26-16 provided to the TFT substrate 21 can respectively be coupled to the 16 wires 37-1 to 37-16 in one-to-one correspondence via the wires 77 of the flexible substrate 71 illustrated in FIG. 20. This configuration can couple four touch detection electrodes TD1 in units of one column and couple them to the detection IC via respective independent wires. This configuration can couple four touch detection electrodes TD2 in units of one column and couple them to the detection IC via respective independent wires. Similarly, this configuration can couple four touch detection electrodes TD3 and TD4 in units of one column and couple them to the detection IC via respective independent wires.

To perform mutual capacitance touch detection, the detector 40 checks the positions of the drive electrodes CD1 to CD16 to which the detection drive signals Vcom are supplied against the wires 26-1 to 26-16 from which the detection signals Vdet1 are output. If the drive signals Vcom are supplied to the drive electrodes CD1 to CD16 simultaneously, the detector 40 can determine whether a touch is detected on the touch detection electrodes TD1 to TD4 one by one.

Figure 24:
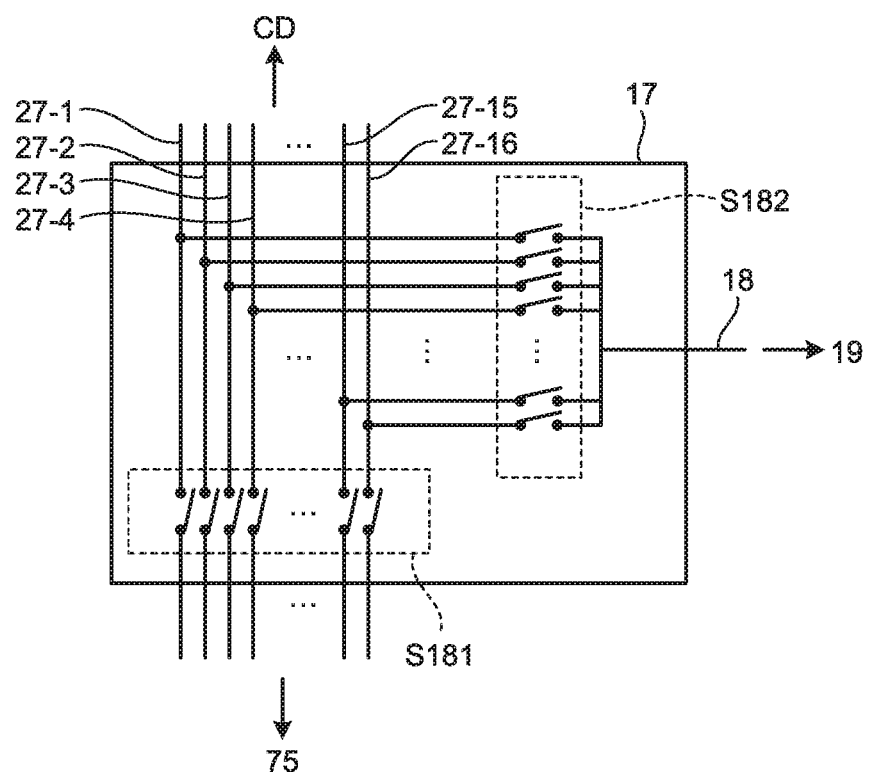
FIG. 24 is diagram of an example of a coupling switching circuit.

FIG. 24 is diagram of an example of the coupling switching circuit. As illustrated in FIG. 24, the coupling switching circuit 17 includes switches S181 and switches S182. The switches S181 switch between coupling and decoupling the wires 27 to and from the detection IC 75. The switches S182 switch between coupling and decoupling the wires 27 to and from the display IC 19. In the display operation periods Pd1 and Pd2 (refer to FIG. 17), for example, the switches S181 are turned off, and the switches S182 are turned on. As a result, the drive electrodes CD are coupled to the display IC 19 via the respective wires 27 and the respective switches S182. In the detection operation periods Pt1 and Pt2, the switches S181 are turned on, and the switches S182 are turned off. As a result, the drive electrodes CD are coupled to the detection IC 75 via the respective wires 27, the respective switches S181, and the respective wires 77 (refer to FIG. 20) provided to the flexible substrate 71. The switches S181 and S182 are turned on and off by the drive electrode driver 14 (refer to FIG. 1), for example.

Figure 25:
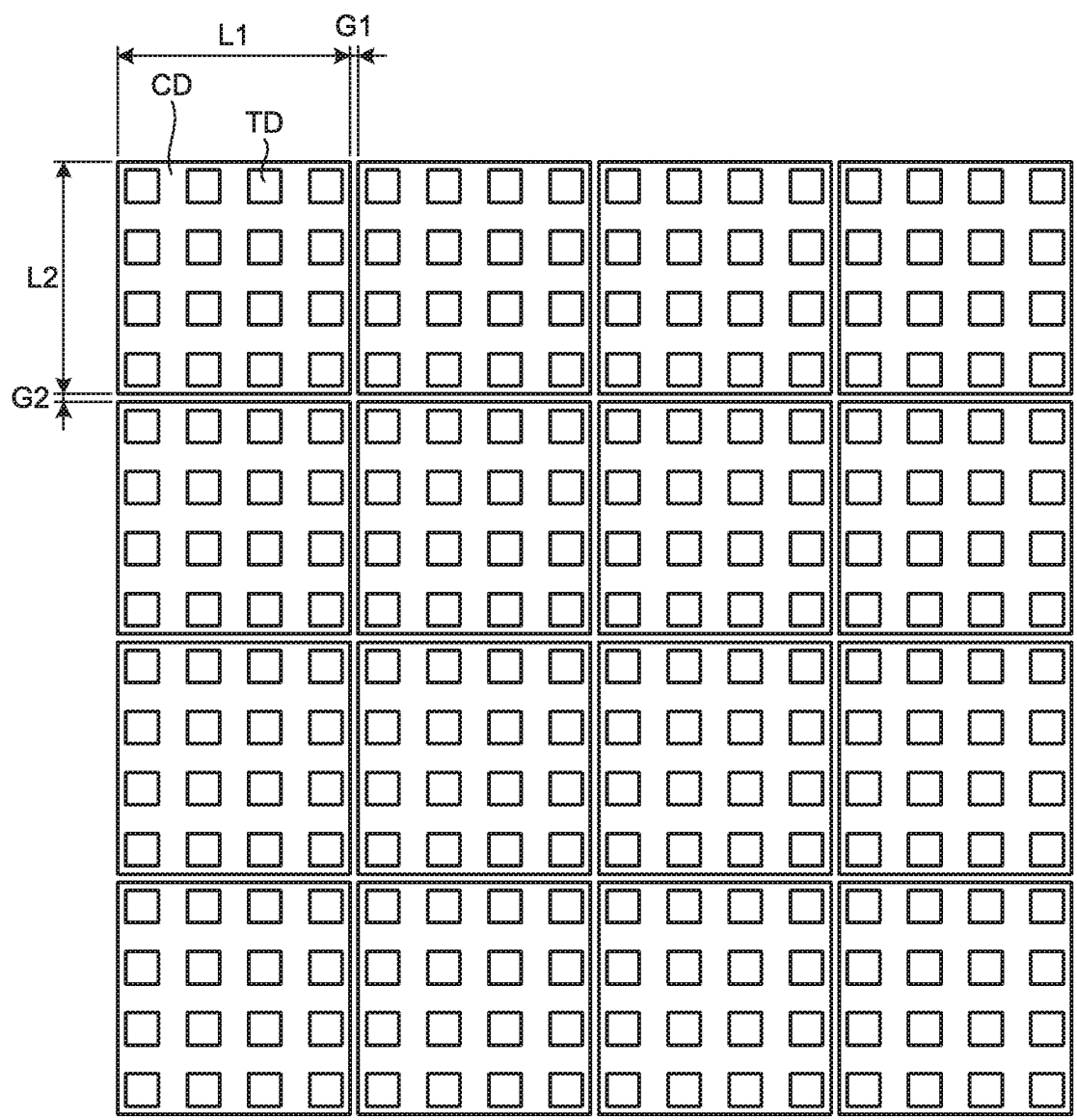
FIG. 25 is a diagram of an example of the touch detection electrodes and the drive electrodes.
Figure 26:
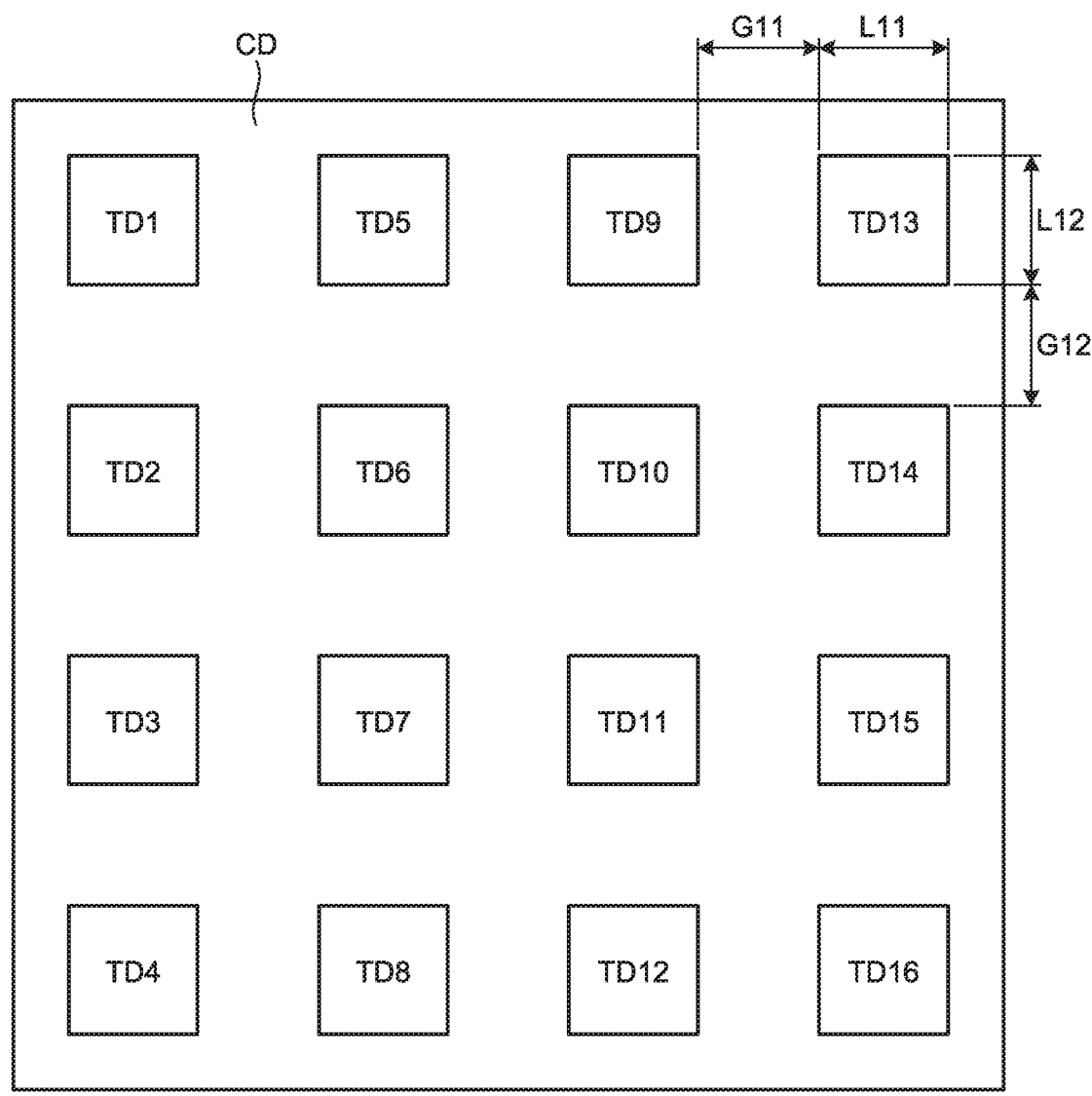
FIG. 26 is an enlarged view of part of FIG. 25.

FIG. 25 is a diagram of an example of the touch detection electrodes and the drive electrodes. FIG. 26 is an enlarged view of part of FIG. 25. As illustrated in FIGS. 25 and 26, in the second exemplary configuration of the touch sensor 30, 16 touch detection electrodes TD1 to TD16 serving as the touch detection electrodes TD are disposed at positions overlapping one drive electrode CD in planar view. The touch detection electrodes TD1 to TD16 have the same shape and the same size and are arrayed at regular intervals in the row direction and the column direction. In the example illustrated in FIGS. 25 and 26, the 16 touch detection electrodes TD1 to TD16 serve as one touch detection electrode block.

As illustrated in FIG. 25, when L1 is the length of one side in the row direction out of the four sides of the drive electrode CD, and L2 is the length of one side in the column direction, the length L1 is 20 mm to 30 mm, and the length L2 is 20 mm to 30 mm, for example. If the lengths L1 and L2 are shorter than 20 mm, the capacitance of the drive electrode CD is so small that the sensitivity in hover detection may possibly be reduced. If the lengths L1 and L2 are longer than 30 mm, the area of the drive electrode CD is so large that the positional accuracy in hover detection may possibly be reduced. If the lengths L1 and L2 are 20 mm to 30 mm, both of the sensitivity and the positional accuracy in hover detection can be increased. As illustrated in FIG. 25, when G1 is the distance between the drive electrodes CD disposed side by side in the row direction, and G2 is the distance between the drive electrodes CD disposed side by side in the column direction, G1 is 0 mm to 1 mm, and G2 is 0 mm to 1 mm. To prevent effects on display and reduction in the detection sensitivity, the distances (electrode intervals) G1 and G2 between the drive electrodes CD are preferably minimized to the manufacturing limits. More specifically, G1 and G2 are preferably 0 µm to 10 µm.

As illustrated in FIG. 26, when L11 is the length of one side in the row direction out of the four sides of the touch detection electrode TD, and L12 is the length of one side in the column direction, the length L11 is 4 mm to 5 mm, and the length L12 is 4 mm to 5 mm, for example. When G11 is the distance between the touch detection electrodes TD disposed side by side in the row direction, and G12 is the distance between the touch detection electrodes TD disposed side by side in the column direction, G11 is 0 mm to 20 mm, and G12 is 0 mm to 20 mm. To prevent reduction in the detection sensitivity, the electrode intervals G11 and G12 are preferably minimized to the manufacturing limits. The electrode intervals G11 and G12, however, need to include an area provided with the wires coupled to the touch detection electrodes TD. More specifically, G11 and G12 are preferably 0 mm to 1 mm.

Figure 27:
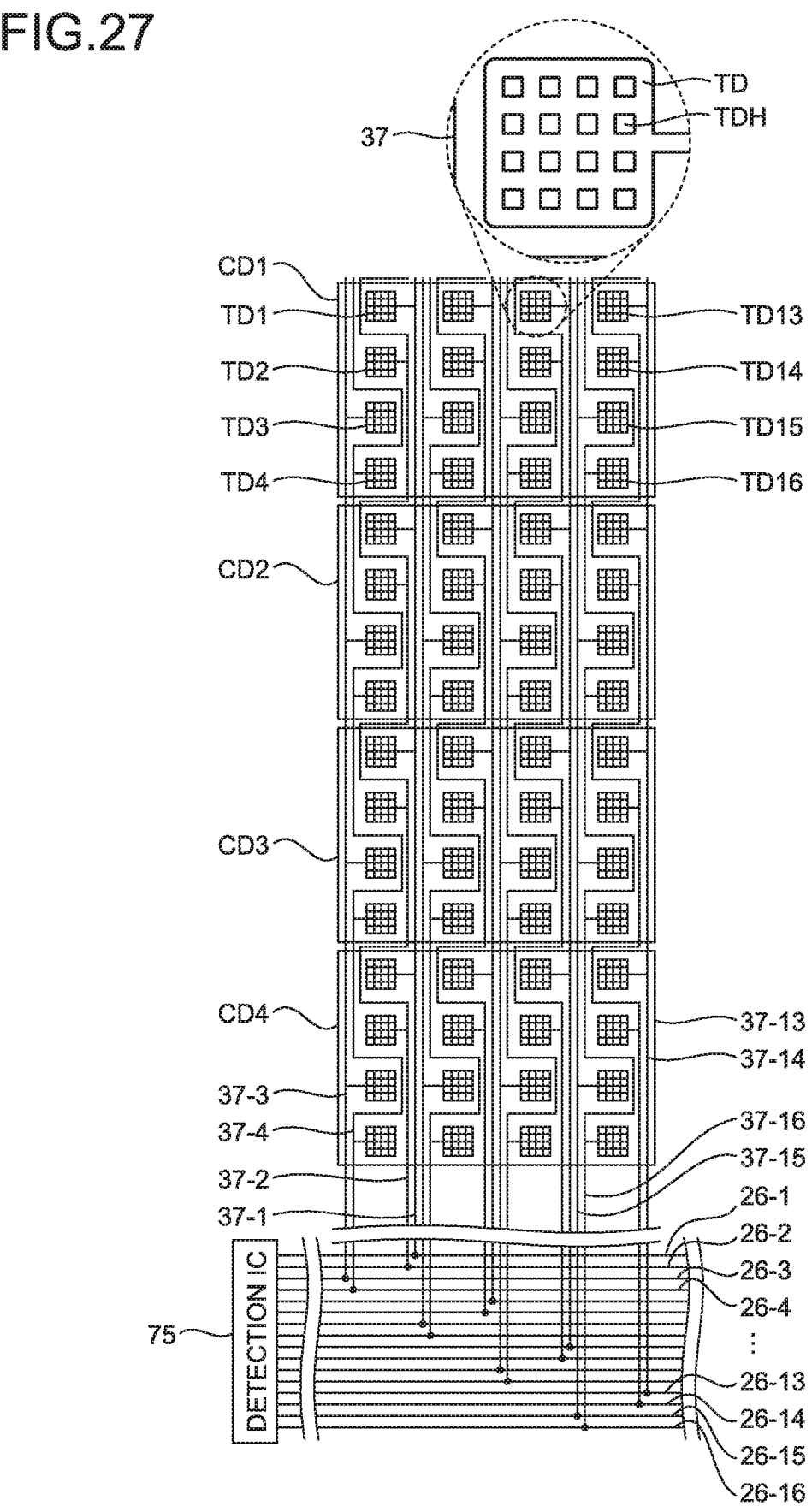
FIG. 27 is a diagram of a first specific example of the touch detection electrodes illustrated in FIG. 25.

FIG. 27 is a diagram of a first specific example of the touch detection electrodes illustrated in FIG. 25. As illustrated in FIG. 27, the shape of the touch detection electrode TD in planar view may be a square with rounded corners. The touch detection electrode TD may have a plurality of through holes TDH bored from the upper surface to the lower surface. The through holes TDH formed in the touch detection electrodes TD can facilitate formation of capacitance between the drive electrodes CD and an object to be detected through the through holes TDH in hover detection. Consequently, the present configuration can increase the sensitivity in hover detection.

In FIG. 27, four touch detection electrodes TD1 arrayed in the column direction at positions overlapping the drive electrodes CD1 to CD4 are coupled to one continuous wire 37-1, for example. The wire 37-1 is not coupled to the other wires 37-2 to 37-16 and is coupled to the wire 26-1 provided to the TFT substrate 21 via the wire 77-1 (refer to FIG. 20) provided to the flexible substrate 71. Similarly to the touch detection electrodes TD1, the touch detection electrodes TD2 to TD16 are coupled to the continuous wires 37-2 to 37-16, respectively. The wires 37-2 to 37-16 are coupled to the wires 26-2 to 26-16 provided to the TFT substrate 21 via the wires 77-2 to 77-16 (refer to FIG. 20) provided to the flexible substrate 71, respectively.

Also in the drive electrodes CD5 to CD8, CD9 to CD12, and CD13 to CD16, which are not illustrated, the touch detection electrodes TD1 to TD16 are coupled to the continuous wires 37-1 to 37-16, respectively. The wires 37-1 to 37-16 are coupled to the wires 26-1 to 26-16 provided to the TFT substrate 21 via the wires 77-1 to 77-16 provided to the flexible substrate 71, respectively.

Figure 28:
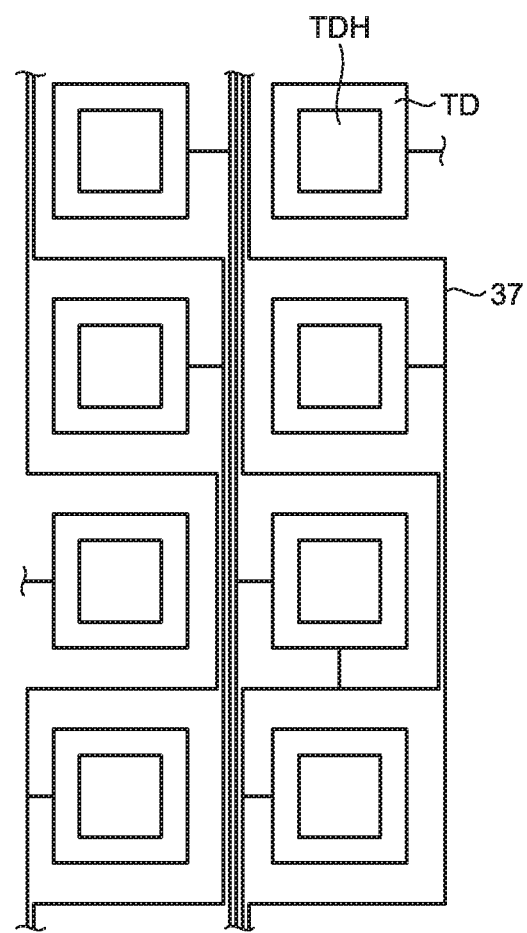
FIG. 28 is a diagram of a second specific example of the touch detection electrodes illustrated in FIG. 25.

FIG. 28 is a diagram of a second specific example of the touch detection electrodes illustrated in FIG. 25. As illustrated in FIG. 28, the through holes TDH may be formed at the center of the touch detection electrodes TD in planar view. Not a plurality of through holes TDH but one through hole TDH may be formed in one touch detection electrode TD. Also in this structure, the through holes TDH can facilitate formation of capacitance between the drive electrodes CD and an object to be detected through the through holes TDH in hover detection. Consequently, the present configuration can increase the sensitivity in hover detection. If the touch detection electrodes TD and the wires 37 illustrated in FIGS. 27 and 28 have a large size and a large width, respectively, they are preferably made of a translucent conductive material, such as ITO.

Figure 29:
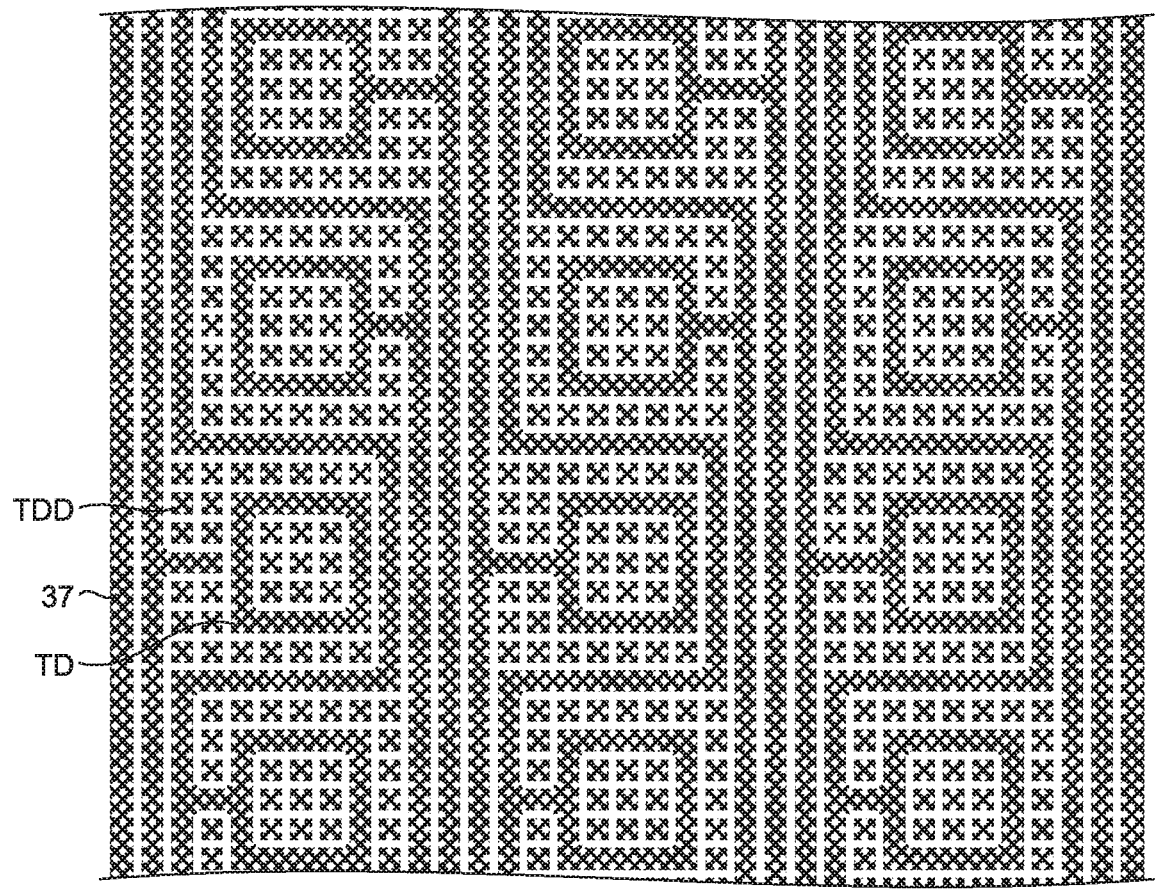
FIG. 29 is a diagram of a third specific example of the touch detection electrodes illustrated in FIG. 25.

FIG. 29 is a diagram of a third specific example of the touch detection electrodes illustrated in FIG. 25. As illustrated in FIG. 29, the touch detection electrodes TD and the wires 37 may include mesh-shaped metal thin wires, for example. The mesh-shaped metal thin wires may be made of a metal material including one or more of aluminum, copper, silver, molybdenum, chromium, and tungsten, for example. Alternatively, the mesh-shaped metal thin wires may be made of an alloy including one or more of these metal materials. Still alternatively, the mesh-shaped metal thin wires may be a multilayered body including a plurality of conductive layers made of these metal materials or an alloy including one or more of these metal materials. The metal materials described above have resistance lower than that of translucent conductive oxide, such as ITO.

The width of the metal thin wires constituting the mesh-shaped metal thin wires is preferably 1 µm to 10 µm and more preferably 1 µm to 5 µm. If the width of the metal thin wires is 10 µm or smaller, the area of a portion covering apertures is reduced in the display region 10a, making the aperture ratio less likely to be reduced. The apertures correspond to areas in which transmission of light is not suppressed by a black matrix or the gate lines GCL and the data lines SGL. If the width of the metal thin wires is 1 µm or larger, the mesh-shaped metal thin wires have a stable shape, thereby being less likely to be broken.

The touch detection electrodes TD and the wires 37 do not necessarily include mesh-shaped metal thin wires and may include a plurality of zigzag-line-shaped or wavy-line-shaped metal thin wires, for example. Dummy electrodes TDD not serving as detection electrodes may be provided between the touch detection electrodes TD disposed side by side, the wires 37 disposed side by side, or the touch detection electrode TD and the wire 37 disposed side by side. The dummy electrodes TDD are not electrically coupled to any component. Similarly to the touch detection electrodes TD and the wires 37, the dummy electrodes TDD may include mesh-shaped, zigzag-line-shaped, or wavy-line-shaped metal thin wires. With the dummy electrodes TDD provided to the areas not provided with the touch detection electrodes TD or the wires 37, the touch detection electrodes TD and the wires 37 can be made inconspicuous if they include metal thin wires.

Figure 30:
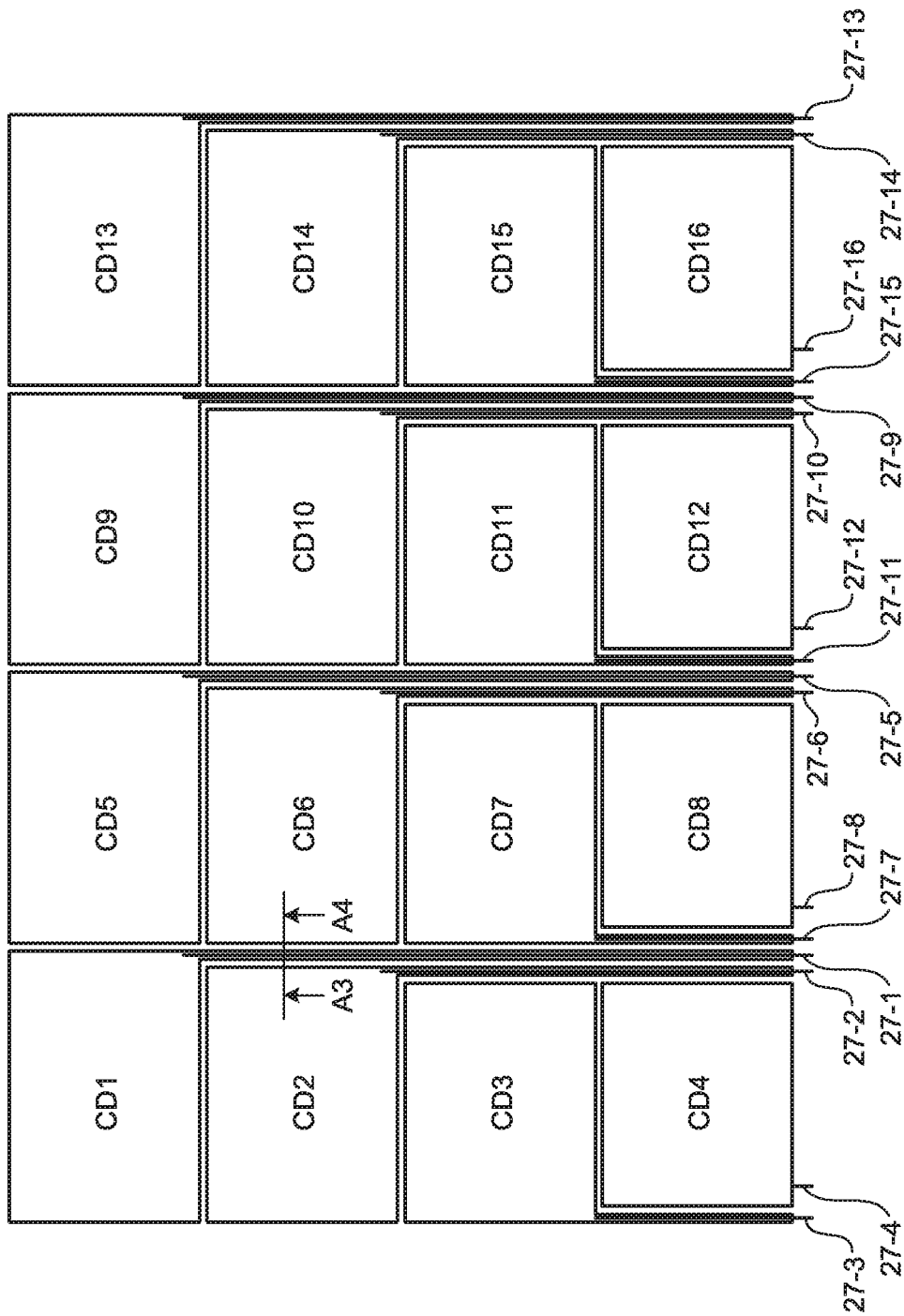
FIG. 30 is a diagram of a first exemplary configuration of wires coupled to the drive electrodes.
Figure 31:
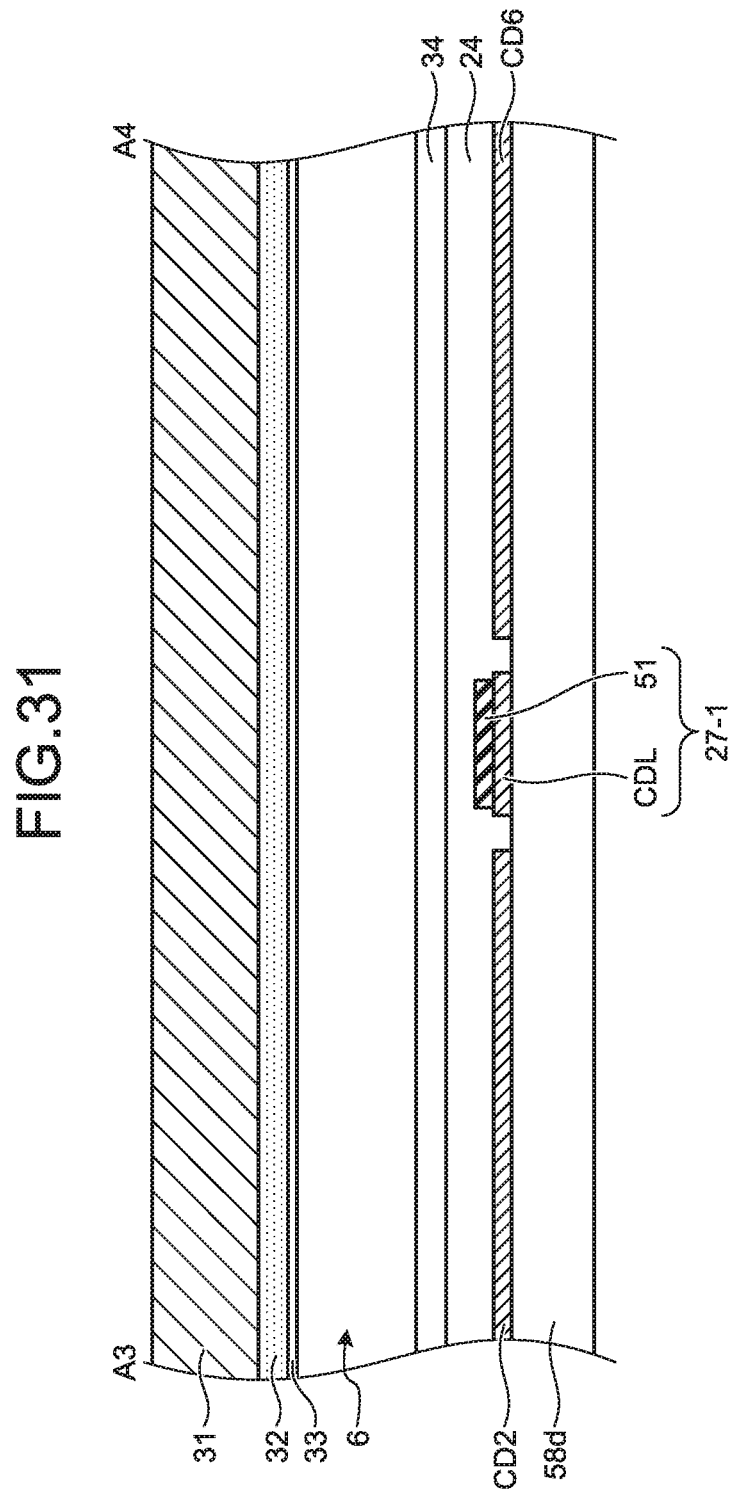
FIG. 31 is a sectional view of an area including the drive electrodes and the wires along line A3-A4 in FIG. 30.

FIG. 30 is a diagram of a first exemplary configuration of the wires coupled to the drive electrodes. FIG. 31 is a sectional view of an area including the drive electrodes and the wires along line A3-A4 in FIG. 30. As illustrated in FIG. 30, the wires 27 coupled to the respective drive electrodes CD may extend from the ends of the respective drive electrodes CD to the frame region 10b (refer to FIG. 18) on the lower side in planar view. The wires 27 may extend between the drive electrodes disposed side by side. As illustrated in FIG. 30, the drive electrodes CD disposed closer to the lower side in planar view may have a size smaller than that of the drive electrodes CD disposed closer to the upper side in planar view. As described above, if the lengths L1 and L2 (refer to FIG. 25) of the drive electrode CD are 20 mm to 30 mm, both of the detection sensitivity and the positional accuracy in hover detection can be increased.

As illustrated in FIG. 31, the wires 27 may each include an electrode wire CDL and a metal wire 51 provided to the same layer as that of the drive electrodes CD. The metal wire 51 is made of a metal material, such as molybdenum, tungsten, titanium, aluminum, silver, copper, and chromium or an alloy obtained by combining these metal materials. The metal wire 51 may have a single-layered structure or a multilayered structure including layers made of two or more of the metal materials described above. The metal wire 51 may be provided directly on the upper surface or the lower surface of the electrode wire CDL. In FIG. 31, the wire 27-1 includes the electrode wire CDL and the metal wire 51 provided directly on the upper surface of the electrode wire CDL. With the metal wire 51 provided on the upper surface or the lower surface of the electrode wire CDL, electrical resistance of the wire 27 can be reduced compared with a case where the metal wire 51 is not provided. As a result, the wire 27 can be made thinner. Consequently, this configuration can reduce the distance G1 (refer to FIG. 25) between the drive electrodes CD disposed side by side in the row direction.

Figure 32:
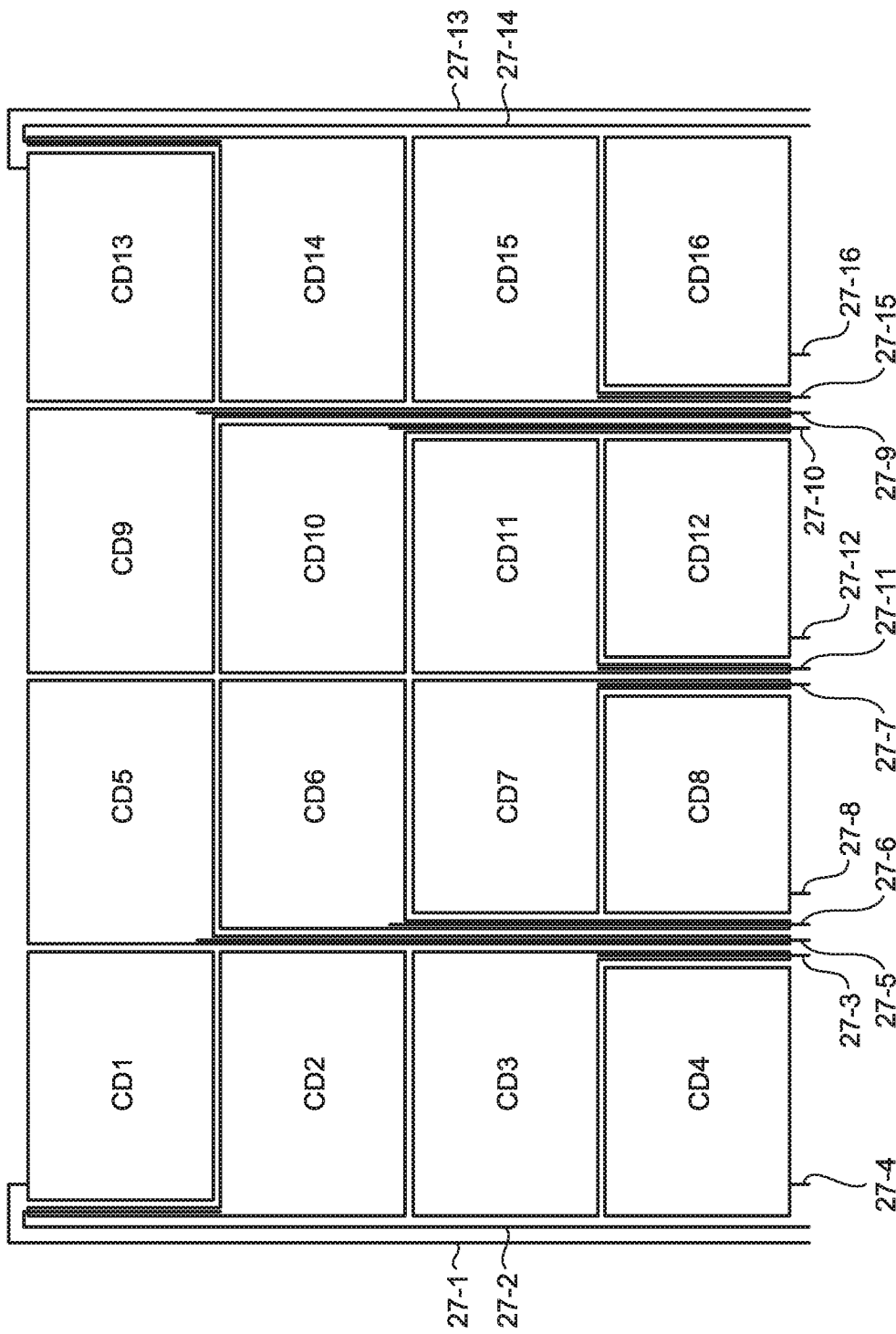
FIG. 32 is a diagram of a second exemplary configuration of the wires coupled to the drive electrodes.

FIG. 32 is a diagram of a second exemplary configuration of the wires coupled to the drive electrodes. As illustrated in FIG. 32, the wires 27 coupled to the respective drive electrodes CD may extend from the ends of the respective drive electrodes CD to the frame region 10*b* (refer to FIG. 18) on the upper side in planar view. The wires 27 extending toward the upper side may extend through the frame region 10*b* on the left side or the right side of the display region 10*a* (refer to FIG. 18) and reach the frame region 10*b* on the lower side in planar view. In FIG. 32, the wires 27-2 and 27-14 coupled to the drive electrodes CD2 and CD14, respectively, extend to the frame region 10*b* on the upper side in planar view. The wires 27 coupled to the respective drive electrodes CD may each include only the metal wire 51 (refer to FIG. 31). As illustrated in FIG. 32, for example, only the metal wire 51 may be provided as the wires 27-1 and 27-13 coupled to the drive electrodes CD1 and CD13, respectively, positioned on the upper corners of the display region 10*a* in planar view. In this case, one end of the metal wires 51 may be disposed on the upper surface or the lower surface of the drive electrodes CD1 and CD13. Also in this case, the drive electrodes CD1 and CD13 can be coupled to the display IC 19 (refer to FIG. 18) and the detection IC 75 (refer to FIG. 18) via the respective metal wires 51.

Figure 33:
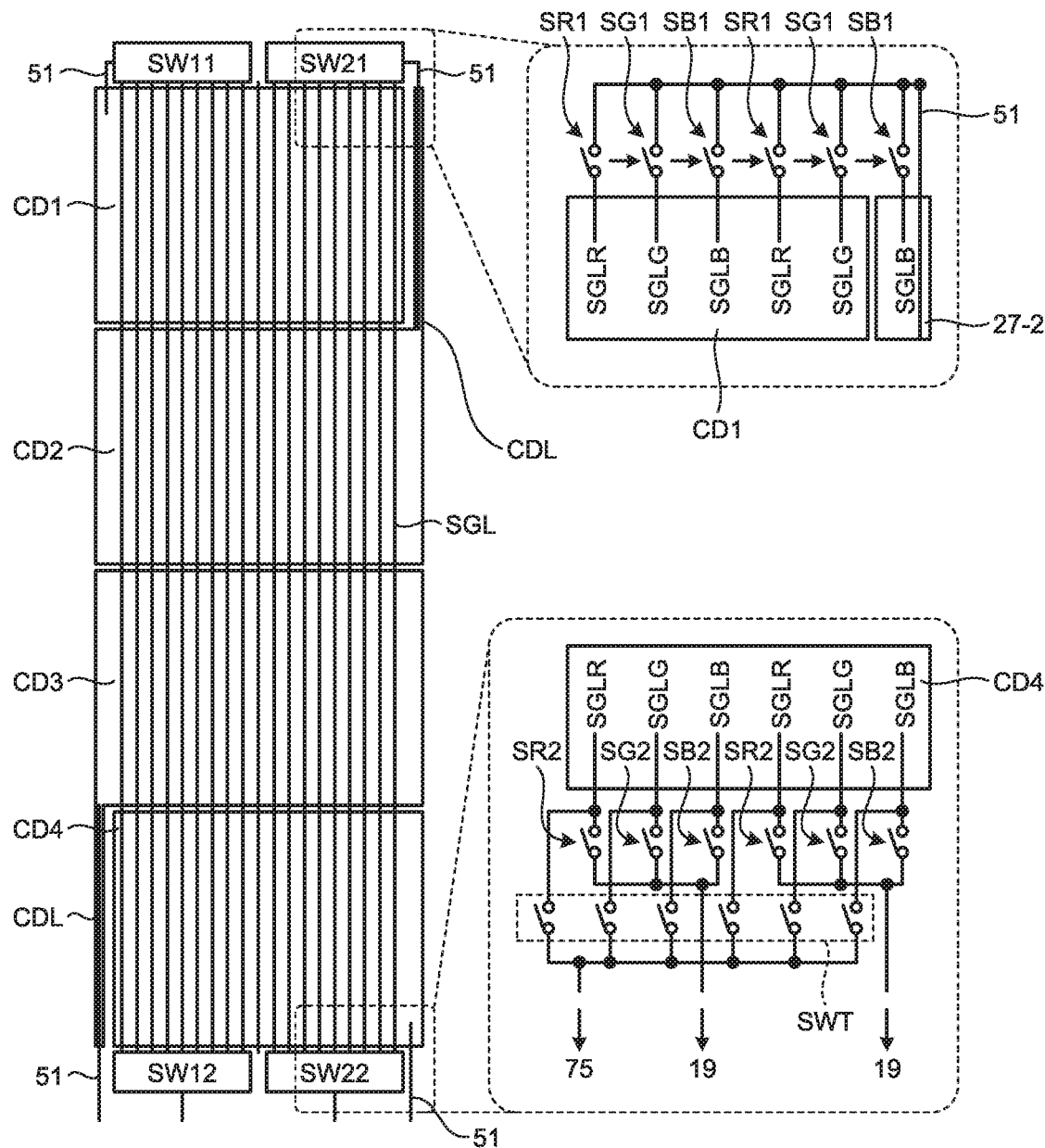
FIG. 33 is a diagram of a third exemplary configuration of the wires coupled to the drive electrodes.

FIG. 33 is a diagram of a third exemplary configuration of the wires coupled to the drive electrodes. As illustrated in FIG. 33, the drive electrodes CD may be coupled to the display IC 19 (refer to FIG. 18) and the detection IC 75 (refer to FIG. 18) via the data lines SGL or the gate lines GCL. This configuration can reduce the area occupied by the wires 27 between the drive electrodes CD disposed side by side and in the frame region 10*b* (refer to FIG. 18).

As illustrated in FIG. 33, for example, a plurality of data lines SGL extend in the column direction in a manner overlapping the drive electrodes CD1 to CD4. The frame region 10*b* on the upper side of the drive electrode CD1 in planar view is provided with two coupling circuits SW11 and SW21 coupled to the data lines SGL. The frame region 10*b* on the lower side of the drive electrode CD4 in planar view is provided with coupling circuits SW12 and SW22 coupled to the data lines SGL. A plurality of data lines SGL positioned on the left side in planar view out of the data lines SGL extending in a manner overlapping the drive electrodes CD1 to CD4 are coupled to the coupling circuits SW11 and SW12. A plurality of data lines SGL positioned on the right side in planar view are coupled to the coupling circuits SW21 and SW22. The drive electrode CD1 is coupled to the coupling circuit SW11 via the metal wire 51. The drive electrode CD2 is coupled to the coupling circuit SW21 via the wire 27-2 and the metal wire 51.

As illustrated in FIG. 33, the coupling circuit SW21 includes switching elements SR1, SG1, and SB1. The switching element SR1 couples or decouples the metal wire 51 to or from a data line SGLR that supplies the pixel signal Vpix to the sub-pixel SPix corresponding to the color area 32R. The switching element SG1 couples or decouples the metal wire 51 to or from a data line SGLG that supplies the pixel signal Vpix to the sub-pixel SPix corresponding to the color area 32G. The switching element SB1 couples or decouples the metal wire 51 to or from a data line SGLB that supplies the pixel signal Vpix to the sub-pixel SPix corresponding to the color area 32B.

The coupling circuit SW22 includes switching elements SR2, SG2, and SB2. The switching element SR2 couples or decouples the data line SGLR to or from the display IC 19. The switching element SG2 couples or decouples the data line SGLG to or from the display IC 19. The switching element SB2 couples or decouples the data line SGLB to or from the display IC 19. The coupling circuit SW22 also includes a switching element SWT that couples or decouples the data lines SGLR, SGLG, and SGLB to or from the detection IC 75.

Figure 34:
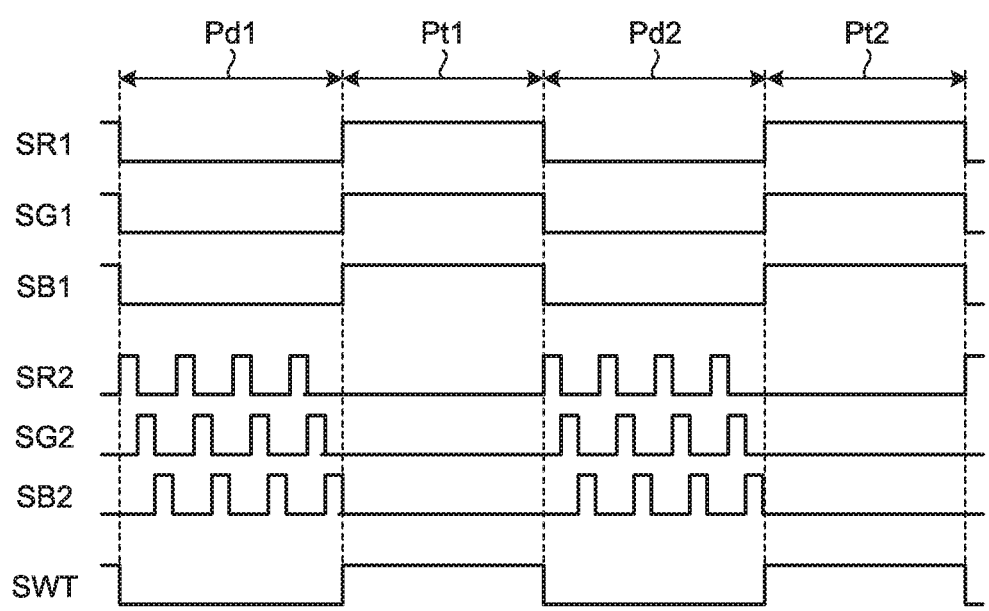
FIG. 34 is a chart of switching timings in coupling circuits illustrated in FIG. 33.

FIG. 34 is a chart of switching timings in the coupling circuits illustrated in FIG. 33. As illustrated in FIG. 34, all the switching elements SR1, SG1, SB1, and SWT are turned off in the display operation periods Pd1 and Pd2. In the display operation periods Pd1 and Pd2, the switching elements SR2, SG2, and SB2 are alternately turned on and off. When the switching element SR2 is turned on, for example, the switching elements SG2 and SB2 are turned off. When the switching element SG2 is turned on, the switching elements SR2 and SB2 are turned off. When the switching element SB2 is turned on, the switching elements SR2 and SG2 are turned off. As a result, the data lines SGLR, SGLG, and SGLB are alternately coupled to the display IC 19. By contrast, all the switching elements SR1, SG1, SB1, and SWT are turned on in the detection operation periods Pt1 and Pt2. In the detection operation periods Pt1 and Pt2, all the switching elements SR2, SG2, and SB2 are turned off. As a result, all the data lines SGLR, SGLG, and SGLB are coupled to the detection IC 75 in the detection operation periods Pt1 and Pt2. In the example illustrated in FIGS. 33 and 34, the coupling circuits SW11 and SW12 serve as the coupling switching circuit 17 (refer to FIG. 21) for the drive electrode CD1. The coupling circuits SW21 and SW22 serve as the coupling switching circuit 17 for the drive electrode CD2.

Figure 35:
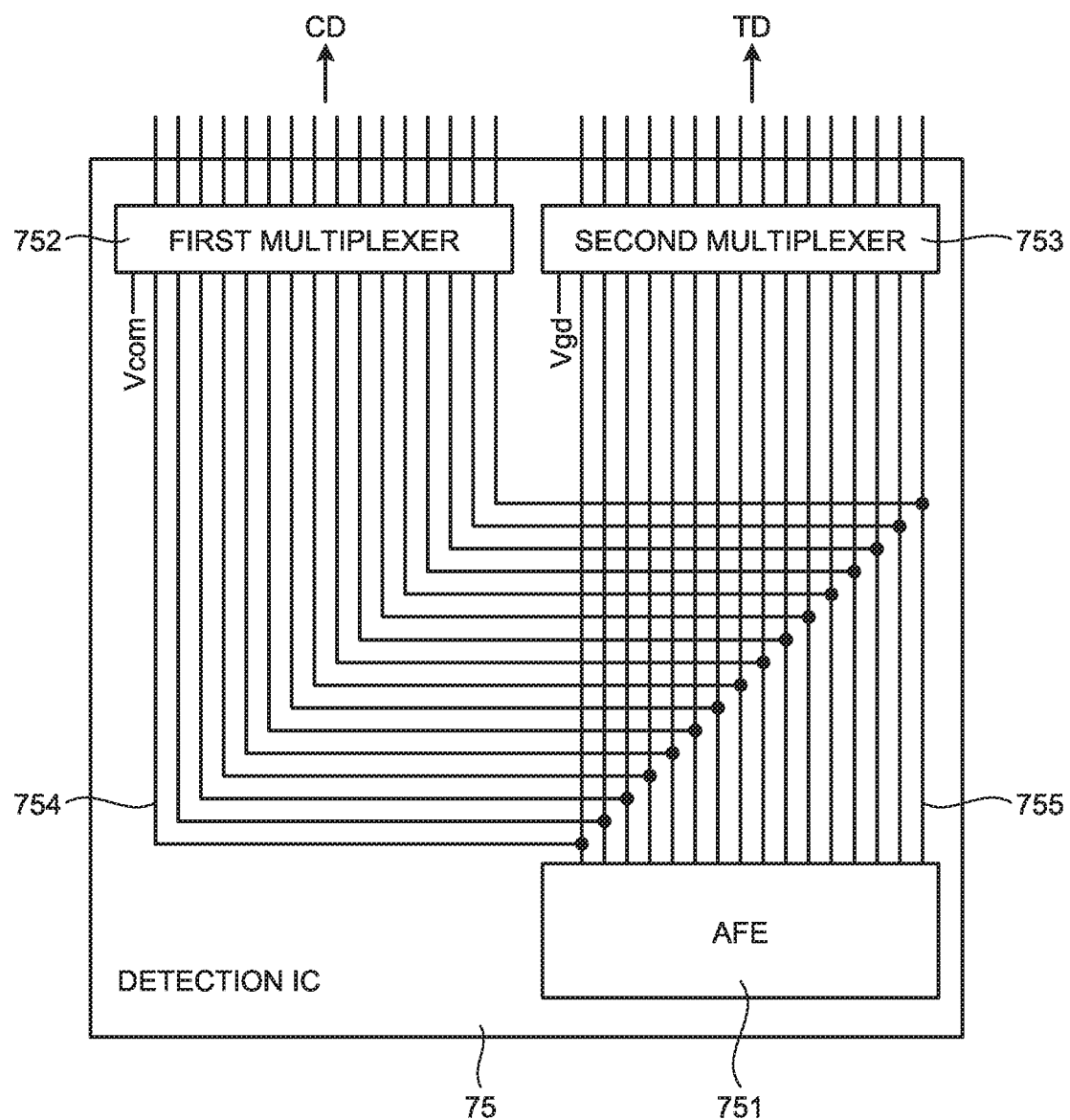
FIG. 35 is a diagram schematically illustrating an exemplary configuration of a detection IC.

FIG. 35 is a diagram schematically illustrating an exemplary configuration of the detection IC. As illustrated in FIG. 35, the detection IC 75 includes an analog front end (AFE) 751, a first multiplexer 752, a second multiplexer 753, signal lines 754, and signal lines 755. The AFE 751 processes the detection signals Vdet1 and Vdet2. The signal lines 754 are coupled to the first multiplexer 752. The signal lines 755 couple the AFE 751 to the second multiplexer 753. As illustrated in FIG. 35, 16 signal lines 754 and 16 signal lines 755 are provided, for example. The 16 signal lines 754 are coupled to the 16 signal lines 755 in one-to-one correspondence. As a result, the signal lines 754 couple the AFE 751 to the first multiplexer 752. The AFE 751, for example, has at least part of the functions of the detector 40, such as the A/D converter 43 and the signal processor 44, illustrated in FIG. 2. The first multiplexer 752 receives the detection drive signals Vcom from the drive electrode driver 14, for example. The second multiplexer 753 receives the guard signals Vgd having the same waveform as that of the detection drive signals Vcom and synchronized with the drive signals Vcom from the drive electrode driver 14, for example.

When the first multiplexer 752 couples the AFE 751 to the drive electrodes CD via the signal lines 754, for example, the second multiplexer 753 decouples the AFE 751 from the touch detection electrodes TD and outputs the guard signals Vgd to the touch detection electrodes TD. When the second multiplexer 753 couples the AFE 751 to the touch detection electrodes TD via the signal lines 755, for example, the first multiplexer 752 decouples the AFE 751 from the drive electrodes CD and outputs the detection drive signals Vcom to the drive electrodes CD. The first multiplexer 752 and the second multiplexer 753 are controlled by the controller 11, for example.

Figure 36:
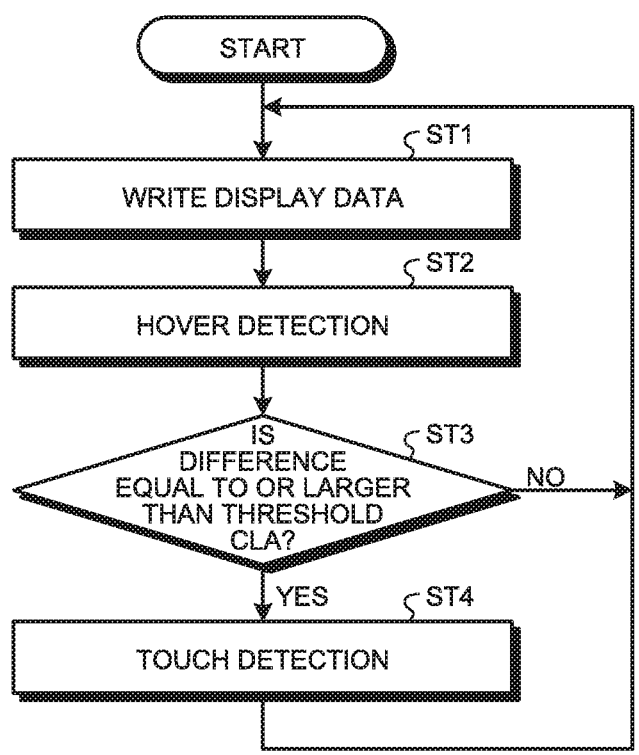
FIG. 36 is a flowchart of a process of a detection operation according to the first embodiment.
Figure 37:
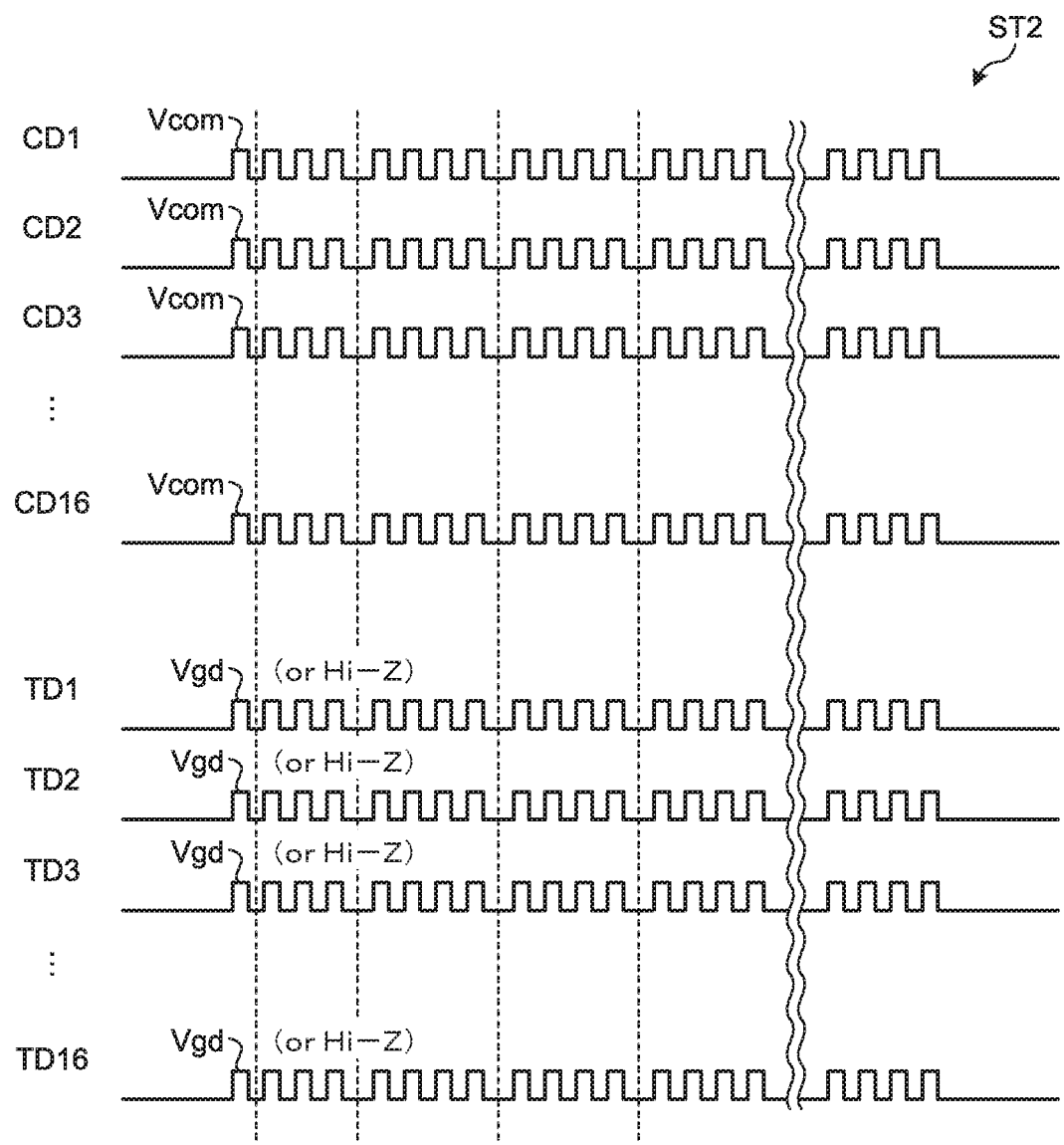
FIG. 37 is a timing waveform chart of an exemplary operation performed by the display device in a hover detection period.
Figure 38:
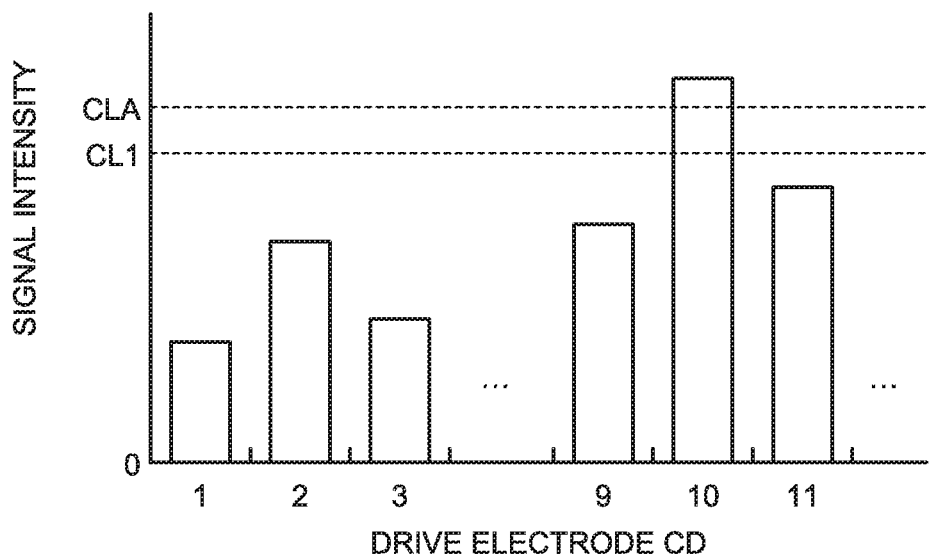
FIG. 38 is a diagram of an example of thresholds in hover detection according to the first embodiment.
Figure 39:
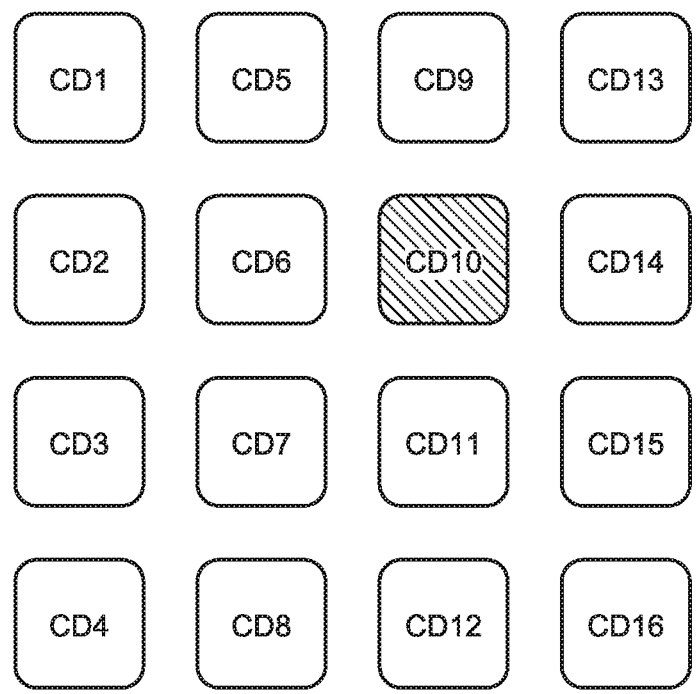
FIG. 39 is a diagram of an example of a detection position of an object to be detected in hover detection.
Figure 40:
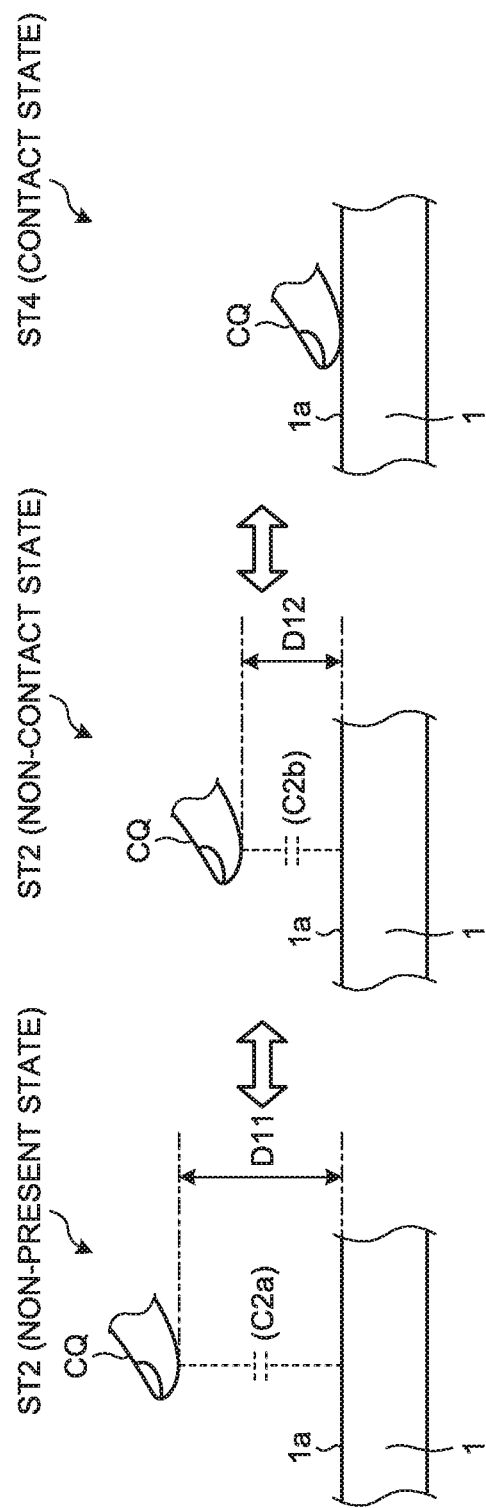
FIG. 40 is a diagram for schematically explaining the relation between the display device and an object to be detected in hover detection and touch detection.

The following describes a specific example of the detection operation according to the first embodiment. FIG. 36 is a flowchart of a process of the detection operation according to the first embodiment. FIG. 37 is a timing waveform chart of an exemplary operation performed by the display device in a hover detection period. FIG. 38 is a diagram of an example of thresholds in hover detection according to the first embodiment. The horizontal axis of FIG. 38 indicates the drive electrodes CD. The vertical axis of FIG. 38 indicates the signal intensity. The signal intensity corresponds to the difference (absolute value $|\Delta VB|$) of the detection signals Vdet2 output from the drive electrodes CD. CL1 in the vertical axis of FIG. 38 indicates a threshold for hover detection performed using the drive electrodes CD as detection electrodes. CLA in the vertical axis of FIG. 38 indicates a threshold for determining whether it is necessary to perform mutual capacitance touch detection. The threshold CLA is equal to or larger than the threshold CL1 (CLA≥CL1). FIG. 39 is a diagram of an example of a detection position of an object to be detected in hover detection. In FIGS. 38 and 39, the difference $|\Delta VB|$ of the detection signals Vdet2 output from the drive electrode CD10 out of the drive electrodes CD1 to CD16 is equal to or larger than the threshold CL1 and the threshold CLA. FIG. 40 is a diagram for schematically explaining the relation between the display device and an object to be detected in hover detection and touch detection.

As illustrated in FIG. 17, the detection operation periods Pt1 and Pt2 according to the present embodiment each have a self-capacitance hover detection period and a mutual capacitance touch detection period. Step ST1 illustrated in FIG. 36 corresponds to the display operation period Pd1 or Pd2. Steps ST2 and ST3 correspond to the hover detection period in the detection operation period Pt1 or Pt2. Step ST4 corresponds to the touch detection period in the detection operation period Pt1 or Pt2.

At Step ST1 in FIG. 36, the controller 11 (refer to FIG. 1) causes the gate driver 12 (refer to FIG. 1), the source driver 13 (refer to FIG. 1), and the drive electrode driver 14 (refer to FIG. 1) to write display data to the display portion 20 (refer to FIG. 1). Specifically, the controller 11 transmits the control signals to the coupling switching circuit 17 (refer to FIG. 21), thereby coupling the drive electrodes CD to the display IC 19. In this state, the drive electrode driver 14 supplies the display drive signals Vcomdc serving as a common electrode potential for display to the respective drive electrodes CD. As a result, the electric potential of the drive electrodes CD is fixed to that of the display drive signals Vcomdc. In this state, the gate driver 12 sequentially outputs the controls signals to the gate lines GCL, and the source driver 13 sequentially outputs the pixel signals Vpix to the data lines SGL. The controller 11 thus sequentially supplies the pixel signals Vpix to the pixels Pix (refer to FIG. 14) in a plurality of rows selected in the display operation period Pd1, thereby writing display data.

At Step ST2 in FIG. 36, the drive electrode driver 14 and the detector 40 (refer to FIG. 1) perform hover detection. The hover detection is performed by the self-capacitance method using the drive electrodes CD as detection electrodes. Specifically, the controller 11 transmits the control signals to the coupling switching circuit 17, thereby coupling the drive electrodes CD to the detection IC 75. In this state, the drive electrode driver 14 supplies the detection drive signals Vcom to the drive electrodes CD via the respective wires 27. As illustrated in FIG. 37, for example, the drive electrode driver 14 supplies the detection drive signals Vcom having the same waveform synchronously to the drive electrodes CD1 to CD16. As a result, the detection signals Vdet2 based on capacitance changes are output from the drive electrodes CD1 to CD16 simultaneously.

The detector 40 acquires the detection signals Vdet2 output from the drive electrodes CD. The detector 40 performs arithmetic processing that is based on the acquired detection signals Vdet2 and determines whether an object to be detected is present in hover detection based on the result of the arithmetic processing. If the detector 40 determines that an object to be detected is present in hover detection, the detector 40 specifies the position of the object to be detected.

At Step ST2, for example, the differences $|\Delta VB|$ of the detection signals Vdet2 output from the respective drive electrodes CD (CD1 to CD16) are compared with the threshold CL1 illustrated in FIG. 38. The comparison is performed by the signal processor 44 (refer to FIG. 2) of the detector 40, for example. If one or more of the differences $|\Delta VB|$ of the detection signals Vdet2 output from the respective drive electrodes CD (CD1 to CD16) are equal to or larger than the threshold CL1, the signal processor 44 determines that an object to be detected is detected in hover detection. In this case, the coordinate extractor 45 (refer to FIG. 2) of the detector 40 determines the position of the drive electrode CD that outputs a difference $|\Delta VB|$ of equal to or larger than the threshold CL1 to be the position of the object to be detected. In the example illustrated in FIGS. 38 and 39, the signal processor 44 determines that an object to be detected is detected at the drive electrode CD10. The coordinate extractor 45 determines the position of the drive electrode CD10 on the display panel 10 to be the position of the object to be detected in hover detection. By contrast, if all the differences $|\Delta VB|$ of the detection signals Vdet2 output from the respective drive electrodes CD are smaller than the threshold CL1, the signal processor 44 determines that an object to be detected is not detected in hover detection.

If an object to be detected CQ is not detected in hover detection, the object to be detected CQ is in the non-present state with respect to a display surface 1a of the display device 1 as illustrated in FIG. 40. The object to be detected CQ is positioned away from the display surface 1a by a distance D11. Capacitance C2a is formed between the object to be detected CQ and the drive electrode CD. By contrast, if the object to be detected CQ is detected in hover detection, the object to be detected CQ is in the non-contact state or the contact state with respect to the display surface 1a of the display device 1. In the non-contact state, the object to be detected CQ is positioned away from the display surface 1a by a distance D12. The distance D12 is shorter than the distance D11. Capacitance C2b is formed between the object to be detected CQ and the drive electrode CD. The capacitance C2b is larger than the capacitance C2a.

In hover detection, the drive electrode driver 14 supplies, to the touch detection electrodes TD1 to TD16, the guard signals Vgd (refer to FIG. 37) having the same waveform as that of the detection drive signals Vcom and synchronized with the drive signals Vcom. Alternatively, the drive electrode driver 14 may bring the touch detection electrodes TD1 to TD16 into a state of not being electrically coupled to any component (Hi-Z, refer to FIG. 37). This mechanism can prevent generation of capacitance between the touch detection electrodes TD and the drive electrodes CD supplied with the detection drive signals Vcom. Consequently, the display device 1 can increase the sensitivity in hover detection.

At Step ST3 in FIG. 36, the detector 40 determines whether it is necessary to perform mutual capacitance touch detection based on the detection signals Vdet2 acquired in hover detection (Step ST2). In other words, the detector 40 predicts, based on the detection result of the hover detection, whether an object to be detected can be detected if it performs mutual capacitance touch detection. If the detector 40 predicts that an object to be detected can be detected in touch detection, the detector 40 performs touch detection.

Specifically, the signal processor 44 (refer to FIG. 2) of the detector 40 compares the differences $|\Delta VB|$ of the detection signals Vdet2 output from the respective drive electrodes CD (CD1 to CD16) with the threshold CLA. If one or more of the differences $|\Delta VB|$ of the detection signals Vdet2 output from the respective drive electrodes CD are equal to or larger than the threshold CLA, the signal processor 44 determines that it is necessary to perform mutual capacitance touch detection. In the example illustrated in FIGS. 38 and 39, an object to be detected is detected with intensity higher than or equal to the threshold CLA at the drive electrode CD10. As a result, the signal processor 44 determines that it is necessary to perform mutual capacitance touch detection. By contrast, if all the differences $|\Delta VB|$ of the detection signals Vdet2 output from the drive electrodes CD are smaller than the threshold CLA, the signal processor 44 determines that it is not necessary to perform mutual capacitance touch detection.

If the signal processor 44 determines that it is necessary to perform mutual capacitance touch detection (Yes at Step ST3), the process proceeds to Step ST4 in FIG. 36. If the signal processor 44 determines that it is not necessary to perform mutual capacitance touch detection (No at Step ST3), the process is returned to Step ST1. As described above, the signal processor 44 determines in advance whether it is necessary to perform mutual capacitance touch detection (Step ST4) at Step ST3. If the signal processor 44 determines that it is not necessary to perform touch detection, the detector 40 can omit the detection operation at Step ST4, thereby reducing the power consumption required for touch detection. The detector 40 can increase the number of times of hover detection (Step ST2) by the omission of Step ST4.

At Step ST4 in FIG. 36, the drive electrode driver 14 and the detector 40 perform touch detection. The touch detection is performed by the mutual capacitance method using the touch detection electrodes TD as detection electrodes. Specifically, the controller 11 transmits the control signals to the coupling switching circuit 17, thereby coupling the drive electrodes CD to the detection IC 75. In this state, the drive electrode driver 14 supplies the detection drive signals Vcom to the drive electrodes CD via the respective wires 27.

Figure 41:
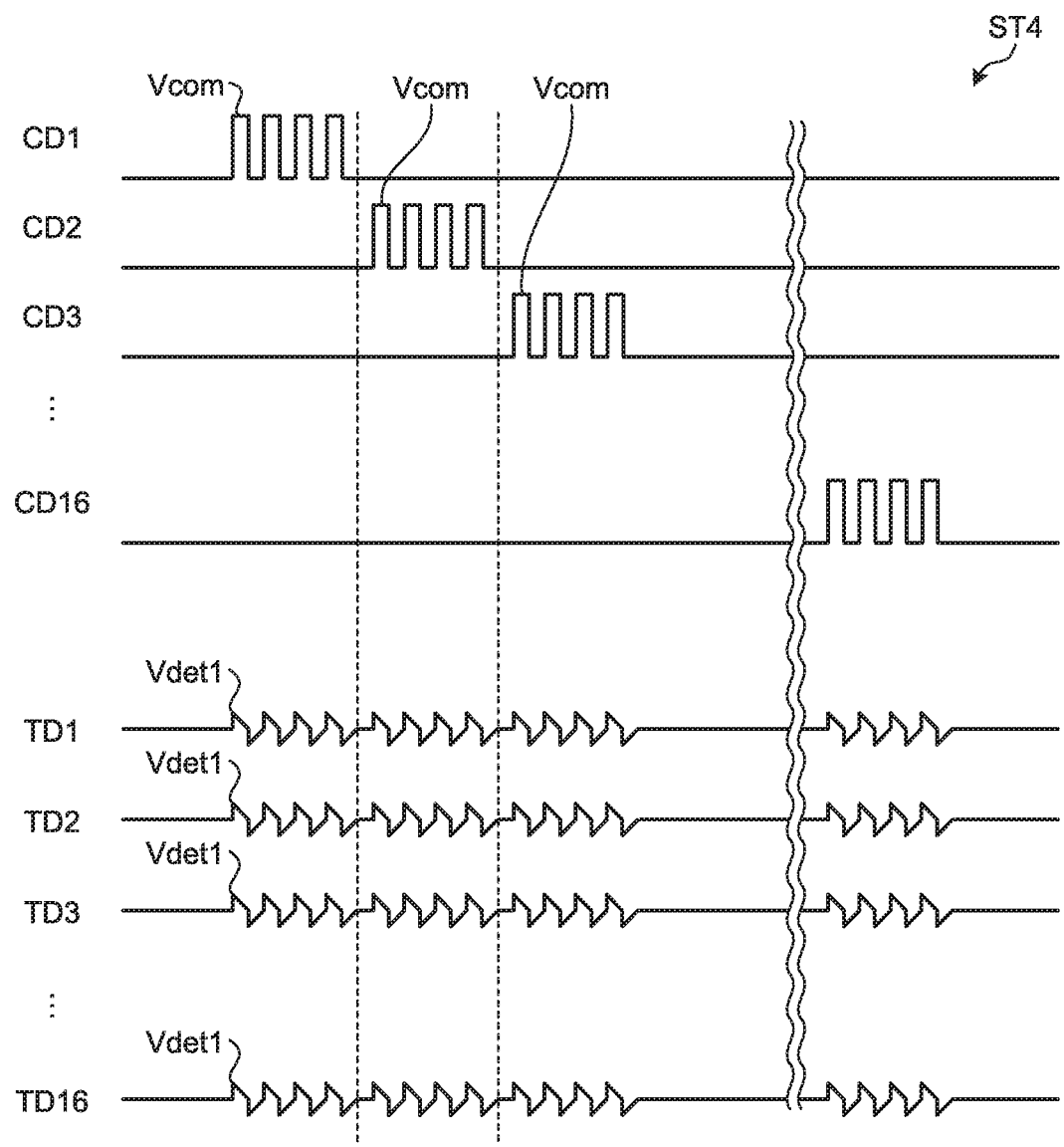
FIG. 41 is a timing waveform chart of an exemplary operation performed by the display device in a touch detection period.
Figure 42:
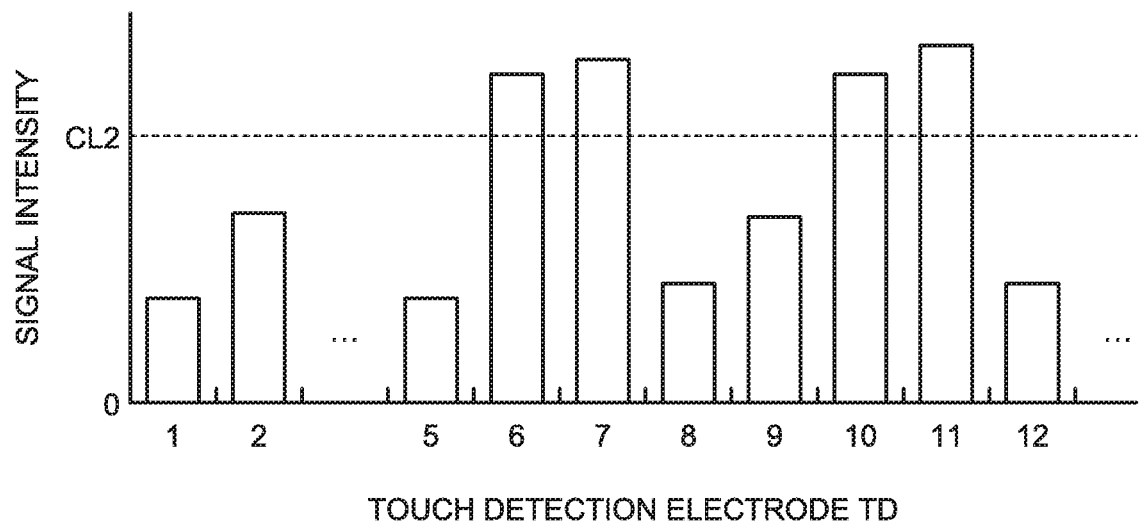
FIG. 42 is a diagram of an example of a threshold in touch detection according to the first embodiment.
Figure 43:
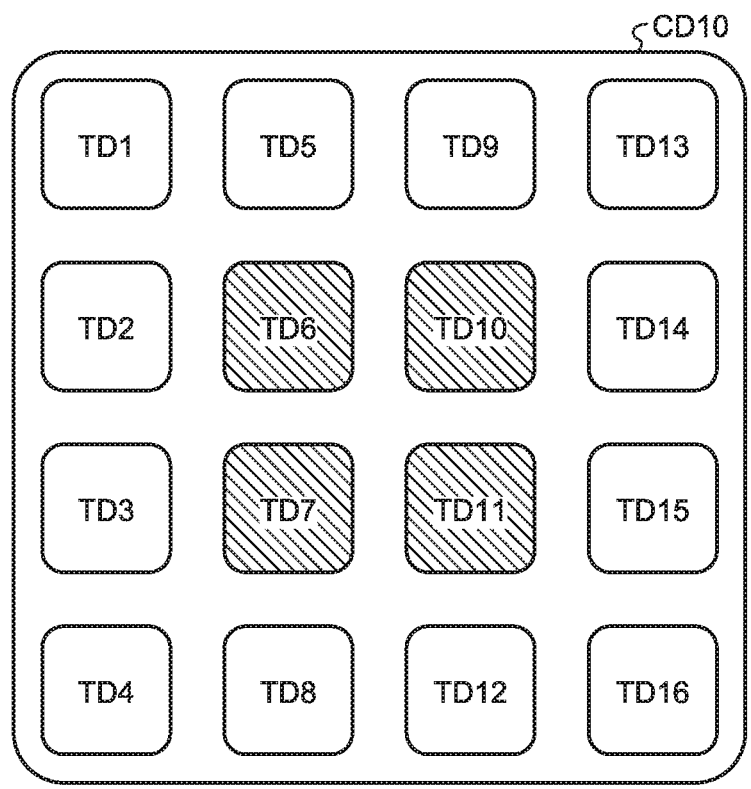
FIG. 43 is a diagram of an example of a detection position of an object to be detected in touch detection.

FIG. 41 is a timing waveform chart of an exemplary operation performed by the display device in a touch detection period. FIG. 42 is a diagram of an example of a threshold in touch detection according to the first embodiment. The horizontal axis of FIG. 42 indicates the touch detection electrodes TD overlapping the drive electrode CD10 in planar view. The vertical axis of FIG. 42 indicates the signal intensity. The signal intensity corresponds to the difference (absolute value $|\Delta VA|$) of the detection signals Vdet1 output from the touch detection electrodes TD. FIG. 43 is a diagram of an example of a detection position of an object to be detected in touch detection. As illustrated in FIG. 41, the drive electrode driver 14 supplies, to the drive electrodes CD1 to CD16, the detection drive signals Vcom having the same waveform at different timings. While the order of supplying the drive signals Vcom to the drive electrodes CD1 to CD16 is not particularly limited, the drive signals Vcom are supplied in the order of the drive electrodes CD1, CD2, CD3, ..., and CD16, for example. As a result, the detection signals Vdet1 are output from the touch detection electrodes TD based on changes in capacitance between the drive electrodes CD and the touch detection electrodes TD. While the drive signal Vcom is being supplied to the drive electrode CD1, for example, the detection signals Vdet1 are output from the touch detection electrodes TD1 to TD16 disposed facing the drive electrode CD1 based on changes in capacitance between the drive electrode CD and the touch detection electrodes TD1 to TD16.

The detector 40 acquires the detection signals Vdet1 output from the respective touch detection electrodes TD. The detector 40 performs arithmetic processing that is based on the acquired detection signals Vdet1 and determines whether an object to be detected is present in touch detection based on the result of the arithmetic processing. If the detector 40 determines that an object to be detected is present in touch detection, the detector 40 specifies the position of the object to be detected.

At Step ST4, for example, the differences $|\Delta VA|$ of the detection signals Vdet1 output from the respective touch detection electrodes TD (TD1 to TD16) are compared with a threshold CL2 illustrated in FIG. 42. The comparison is performed by the signal processor 44 (refer to FIG. 2) of the detector 40, for example. If one or more of the differences $|\Delta VA|$ of the detection signals Vdet1 output from the respective touch detection electrodes TD (TD1 to TD16) are equal to or larger than the threshold CL2, the signal processor 44 determines that an object to be detected is detected in touch detection. In this case, the coordinate extractor 45 (refer to FIG. 2) of the detector 40 determines the position of the touch detection electrode TD that outputs a difference $|\Delta VA|$ of equal to or larger than the threshold CL2 to be the position of the object to be detected. In the example illustrated in FIGS. 42 and 43, the signal processor 44 determines that an object to be detected is detected at the touch detection electrodes TD6, TD7, TD10, and TD11 overlapping the drive electrode CD10 in planar view. In the display panel 10, the coordinate extractor 45 determines the position of the touch detection electrodes TD6, TD7, TD10, and TD11 overlapping the drive electrode CD10 in planar view to be the position of the object to be detected in touch detection. By contrast, if all the differences $|\Delta VA|$ of the detection signals Vdet1 output from the respective touch detection electrodes TD are smaller than the threshold CL2, the signal processor 44 determines that an object to be detected is not detected in touch detection.

As illustrated in FIG. 43, the size of the touch detection electrode TD is smaller than that of the drive electrode CD in planar view, and the number of the touch detection electrodes TD is larger than that of the drive electrodes CD. Consequently, the display device 1 can perform touch detection using the touch detection electrodes TD with higher accuracy of the detection position than in hover detection using the drive electrodes CD.

If the object to be detected CQ is detected in touch detection, the object to be detected CQ is in the contact state with respect to the display surface 1a of the display device 1 as illustrated in FIG. 40. Capacitance formed between the object to be detected CQ and the drive electrode CD (not illustrated) is larger than the capacitance C2a and the capacitance C2b. After Step ST4, the process is returned to Step ST1, and the display operation period Pd2 starts. After the display operation period Pd2, the detection operation period Pt2 starts.

If an object to be detected is detected by hover detection or touch detection in the detection operation period Pt1 in one frame period in FIG. 17, display data reflecting the detection result is written to the display portion 20 in the next display operation period Pd2 in the frame period, for example. Similarly, if an object to be detected is detected by hover detection or touch detection in the detection operation period Pt2 in one frame period, display data reflecting the detection result is written to the display portion 20 in the display operation period Pd1 in the next frame period, for example.

As described above, the display device 1 according to the first embodiment of the present disclosure includes a plurality of drive electrodes CD and a plurality of touch detection electrodes TD. The drive electrodes CD are arrayed in the row direction and the column direction. The touch detection electrodes TD are arrayed in the row direction and the column direction. The drive electrodes CD and the touch detection electrodes TD overlap in planar view. In touch detection, the drive electrode driver 14 sequentially supplies the drive signals Vcom to the drive electrodes CD. The detector 40 detects touch input based on the detection signals Vdet1 output from the touch detection electrodes TD. Consequently, the display device 1 can perform touch detection with detection accuracy corresponding to the array of the touch detection electrodes TD. In hover detection, the drive electrode driver 14 simultaneously supplies the drive signals Vcom to the drive electrodes CD. The detector 40 performs hover detection based on the detection signals Vdet2 output from the respective drive electrodes CD.

The display device 1 includes a plurality of touch detection electrodes TD disposed at positions overlapping one drive electrode CD. The size of one drive electrode CD is larger than that of one touch detection electrode TD in planar view. The drive electrode CD has a quadrangular shape in planar view, for example, and the length of one side of the quadrangle is 20 mm to 30 mm. The touch detection electrode TD has a quadrangular shape in planar view, and the length of one side of the quadrangle is 4 mm to 5 mm. With this structure, the lines of electric force of an electric field generated from the drive electrode CD can reach a position farther away from the display surface than those of an electric field generated from the touch detection electrode TD. Consequently, the display device 1 can increase the detection sensitivity in hover detection and satisfactorily detect an object to be detected in the non-contact state. The display device 1 thus can perform touch detection and hover detection satisfactorily. In the display device 1 according to the present embodiment, the number of touch detection electrodes TD is larger than that of drive electrodes CD. As illustrated in FIGS. 25 and 26, for example, 16 touch detection electrodes TD are disposed at positions overlapping one drive electrode CD in planar view. In other words, the number of touch detection electrodes TD is 16 times the number of drive electrodes CD.

In the first embodiment, the row direction corresponds to a "first direction" according to the present disclosure, and the column direction corresponds to a "second direction" according to the present disclosure. The drive electrode CD corresponds to a "first electrode" according to the present disclosure, and the touch detection electrode TD corresponds to a "second electrode" according to the present disclosure. The wire 27 corresponds to a "first wire" according to the present disclosure, the wire 37 corresponds to a "second wire" according to the present disclosure, and the wire 26 corresponds to a "third wire" according to the present disclosure. The flexible substrate 71 corresponds to a "coupler" according to the present disclosure. The detection signal Vdet1 corresponds to a "first detection signal" according to the present disclosure, and the detection signal Vdet2 corresponds to a "second detection signal" according to the present disclosure. The drive electrode driver 14 corresponds to a "drive circuit" according to the present disclosure. The first substrate 2 corresponds to a "substrate" according to the present disclosure. The device including a plurality of drive electrodes CD and a plurality of touch detection electrodes TD corresponds to a "detection device" according to the present disclosure.

The touch detection electrodes TD according to the first embodiment are coupled to the detection IC 75 via the flexible substrate 71. The touch detection electrodes TD according to an embodiment of the present disclosure may be coupled to the detection IC 75 without using the flexible substrate 71.

First Modification

Figure 44:
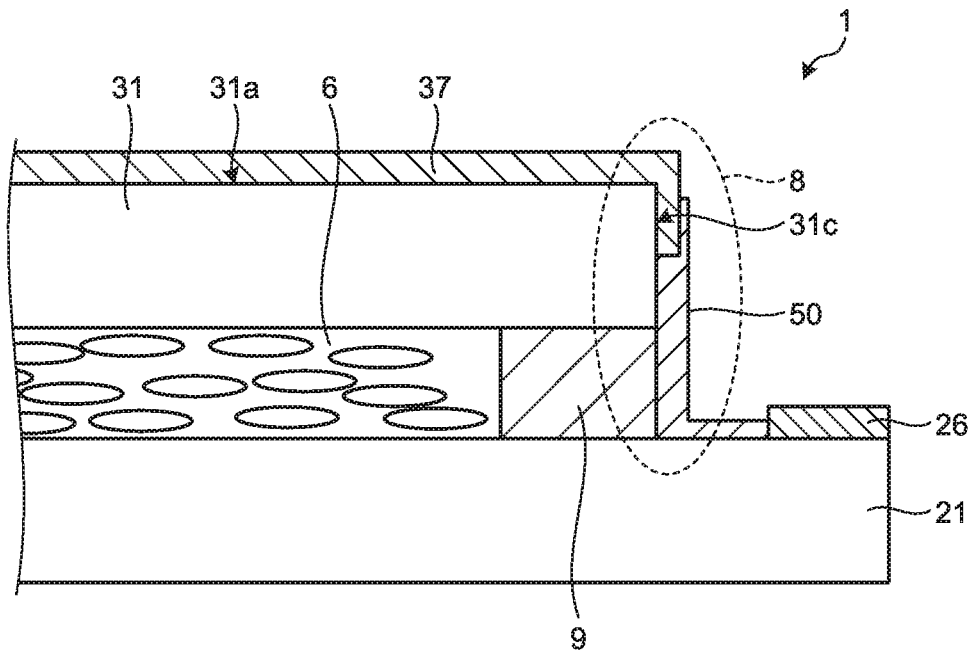
FIG. 44 is a sectional view of a first modification of the display device according to the first embodiment.

FIG. 44 is a sectional view of a first modification of the display device according to the first embodiment. As illustrated in FIG. 44, the first surface 31a of the counter substrate 31 has an area smaller than that of the first surface 21a of the TFT substrate 21. A step portion 8 is formed between an end of the counter substrate 31 and the TFT substrate 21. The step portion 8 includes a side surface 31c of the counter substrate 31. In the first modification, the wire 37 coupled to the touch detection electrode TD extends from the first surface 31a to the side surface 31c of the counter substrate 31, for example. In the first modification, the side surface 31c is provided with a conductor 50. The conductor 50 is provided covering a sealing member 9 that seals the liquid crystal layer 6 from the side. The conductor 50 couples the wire 37 to the wire 26 provided on the TFT substrate 21. With this configuration, the touch detection electrodes TD can be coupled to the detection IC 75 via the conductor 50.

An embodiment of the present disclosure may include a through electrode penetrating from a first surface 31a to a second surface 31b in the counter substrate 31. The touch detection electrodes TD may be coupled to the detection IC 75 via the through electrode. In the first modification, the conductor 50 corresponds to the "coupler" according to the present disclosure.

Second Modification

Figure 45:
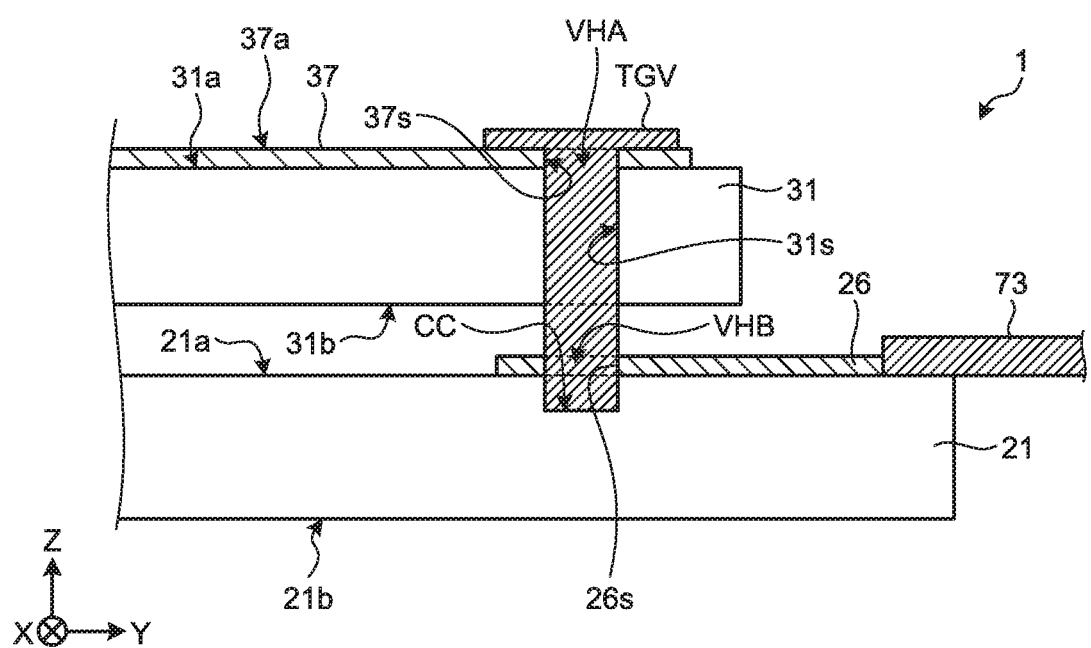
FIG. 45 is a sectional view of a second modification of the display device according to the first embodiment.

FIG. 45 is a sectional view of a second modification of the display device according to the first embodiment. As illustrated in FIG. 45, the counter substrate 31 has a through hole VHA bored from the first surface 31a to the second surface 31b. The through hole VHA is also bored through the wire 37 provided on the first surface 31a of the counter substrate 31. The wire 26 provided to the TFT substrate 21 has a through hole VHB at a position facing the through hole VHA.

The TFT substrate 21 has a recess CC at a position facing the through hole VHB. The recess CC opens on the first surface 21a of the TFT substrate 21 and has the bottom between the first surface 21a and the second surface 21b. The depth of the recess CC is one-fifth to one-half the thickness of the TFT substrate 21, for example. In the depth direction (Z-direction) of the display device 1, the recess CC, the through hole VHB, and the through hole VHA are formed in this order to serve as a coupling hole extending in the Z-direction. In the second modification, the TFT substrate 21 may have a through hole bored from the first surface 21a to the second surface 21b instead of the recess CC.

A through electrode TGV electrically couples the wire 26 to the wire 37 through the through hole VHA. In the example illustrated in FIG. 45, the through electrode TGV is in contact with an upper surface 37a of the wire 37, an inner surface 37s of the wire 37 in the through hole VHA, and an inner surface 31s of the counter substrate 31 in the through hole VHA. The inner surfaces 37s and 31s serve as the inner surface of the through hole VHA. The through electrode TGV is also in contact with an inner surface 26s of the wire 26 in the through hole VHB and an inner surface of the recess CC. The inner surface 26s serves as the inner surface of the through hole VHB.

In the example illustrated in FIG. 45, the through electrode TGV fills up the through holes VHA and VHB and the recess CC. The through electrode TGV simply needs to be in contact with the inner surfaces of the through holes VHA and VHB and the recess CC and provided continuously between the wire 26 and the wire 37. The through electrode TGV is preferably made of a metal material, such as silver. The metal material preferably includes particles having a diameter of the order of several nanometers to several ten nanometers. With this configuration, the touch detection electrodes TD can be coupled to the detection IC 75 via the through electrode TGV.

The second modification may include a sealing member and an adhesive layer between the end of the TFT substrate 21 and the counter substrate 31. The sealing member seals the liquid crystal layer. The adhesive layer bonds the TFT substrate 21 and the counter substrate 31. If a sealing member or an adhesive layer is provided between the end of the TFT substrate 21 and the counter substrate 31, the side surface of the through electrode TGV may be in contact with the sealing member or the adhesive layer. In the second modification, the through electrode TGV corresponds to the "coupler" according to the present disclosure.

Second Embodiment

The drive electrodes CD and the wires 27 coupled thereto according to the first embodiment are provided to the same layer. The drive electrodes CD and wires coupled thereto according to the present embodiment may be provided to different layers.

Figure 46:
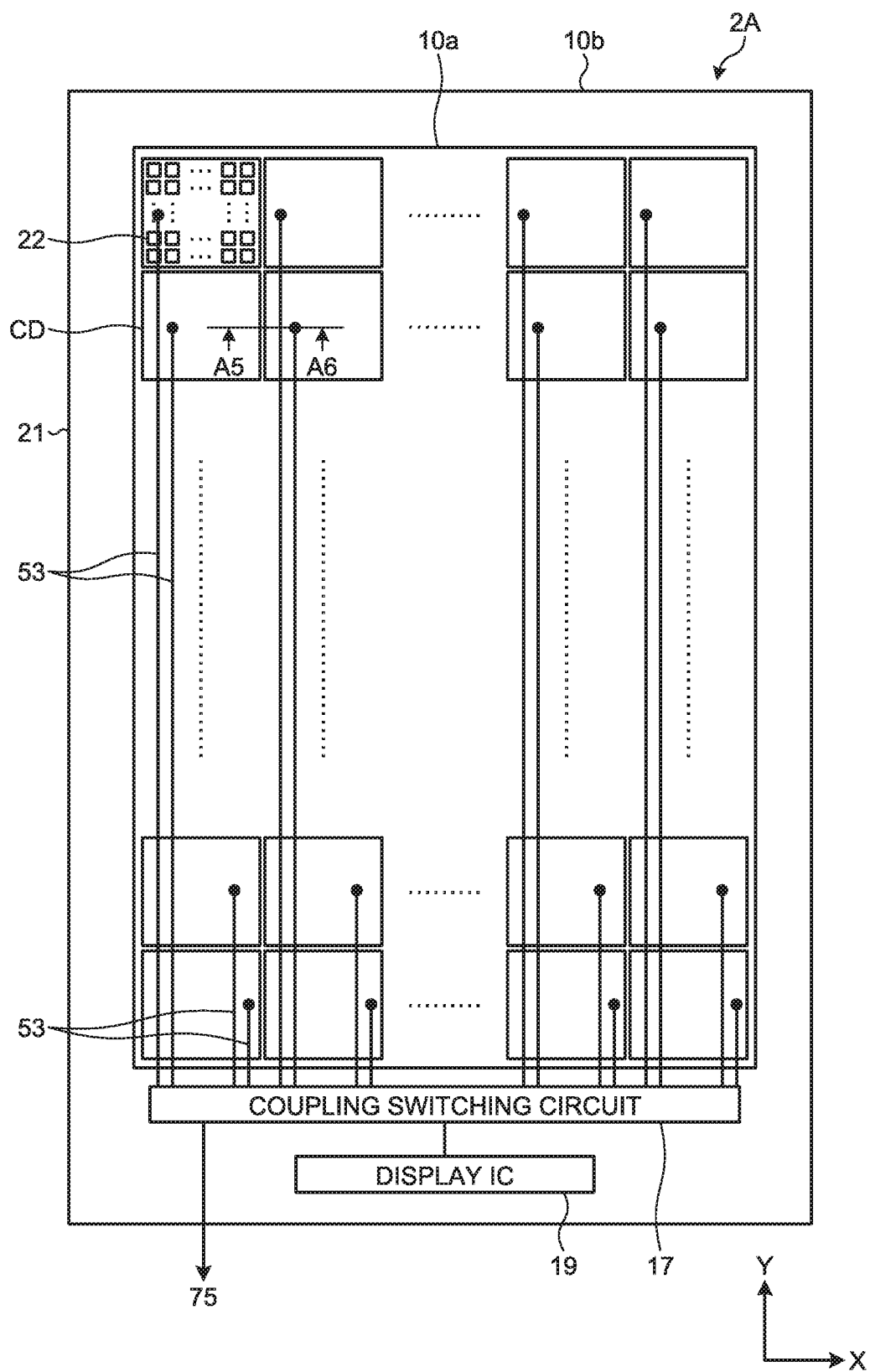
FIG. 46 is a plan view schematically illustrating the first substrate according to a second embodiment of the present disclosure.
Figure 47:
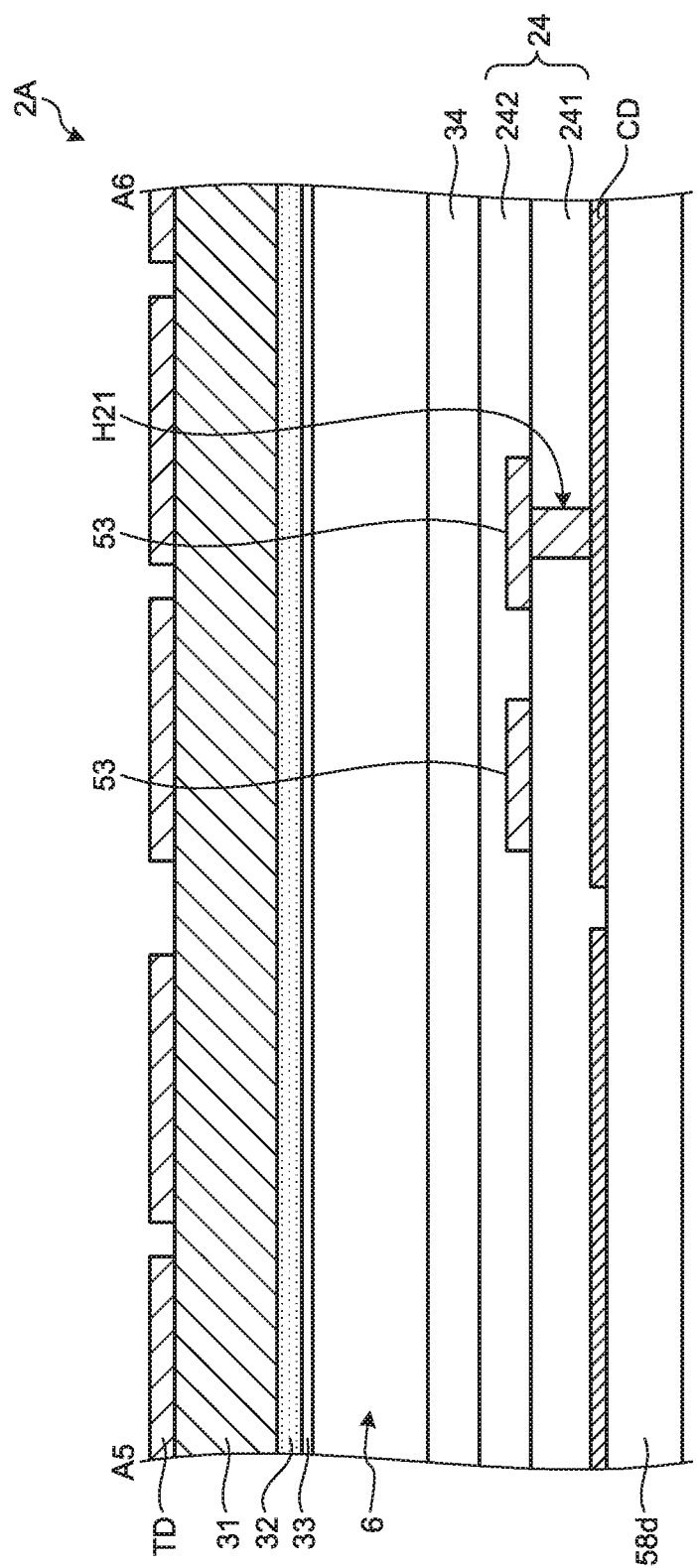
FIG. 47 is an enlarged sectional view of part of FIG. 46 along line A5-A6.

FIG. 46 is a plan view schematically illustrating the first substrate according to a second embodiment of the present disclosure. FIG. 47 is an enlarged sectional view of part of FIG. 46 along line A5-A6. As illustrated in FIG. 46, a first substrate 2A according to the second embodiment includes a plurality of wires 53 extending in the column direction. The wires 53 are coupled to the respective drive electrodes CD in one-to-one correspondence. The drive electrodes CD are coupled to the coupling switching circuit 17 via the respective wires 53.

As illustrated in FIG. 47, the first substrate 2A according to the second embodiment includes a first insulating layer 241 and a second insulating layer 242 as the insulating layer 24 that insulates the pixel electrodes 22 from the drive electrodes CD. The first insulating layer 241 has a through hole H21 extending to the drive electrode CD. The wires 53 are provided on the first insulating layer 241 and each coupled to the drive electrode CD through the through hole H21. The wires 53 are covered with the second insulating layer 242. The pixel electrodes 22 are provided on the second insulating layer 242. With this configuration, the drive electrodes CD can be coupled to the display IC 19 (refer to FIG. 21) and the detection IC 75 (refer to FIG. 21) via the respective wires 53. Consequently, the display device including the first substrate 2A according to the second embodiment can perform touch detection and hover detection satisfactorily similarly to the display device 1 according to the first embodiment. In the second embodiment, the first substrate 2A corresponds to the "substrate" according to the present disclosure.

Third Embodiment

The touch detection electrodes TD and the wires 37 coupled thereto according to the first embodiment are provided to the same layer. The touch detection electrodes TD and wires coupled thereto according to the present embodiment may be provided to different layers.

Figure 48:
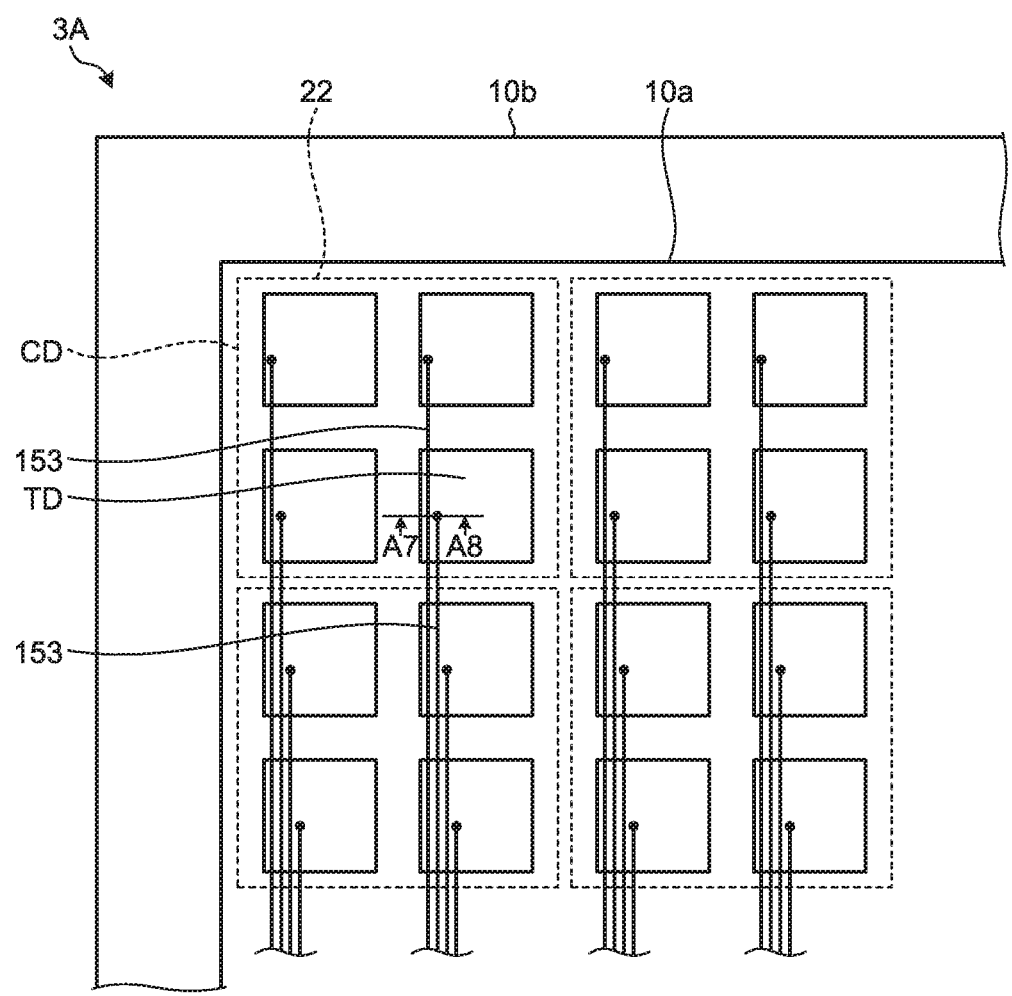
FIG. 48 is a plan view schematically illustrating the second substrate according to a third embodiment of the present disclosure.
Figure 49:
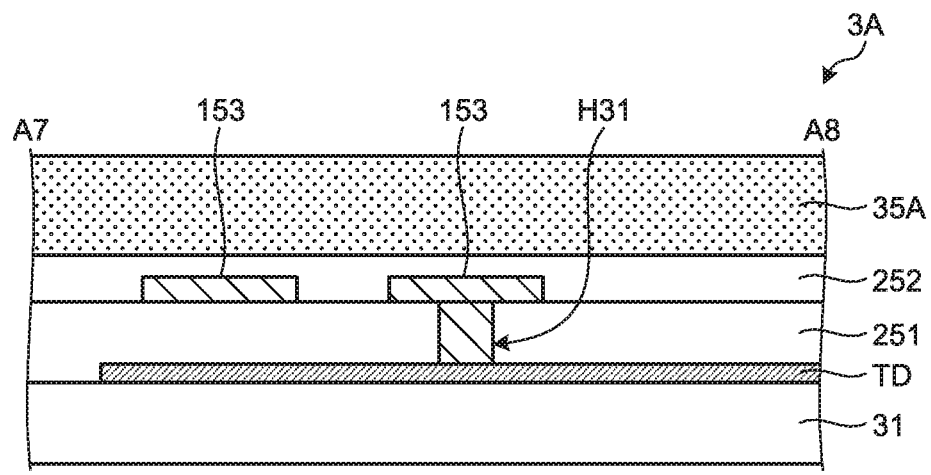
FIG. 49 is an enlarged sectional view of part of FIG. 48 along line A7-A8.

FIG. 48 is a plan view schematically illustrating the second substrate according to a third embodiment of the present disclosure. FIG. 49 is an enlarged sectional view of part of FIG. 48 along line A7-A8. As illustrated in FIG. 48, a second substrate 3A according to the third embodiment includes a plurality of wires 153 extending in the column direction. The wires 153 are coupled to the respective touch detection electrodes TD in one-to-one correspondence.

The touch detection electrodes TD are coupled to the wires 77 of the flexible substrate 71, for example, via the respective wires 153. As illustrated in FIG. 49, the second substrate 3A according to the third embodiment includes a first insulating layer 251 and a second insulating layer 252. The first insulating layer 251 covers the touch detection electrodes TD. The second insulating layer 252 is provided on the first insulating layer 251. The first insulating layer 251 has a through hole H31 extending to the touch detection electrode TD. The wires 153 are provided on the first insulating layer 251 and each coupled to the touch detection electrode TD through the through hole H31. The wires 153 are covered with the second insulating layer 252. The polarizing plate 35A is provided on the second insulating layer 252. With this configuration, the touch detection electrodes TD can be coupled to the detection IC 75 (refer to FIG. 21) via the respective wires 153 and the flexible substrate 71. Consequently, the display device including the second substrate 3A according to the third embodiment can perform touch detection and hover detection satisfactorily similarly to the display device 1 according to the first embodiment.

Fourth Embodiment

The display panel 10 according to the first embodiment is what is called an in-cell or hybrid device in which the capacitance touch sensor 30 is included in and integrated with the display portion 20. The display panel 10 according to the present embodiment may be what is called an on-cell device in which the touch sensor 30 is mounted on the display portion 20. If the display panel 10 is an on-cell device, the touch sensor 30 may be provided on the display portion 20. Alternatively, the touch sensor 30 may be provided not on but above the display portion 20 with another layer interposed therebetween.

Figure 50:
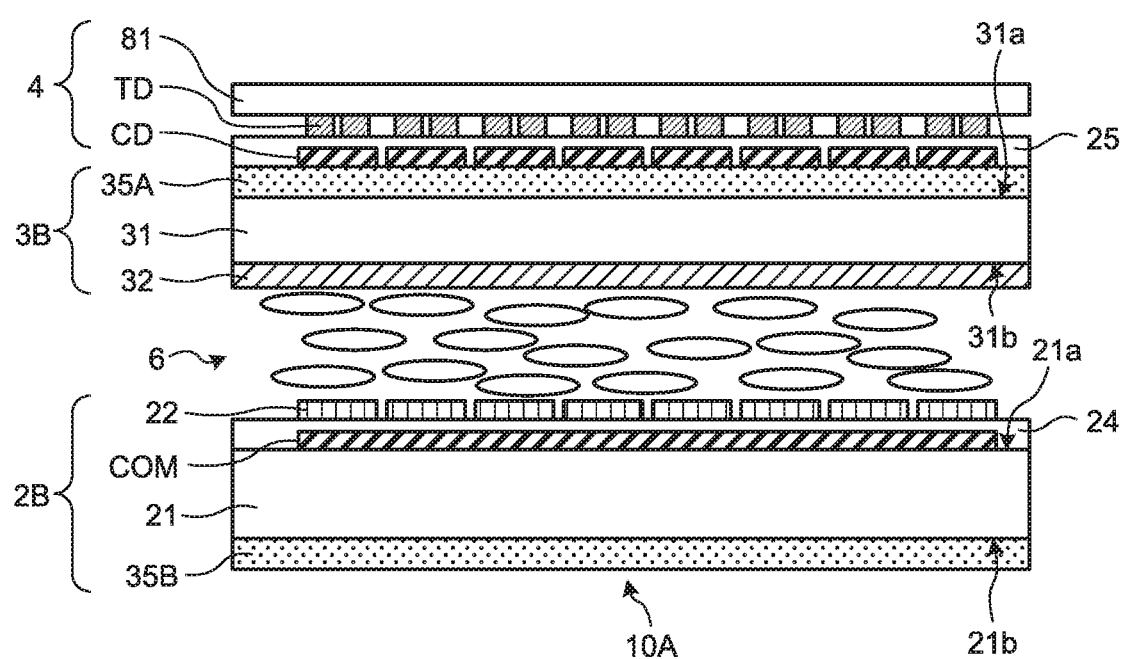
FIG. 50 is a sectional view of an exemplary configuration of an on-cell display panel according to a fourth embodiment of the present disclosure.

FIG. 50 is a sectional view of an exemplary configuration of an on-cell display panel according to a fourth embodiment of the present invention. As illustrated in FIG. 50, an on-cell display panel 10A according to the fourth embodiment includes a first substrate 2B, a second substrate 3B, the liquid crystal layer 6, and a detection device 4. The second substrate 3B is disposed facing the first substrate 2B in a direction perpendicular to the surface of the first substrate 2B. The liquid crystal layer 6 is provided between the first substrate 2B and the second substrate 3B. The detection device 4 is disposed on the surface of the second substrate 3B opposite to the surface facing the liquid crystal layer 6.

The first substrate 2B includes the TFT substrate 21, a common electrode COM, the insulating layer 24, the pixel electrodes 22, and the polarizing plate 35B. The common electrode COM is provided on the first surface 21a of the TFT substrate 21. The insulating layer 24 is provided on the first surface 21a to cover the common electrode COM. The pixel electrodes 22 are provided on the insulating layer 24. The polarizing plate 35B is provided on the second surface 21b of the TFT substrate 21. In the display operation periods Pd1 and Pd2 (refer to FIG. 17), the display drive signals Vcomdc are supplied to the common electrode COM. The second substrate 3B includes the counter substrate 31, the polarizing plate 35A, and the color filter 32. The polarizing plate 35A is provided on the first surface 31a of the counter substrate 31. The color filter 32 is provided on the second surface 31b of the counter substrate 31.

The detection device 4 includes a plurality of drive electrodes CD, an insulating layer 25, a plurality of touch detection electrodes TD, and the cover glass 81, for example. The drive electrodes CD are provided on the polarizing plate 35A. The insulating layer 25 is provided on the polarizing plate 35A to cover the drive electrodes CD. The touch detection electrodes TD are provided on the insulating layer 25. The cover glass 81 is provided on the insulating later 25 to cover the touch detection electrodes TD. The detection device 4 also includes wires (not illustrated) coupled to the touch detection electrodes TD and wires (not illustrated) coupled to the drive electrodes CD. With this configuration, the drive electrodes CD and the touch detection electrodes TD can be coupled to the detection IC 75 (refer to FIG. 18) via the respective wires. Consequently, the detection device 4 according to the fourth embodiment can perform touch detection and hover detection satisfactorily similarly to the display device 1 according to the first embodiment.

In the detection operation periods Pt1 and Pt2, the fourth embodiment may supply the common electrode COM with the guard signals Vgd having the same waveform as that of the detection drive signals Vcom and synchronized with the drive signals Vcom. Alternatively, in the detection operation periods Pt1 and Pt2, the fourth embodiment may bring the common electrode COM into a state of not being electrically coupled to any component. This mechanism can prevent generation of capacitance between the common electrode COM and the drive electrodes CD supplied with the detection drive signals Vcom in the detection operation periods Pt1 and Pt2. Consequently, the fourth embodiment can increase the detection sensitivity. In the fourth embodiment, the first substrate 2B corresponds to a "third substrate" according to the present disclosure.

While exemplary embodiments according to the present disclosure have been described, the embodiments are not intended to limit the disclosure. The contents disclosed in the embodiments are given by way of example only, and various modifications may be made without departing from the spirit of the present disclosure. While the first embodiment describes a liquid crystal display device that can perform color display, for example, the present disclosure is not necessarily applied to a color display liquid crystal display device and may be a monochromatic display liquid crystal display device. Appropriate changes made without departing from the spirit of the present disclosure naturally fall within the technical scope of the disclosure.

The detection device and the display device according to the present aspect may have the following aspects, for example.

(1) A detection device comprising:
a plurality of first electrodes arrayed in a first direction and a second direction intersecting the first direction; and
a plurality of second electrodes arrayed in the first direction and the second direction, wherein
the first electrodes and the second electrodes overlap in planar view.

(2) The detection device according to (1), wherein the size of the first electrodes in planar view is larger than the size of the second electrodes.

(3) The detection device according to (1) or (2), further comprising:
first wires coupled to the first electrodes;
a first substrate provided with the first electrodes and the first wires;
second wires coupled to the second electrodes; and
a second substrate provided with the second electrodes and the second wires, wherein
one of the second wires couples, in the second direction, a plurality of the second electrodes overlapping the first electrodes that are different ones of the first electrodes, in planar view.

(4) The detection device according to (3), wherein one of the second wires couples the second electrodes disposed at the same position with respect to the respective first electrodes between the first electrodes that are different ones of the first electrodes.

(5) The detection device according to (3) or (4), wherein the first electrodes and the first wires are provided to the same layer on the first substrate.

(6) The detection device according to any one of (3) to (5), wherein the second electrodes and the second wires are provided to the same layer on the second substrate.

(7) The detection device according to any one of (1) to (6), further comprising a detector configured to detect a first detection signal output from the second electrodes based on a change in capacitance between the first electrodes and the second electrodes or a second detection signal output from the first electrodes based on a change in capacitance in the first electrodes.

(8) The detection device according to (7), further comprising:
a drive circuit configured to supply a drive signal to the first electrodes, wherein
the drive circuit supplies, to the second electrodes, a guard signal having the same waveform as the waveform of the drive signal and synchronized with the drive signal in a period when the detector detects the second detection signal.

(9) The detection device according to (7) or (8), wherein the second electrodes are in an electrically floating state in a period when the detector detects the second detection signal.

(10) A display device comprising:
the detection device according to any one of (1) to (9);
a third substrate facing the detection device; and
a display functional layer disposed between the detection device and the third substrate.

(11) A display device comprising:
a plurality of first electrodes arrayed in a first direction and a second direction intersecting the first direction;
a first substrate provided with the first electrodes;
a plurality of second electrodes arrayed in the first direction and the second direction;
a second substrate provided with the second electrodes; and
a display functional layer provided between the first substrate and the second substrate, wherein
the first electrodes and the second electrodes overlap in planar view, and
the size of the first electrodes in planar view is larger than the size of the second electrodes.
(12) The display device according to (11), further comprising a detector configured to detect a first detection signal output from the second electrodes based on a change in capacitance between the first electrodes and the second electrodes or a second detection signal output from the first electrodes based on a change in capacitance in the first electrodes.
(13) The display device according to any one of (10) to (12), further comprising:
first wires coupled to the first electrodes;
a first substrate provided with the first electrodes and the first wires;
second wires coupled to the second electrodes;
a second substrate provided with the second electrodes and the second wires;
third wires provided to the first substrate; and
a coupler configured to couple the second wires to the third wires, wherein
the first substrate has a display region on which an image is displayed and a frame region provided around the display region, and
the third wires are provided in the frame region.
(14) The display device according to (13), wherein a plurality of the second wires are coupled to one of the third wires via the coupler.

What is claimed is:

1. A detection device comprising:
a plurality of first electrodes arrayed in a first direction and a second direction intersecting the first direction; and
a plurality of second electrodes arrayed in the first direction and the second direction, wherein
the first electrodes and the second electrodes overlap in planar view, and
a dummy electrode is provided between the second electrodes disposed side by side, the dummy electrode being not served as detection electrodes.

2. The detection device according to claim 1, wherein the size of the first electrodes in planar view is larger than the size of the second electrodes.

3. The detection device according to claim 1, further comprising:
first wires coupled to the first electrodes;
a first substrate provided with the first electrodes and the first wires;
second wires coupled to the second electrodes; and
a second substrate provided with the second electrodes and the second wires, wherein
one of the second wires couples, in the second direction, a plurality of the second electrodes overlapping the first electrodes that are different ones of the first electrodes, in planar view.

4. The detection device according to claim 3, wherein one of the second wires couples the second electrodes disposed at the same position with respect to the respective first electrodes between the first electrodes that are different ones of the first electrodes.

5. The detection device according to claim 3, wherein the first electrodes and the first wires are provided to the same layer on the first substrate.

6. The detection device according to claim 3, wherein the second electrodes and the second wires are provided to the same layer on the second substrate.

7. The detection device according to claim 1, further comprising a detector configured to detect a first detection signal output from the second electrodes based on a change in capacitance between the first electrodes and the second electrodes or a second detection signal output from the first electrodes based on a change in capacitance in the first electrodes.

8. The detection device according to claim 7, further comprising:
a drive circuit configured to supply a drive signal to the first electrodes, wherein
the drive circuit supplies, to the second electrodes, a guard signal having the same waveform as the waveform of the drive signal and synchronized with the drive signal in a period when the detector detects the second detection signal.

9. The detection device according to claim 7, wherein the second electrodes are in an electrically floating state in a period when the detector detects the second detection signal.

10. A display device comprising:
the detection device according to claim 1;
a third substrate facing the detection device; and
a display functional layer disposed between the detection device and the third substrate.

11. The display device according to claim 10, further comprising:
first wires coupled to the first electrodes;
a first substrate provided with the first electrodes and the first wires;
second wires coupled to the second electrodes;
a second substrate provided with the second electrodes and the second wires;
third wires provided to the first substrate; and
a coupler configured to couple the second wires to the third wires, wherein
the first substrate has a display region on which an image is displayed and a frame region provided around the display region, and
the third wires are provided in the frame region.

12. The display device according to claim 11, wherein a plurality of the second wires are coupled to one of the third wires via the coupler.

13. The detection device according to claim 1, wherein the dummy electrode comprise mesh-shaped, zigzag-line-shaped, or wavy-line-shaped metal thin wires.

14. A display device comprising:
a plurality of first electrodes arrayed in a first direction and a second direction intersecting the first direction;
a first substrate provided with the first electrodes;
a plurality of second electrodes arrayed in the first direction and the second direction;
a second substrate provided with the second electrodes; and
a display functional layer provided between the first substrate and the second substrate, wherein the first electrodes and the second electrodes overlap in planar view, and the size of the first electrodes in planar view is larger than the size of the second electrodes, and a dummy electrode is provided between the second electrodes disposed side by side, the dummy electrode being not served as detection electrodes.

15. The detection device according to claim 14, wherein the dummy electrode comprise mesh-shaped, zigzag-line-shaped, or wavy-line-shaped metal thin wires.

16. The display device according to claim 15, further comprising a detector configured to detect a first detection signal output from the second electrodes based on a change in capacitance between the first electrodes and the second electrodes or a second detection signal output from the first electrodes based on a change in capacitance in the first electrodes.

* * * * *